United States Patent [19]

Hanaoka

[11] Patent Number: 5,848,280
[45] Date of Patent: Dec. 8, 1998

[54] APPARATUS FOR PROVIDING CONTINUITY OF OPERATION IN A COMPUTER

[75] Inventor: Masaaki Hanaoka, Suwa, Japan

[73] Assignee: Seiko Epson Corporation, Tokyo, Japan

[21] Appl. No.: 470,147

[22] Filed: Jun. 6, 1995

Related U.S. Application Data

[63] Continuation of Ser. No. 341,252, Nov. 17, 1994, Pat. No. 5,530,877, which is a continuation of Ser. No. 978,296, Nov. 17, 1992, Pat. No. 5,379,435, which is a continuation of Ser. No. 403,639, Sep. 6, 1989, abandoned.

[30] Foreign Application Priority Data

Sep. 6, 1988 [JP] Japan ................................ 63-222743

[51] Int. Cl.$^6$ ..................................................... G06F 1/30
[52] U.S. Cl. ............................... 395/750.01; 395/182.13; 395/182.22
[58] Field of Search ........................ 395/750, 182.13, 395/182.2, 182.22, 750.01; 371/66; 364/707

[56] References Cited

U.S. PATENT DOCUMENTS

| | | |
|---|---|---|
| 3,757,302 | 9/1973 | Pollitt . |
| 3,801,963 | 4/1974 | Chen . |
| 3,959,778 | 5/1976 | Brette . |
| 4,131,942 | 12/1978 | Gillett et al. . |
| 4,307,455 | 12/1981 | Juhasz et al. . |
| 4,458,307 | 7/1984 | McAnlis et al. . |
| 4,523,295 | 6/1985 | Zato . |
| 4,611,289 | 9/1986 | Coppola . |
| 4,646,307 | 2/1987 | Nishimura . |
| 4,672,573 | 6/1987 | Shonaka . |
| 4,868,832 | 9/1989 | Marrington et al. . |

(List continued on next page.)

FOREIGN PATENT DOCUMENTS

| | | |
|---|---|---|
| 0230351 | 7/1987 | European Pat. Off. . |
| 39-24502 | 2/1964 | Japan . |
| 57-25023 | 2/1982 | Japan . |
| 62-254222 | 11/1987 | Japan . |
| 63-039053 | 2/1988 | Japan . |
| 63-80649 | 5/1988 | Japan . |
| 63-184123 | 7/1988 | Japan . |
| 1545169 | 5/1979 | United Kingdom . |

OTHER PUBLICATIONS

Office Action from Japanese Patent Office, with English Language Translation.

"Memory Protection system", IBM Technical Disclosure Bulletin, D.C. Shattuck and L. M. Hornung, Nov. 6, 1966.

*Primary Examiner*—Glenn A. Auve
*Attorney, Agent, or Firm*—Stroock & Stroock & Lavan LLP

[57] ABSTRACT

An apparatus for providing continuity of operation in system which performs a process having CPU, input/output, main memory and power supply by restoring the system state to the point when the power supply was last turned off or an even earlier time is provided. The apparatus includes a save process start detector for detecting a demand for power supply turn-off. A system state saver outputs information indicative of the system state to an external storage in response to an instruction from the save process start detector. A post save processor turns the power supply off after the information indicative of the system state has been completely output to the external storage by the system stale saver. A restore process starter is activated upon start up of the system after turning on of the power supply. A system state restorer reads the information indicative of the system state, that has been recorded in the external storage by the system state saver in response to instructions from the restore processor starter and then sets the information in a predetermined area to restore the system state to that which existed when the power supply was turned off. After the system state has been restored by the system state restorer a post restore processor continues the control of a process from the step being operated when the process was suspended by the save process start detector.

260 Claims, 10 Drawing Sheets

U.S. PATENT DOCUMENTS

| | | |
|---|---|---|
| 4,907,150 | 3/1990 | Arroyo et al. . |
| 4,965,828 | 10/1990 | Ergott, Jr. et al. . |
| 5,012,406 | 4/1991 | Martin . |
| 5,151,855 | 9/1992 | Gray et al. . |
| 5,163,153 | 11/1992 | Cole et al. ................................. 395/750 |
| 5,193,176 | 3/1993 | Brandin . |
| 5,276,865 | 1/1994 | Thorpe ..................................... 395/575 |
| 5,276,890 | 1/1994 | Arai ......................................... 395/750 |
| 5,355,490 | 10/1994 | Kou .......................................... 395/700 |
| 5,379,435 | 1/1995 | Hanaoka ................................. 395/750 |
| 5,386,552 | 1/1995 | Garney ..................................... 395/575 |
| 5,530,877 | 6/1996 | Hanaoka ................................. 395/750 |

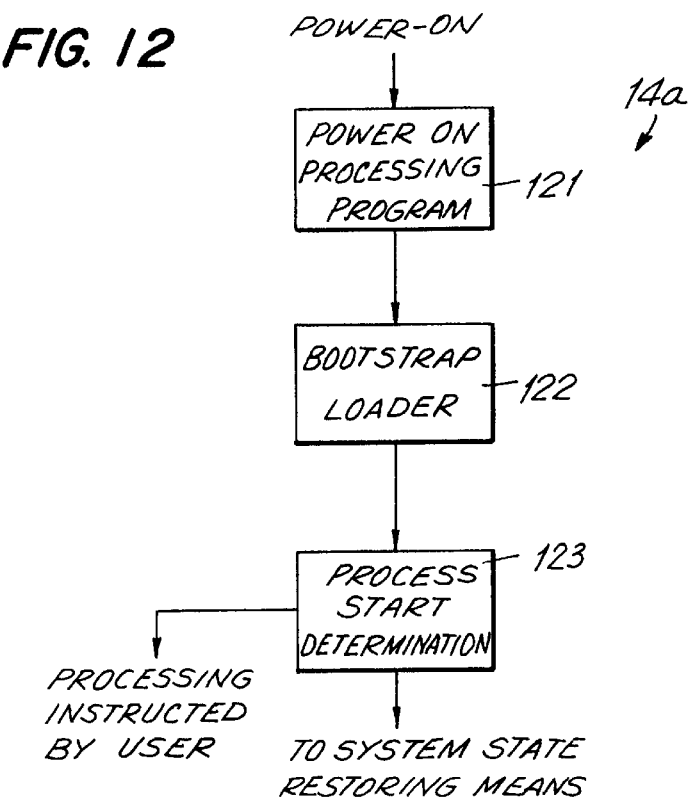
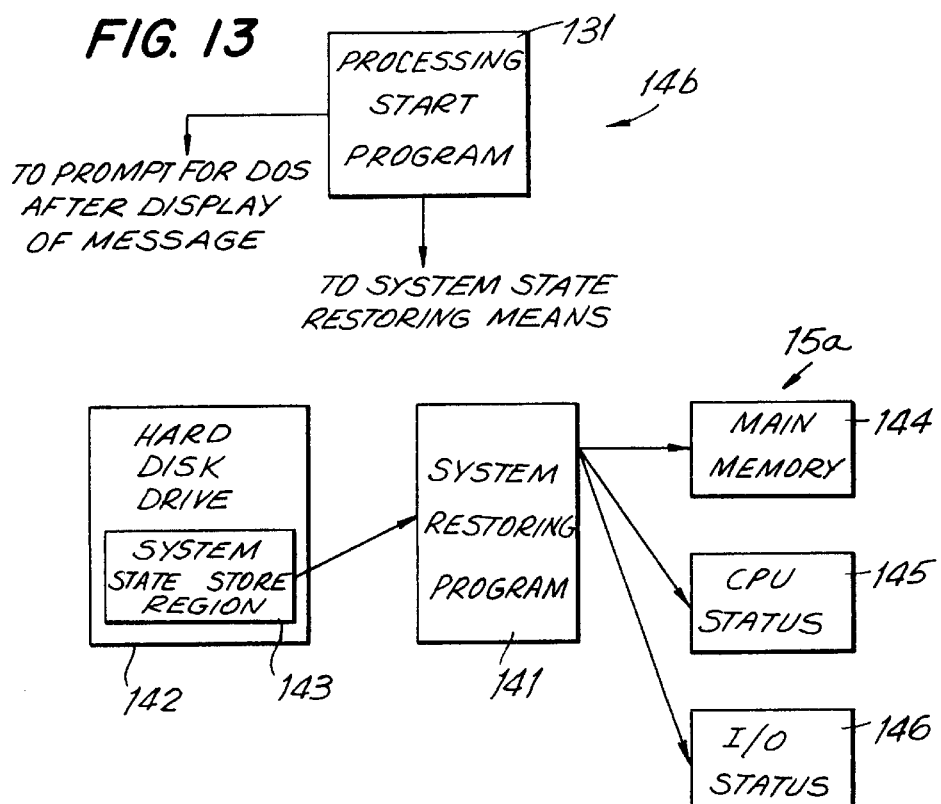
FIG. 12
FIG. 13
FIG. 14

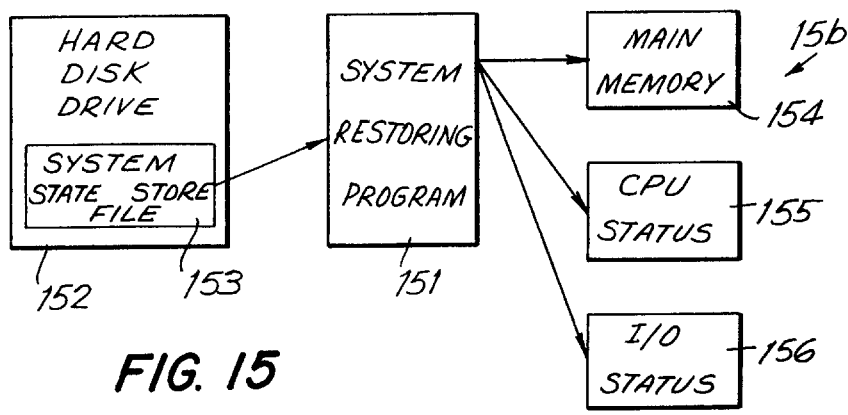
FIG. 15
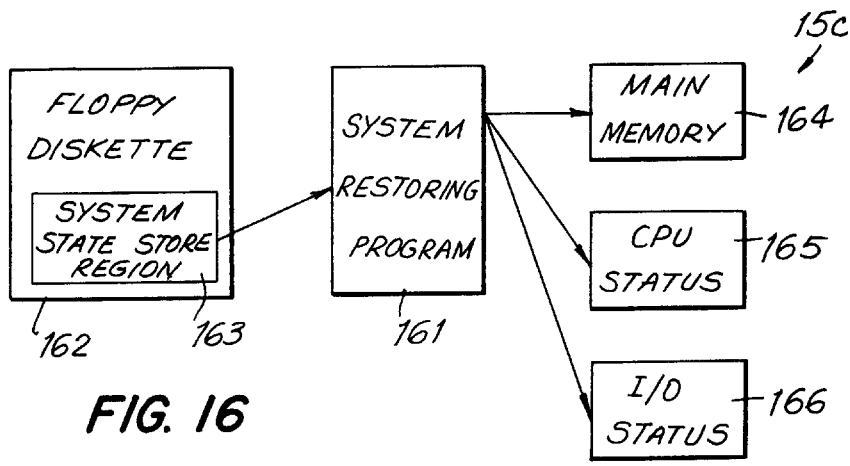
FIG. 16
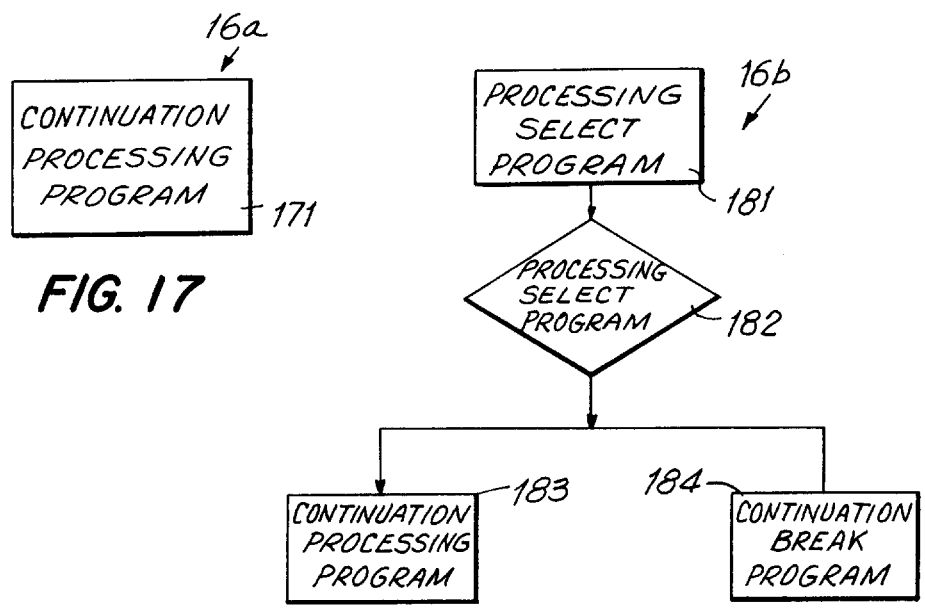
FIG. 17
FIG. 18

APPARATUS FOR PROVIDING CONTINUITY OF OPERATION IN A COMPUTER

This is a Continuation of U.S. patent application Ser. No. 08/341,252 filed Nov. 17, 1994, now U.S. Pat. No. 5,530,877 which is a Continuation of U.S. patent application Ser. No. 07/978,296 filed Nov. 17, 1992, now U.S. Pat. No. 5,379,435, which is a Continuation of U.S. patent application Ser. No. 07/403,639 filed on Sep. 6, 1989, now abandoned.

BACKGROUND OF THE INVENTION

The present invention relates to an apparatus for providing continuity of operation in a computer, and in particular to providing continuity of operation in a small-sized computer by utilizing an external storage element.

Continuity for personal computers as used herein constitutes the turning on and off of a personal computer power supply such that when the power supply is again turned on, the system state is restored to the condition existing when the power supply was last turned off. Thus, permitting the continuation of processing being executed prior to the turning off of the power supply. The need for continuation has increased with the advent of small-sized, battery driven computers. These portable computers can be used irrespective of places and times for operation. For example, they may be utilized while waiting for trains or airplanes or during free time before the start of meetings. Often, it is difficult to complete all of the required processing procedures in such a limited time period. Accordingly, it often becomes necessary to shut down the computer in the middle of an operation. On these occasions:, portable computers would become more convenient to use if the suspended processing can be continued later at any time after turning off the computer power supply.

Small-sized computers are generally powered by a rechargeable battery source. Therefore, if the battery voltage becomes too low (hereinafter referred to as "low battery") during periods of use or when a power switch is left turned on due to inadvertence of the user, the current computer processing should be suspended during a low voltage situation and then resumed later after recharging. In a worst case, if computer processing is not suspended then all of the data would be lost during the power supply cut-off. Also in such cases, it would be advantageous to turn off the power supply in a current saving state, and then resume the suspended processing once the low battery state has been remedied.

As seen above, computing continuity is crucial for convenient use of portable computers. Realization of continuity absolutely requires that the system state at the point when the power supply was last turned off be maintained. The system state includes the contents of a main memory, the setting conditions of input/output (herein after "I/O") ports, the state of the central processing unit (hereinafter "CPU") and the like. The setting conditions or status of the I/O ports in turn specify the computer hardware conditions at the time of turn-off of the power supply. The hardware conditions can be stored as information in the main Memory and therefore, can be considered as retention of data in the main memory.

With conventional computers retention of data in the main memory has been realized by providing a power supply backup for the main memory. Specifically, the memory means includes a static RAM (hereinafter "SRAM") and power is continuously supplied to the main memory even after the power supply has been turned off to retain the content of the SRAM. If the memory means includes a dynamic RAM (hereinafter "DRAM"), power is supplied to periodically refresh the main memory even after the power supply has been turned off.

The conventional small computers have been satisfactory. However, those continuity structures suffer from the disadvantage that the system cost increases due to the increased complexity of the backup power supply circuit configuration as well as the specialized design of devices employed.

Additionally, because even the backup power source requires batteries the data cannot be preserved over a long title period without recharging the batteries. Thus the resulting system is expensive, and does not accomplish continuity over a long time period.

Accordingly, it is desired to provide an apparatus for providing continuity of operation in a computer which overcomes the disadvantages of the prior art device described by providing an external recording structure independent of the computer power source.

SUMMARY OF THE INVENTION

Generally speaking, in accordance with the present invention, an apparatus for providing continuity of operation in a computer is provided. The apparatus is used in conjunction with a computer having a main memory and input/output port, CPU and power supply and includes a process start detector for detecting a demand by the user or by the computer itself to turn off the power supply. A system state saver in response to instructions from the process start detector receives the data from the main memory, as well as the I/O status and CPU status corresponding to the ongoing operation of the computer. Storage is provided external to the computer for receiving the main memory data, I/O status and CPU status from the system data saver. A post save processor turns off the power supply once the information has been transferred from the system state saver to the external power source. A restored process starter detects a return of power from the computer power supply and provides an indication to a system start restorer which retrieves the information stored in the external storage once the power supply has been turned on and outputs the data to restore the main memory data, I/O status and CPU status to that occurring just prior to turning off of the power supply. A post restore processor then controls the programming once the condition of the computer has been restored to its previous state to provide continuity of processing.

Accordingly, it is an object of this invention to provide an improved apparatus for providing continuity within a small-sized computer.

Another object of the present invention is to provide a continuity method and apparatus which is less expensive while improving reliability.

A further object of the invention is to provide a more universal continuity device which can restore not only the state as established when a power supply was last turned off, but can also restore the system to a state which existed at an even earlier time.

Yet another object of the present invention to provide an inexpensive and reliable continuity method and apparatus allowing the system to operate in a continuous manner by recording the system state, at a time when the power supply is turned off or at a time instructed by the user, in an external memory, and then restore the earlier recorded state upon turning on the power supply or an instruction from the user.

Still other objects and advantages of the invention will in part be obvious and will in part be apparent from the specification and drawings.

The invention accordingly comprises the several steps and the relation of one or more of such steps with respect to each of the others, and the apparatus embodying the features of construction, combination of elements, and arrangement of parts which are adapted to effect such steps, all as exemplified in the following detailed disclosure, and the scope of the invention will be indicated in the claims.

BRIEF DESCRIPTION OF THE DRAWINGS

For a fuller understanding of the invention, reference is had to the following description taken in connection with the accompanying drawings, in which:

FIG. 12 is a block diagram of a restore process starter constructed in accordance with the invention;

FIG. 13 is a block diagram of a restore process starter constructed in accordance with an eighth embodiment of the invention;

FIG. 14 is a block diagram of a system state restorer constructed in accordance with the invention;

FIG. 15 is a block diagram of a system state restorer constructed in accordance with a ninth embodiment of the invention;

FIG. 16 is a block diagram of a system state restorer constructed in accordance with a tenth embodiment of the invention;

FIG. 17 is a block diagram of a post restore processor constructed in accordance with the invention;

FIG. 18 is a block diagram of a post-restore processor constructed in accordance with an eleventh embodiment of the invention;

DETAILED DESCRIPTION OF THE PREFERRED EMBODIMENTS

Figure 1:
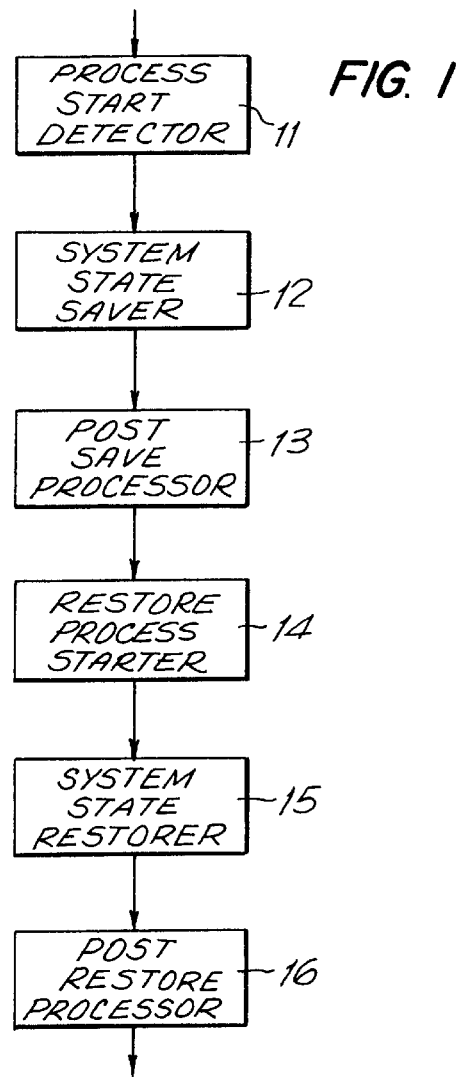
FIG. 1 is a block diagram of an apparatus for providing continuity of operation in a computer constructed in accordance with the present invention.

Reference is first made to FIG. 1 in which a block diagram of an apparatus for providing continuity in operation of a computer constructed in accordance with the invention is provided. The apparatus includes a save process start detector 11 which manages and determines the timing at which the computer or system state is to be saved. The save process is triggered by either a turn-off of a power switch, the occurrence of the low battery state, an instruction from the system user, or the like. Once the determination to save the system status is made a system state saver 12 outputs the system state at the time indicated by save process start detector 11 to an external memory that will not lose the stored contents even if the system power is cut off.

Once the system status has been saved, a post-save processor 13 performs the processing required after the system state has been saved. Post save processor 13 may turn off of the power supply, continue processing, initialization, or the like. Generally post save processor 13 turns off the power supply.

When the system is reactivated or upon an instruction from the system user a restore process starter 14 is activated. Restore process starter 14 in turn activates a system state restorer 15. System state restorer 15 reads out the system state stored earlier in the external storage by system statesaver 12. System state restorer 15 then restores the system to the earlier condition in accordance with the read out data. A post-restore processor 16 restarts the previously interrupted process in the restored system state. Accordingly, it becomes possible for a user to interrupt the process.

Each element employed in the apparatus can be implemented within some variation. Accordingly, each element will first be described with reference to preferred embodiments thereof, followed by an entire apparatus for providing continuity of operation in a computer constructed by the combination of the elements.

Figure 2:
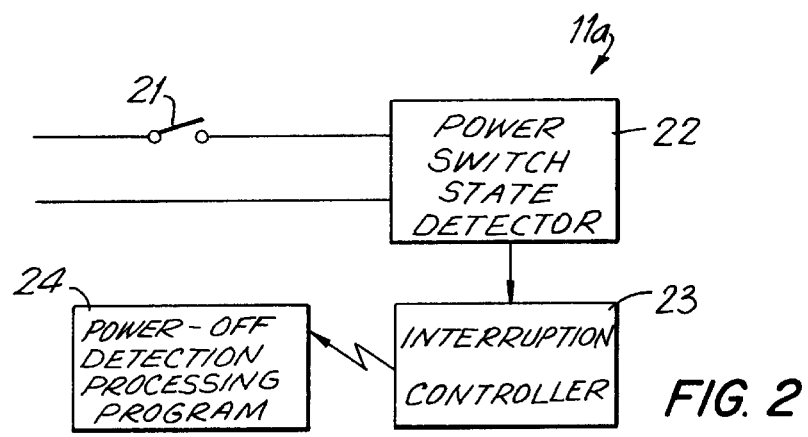
FIG. 2 is a block diagram of a save process start detector constructed in accordance with the invention.

Reference is now made to FIG. 2 in which a first embodiment of a process start detector, generally indicated as 11a constructed in accordance with the invention is provided. Process start detector 11a includes a power switch 21. A power switch state detector 22 is coupled to power switch 21 and detects the state of power switch 21 and provides An input to interruption controller 23. A power off detection program 24 is activated by interruption controller 23.

In operation, when power switch 21 is turned off by the user, power switch state detector 22 detects the turning off of power switch 21. Power switch state detector 22 then issues a signal to interruption controller 23 requesting an interruption in response to the cut-off of the power. Upon receiving the signal from power switch state detector 22, interruption controller 23 causes an interruption during an interruptible state indicating cut-off of the power. Specifically, a power-off detection processing program 24 is activated in response to the interruption causing software to detect the turning off of power switch 21. Power off detection processing program 24 then carries out the necessary processing and activates system state saver 12. An example of such a power off detection processing program is known from U.S. Pat. Nos. 4,672,573 and 4,646,307.

Figure 3:
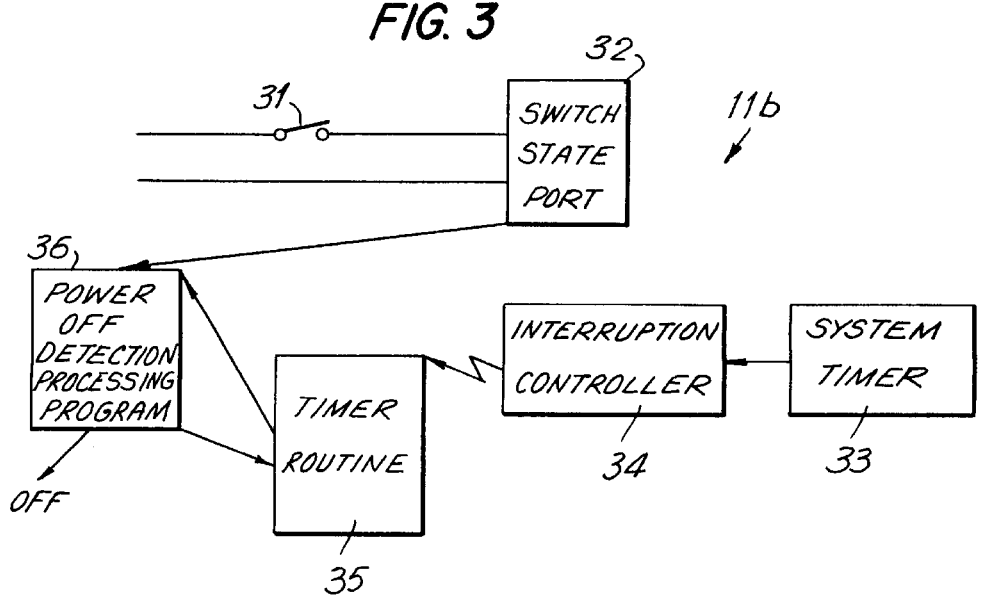
FIG. 3 is a block diagram of a save process start detector constructed in accordance with a second embodiment of the invention.

Reference is now made to FIG. 3 in which a process start detector, generally indicated as 11b, constructed in accordance with a second embodiment of the invention is provided. Process start detector 11b includes a power switch 31 and a switch state port 32 coupled to power switch 31. A system timer 33 provides an input at predetermined intervals to an interruption controller 34. Interruption controller 34 in turn activates a timer routine 35 which provides an output to activate power off detection processing program 36. Power off detection processing program 36 also reads the status of switch state port 32 to determine what type of output to provide.

When power switch 31 is turned off by the user, switch state port 32 coupled to power switch 31 reads the state of power switch 31 utilizing a program and indicates that power switch 31 is turned off. Simultaneously, system timer 33 sends an interruption request signal to interruption controller 34 at predetermined intervals. Interruption controller 34 causes a timer interruption during an interruptible state. In response to the interruption request of interruption controller 34, timer routine 35 is activated to carry out the necessary processing such as updating of a counter, followed by calling power off detection processing program 36. Power off detection processing program 36 reads the status of switch state port 32 and activates system state saver 12 if the power switch 31 is turned off. If the status of switch state port 32 indicates that power switch 31 is turned on, power off detection processing program 36 returns the control back to time routine 35 to terminate the timer interruption processing.

While the save process start detector 11a is activated by the interruption caused upon cut off of the power, save process start detector 11b detects cut off of the power in any period of the predetermined timer interruption intervals.

Figure 4:
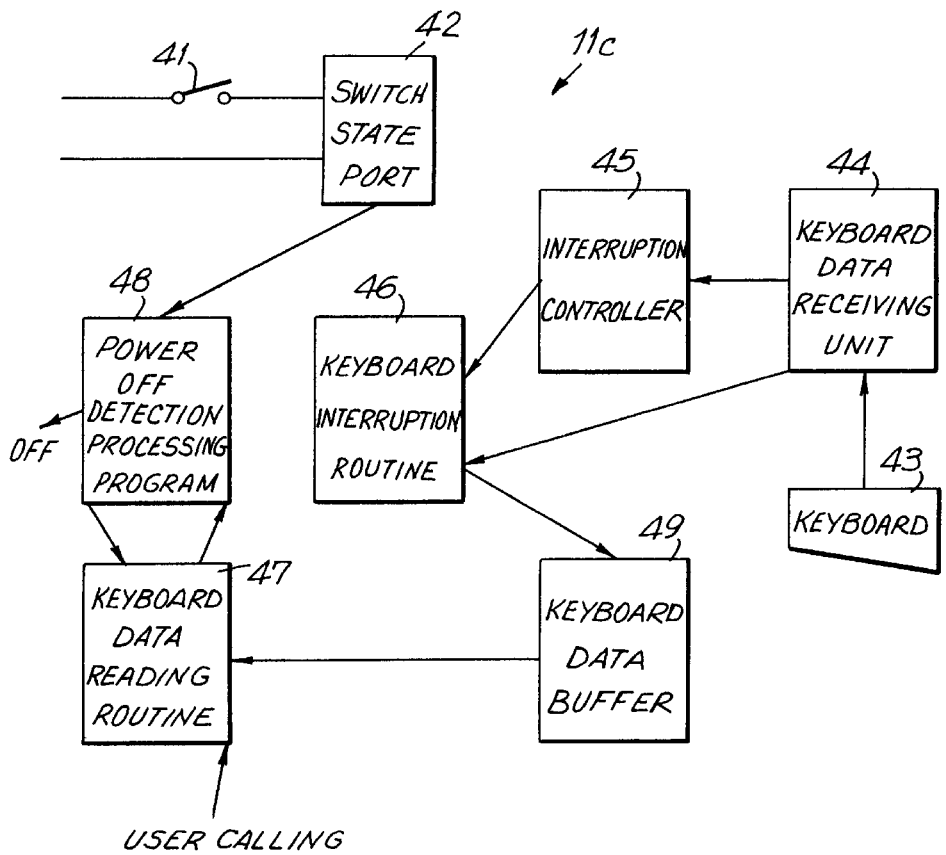
FIG. 4 is a block diagram of a save process start detector constructed in accordance with a third embodiment of the invention.

Reference is now made to FIG. 4 in which a process start detector, generally indicated as 11c, constructed in accordance with a fourth embodiment of the invention is provided. Process start detector 11c includes a power switch 41 coupled to a switch state port 42. Switch state port 42 provides a status output to a power off detection processing program 48. A keyboard 43 is provided for a user to provide an input to a keyboard data receiving unit 44. An interruption controller 45 receives an input from keyboard data receiving unit 44 and provides an output to keyboard interruption routine 46 which also receives an input from keyboard data receiving unit 44 and provides an output to a keyboard data buffer 49. Keyboard data buffer 49 provides an output to keyboard data reading routine 47 which in turn provides an output to power detection processing program 48.

When power switch 41 is turned off by the user, switch state port 42, connected to power switch 41 reads the on/off status of power switch 41 utilizing a program. Switch state port 42 indicates a turned off status.

When any key of keyboard 43 is depressed, keyboard data indicating the key being depressed is sent from keyboard 43 to the keyboard data receiving unit 44 which in turn sends a keyboard data receiving interruption request signal to interruption controller 45. Interruption controller 45 outputs a keyboard input interruption which activates keyboard interruption routine 46, so that the keyboard data is read out of keyboard data receiving unit 44 and loaded into keyboard data buffer 49. The keyboard data loaded in keyboard data buffer 49 is read out by keyboard data reading routine 47 upon a request from a user program.

If the keyboard data is present in keyboard data buffer 49 keyboard data reading routine 47 reads out the keyboard data and returns it to the user program. If the keyboard data is not present in keyboard data buffer 49, i.e., in the absence of any key input keyboard data reading routine 47 either informs the user program of the absence of a key input, or the keyboard data reading routine 47 waits for a key input to be applied and the keyboard data to be entered into keyboard data buffer 49. Whether to return to the null state or wait for entry of the keyboard data is determined by the function of keyboard data reading routine 47 or instructions from the user program. Keyboard data reading routine 47 calls power off detection processing program 48 which reads power switch state port 42 after reading the keyboard data, immediately before providing an indication of the vacancy of the keyboard data buffer 49 (i.e., no key input) to the user program, or during the wait for the next keyboard data to be loaded into the keyboard data buffer 49. If power switch 41 is turned off, keyboard data reading routine 47 then activates system state saver 12.

While save process start detector 11b detects cut off of the power with the timer interruption prepared in the system, save process start detector 11c detects cut off of the power in the keyboard data reading program most frequently called by the user program.

Figures 5, 6A, 6B:
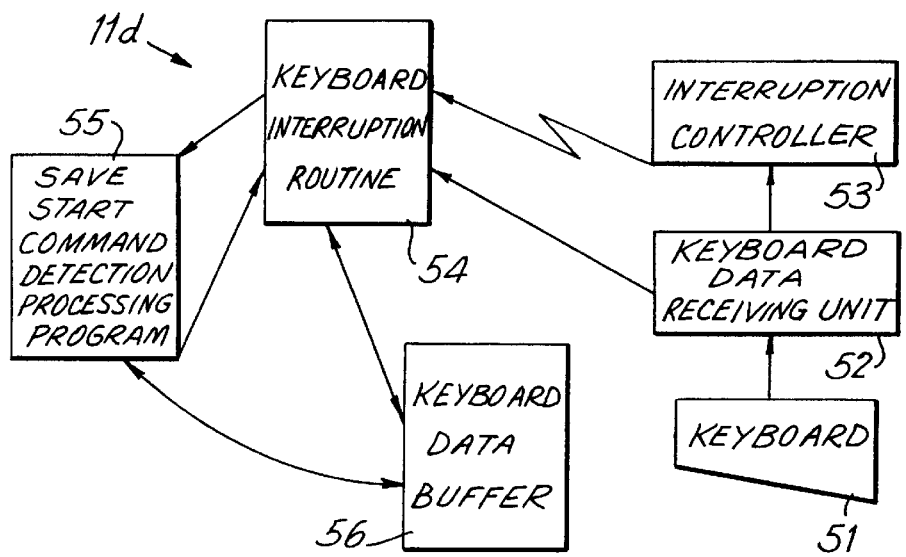
FIG. 5 is a block diagram of a save process start detector constructed in accordance with a fourth embodiment of the invention.
FIG. 6a is a block diagram of a keyboard status byte.
FIG. 6b is a block diagram of a keyboard buffer constructed in accordance with the invention.

Reference is now made of FIG. 5 in which a save process start detector, generally indicated as 11d, constructed in accordance with a fourth embodiment of the invention is provided. Process start detector 11b includes a keyboard 51 which provides an output to keyboard data receiving unit 52. Keyboard data receiving unit 52 provides an output to an interruption controller 53. A keyboard interruption routine receives an interruption output from interruption controller 53 and an input from keyboard data receiving unit 52. Keyboard interruption routine 54 provides an output a keyboard data buffer 56 and to a save start command detection processing program 55. Save start command detection processing program 55 also receives an output from keyboard data buffer 56.

When any key on keyboard 51 is depressed, the keyboard data indicating the depressed key is output from keyboard 51 to keyboard data receiving unit 52. Keyboard data receiving unit 52 sends a keyboard data receiving interruption request signal to interruption controller 53. Interruption controller 53 outputs a keyboard input interruption which activates keyboard interrupt routine 54, so that the keyboard data is read from keyboard data receiving unit 52 and loaded into the keyboard data buffer 56. Keyboard interrupt routine 54 calls save start command detection processing program 55. Save start command detection processing program 55 monitors keyboard data buffer 56 or other information about the keyboard, such as keyboard status, and calls system state saver 12 when the specified state is found.

Reference is now made to FIGS. 6a and 6b illustrating how save start command detection processing program 55 detects the specified state. When during keyboard interruption routine 54, a character such as 'A', for example, is depressed on the keyboard and received as input data, the received character data is loaded into a keyboard buffer 64. The location of the input character within keyboard buffer 64 is indicated as the most recently input character by a buffer top pointer 65. If the next received delta indicates a shift key being depressed (turned on), this data is not loaded into the keyboard buffer 64, and a first bit of keyboard status byte 61 is a shift key status bit 62 having a value of 1. Upon receiving data indicating that the shift key has been released, the shift key status bit 62 is set to 0. Thus, the shift key status bit 62 becomes 1 while the shift key is being depressed, but 0 when it is released. Likewise, the state of a control key is indicated by the control key status bit 63.

Assuming that the instruction provided from the user to start the save processing is given by depressing the shift key and control key simultaneously and further depressing the character 'A', the save start command detection processing program 55 checks whether the shift key status bit 62 and the control key status bit 63 are both set to 1 (turned on), as well as whether the data within the keyboard buffer 64 indicated by the buffer top pointer 65 is "A". If the above three conditions are all satisfied, system state saver 12 is called by save start command detection processing program 55.

As will be apparent from the foregoing embodiments, while save process start detectors 11a, 11b and 11c detect turn off of the power switch, save process start detector 11d detects the instructions input by the user from the keyboard.

Save process start detectors 11a, 11b and 11c may be modified by replacing power switches 21, 31 and 41 with system voltage detection command switches which electrically detect a decrease of the voltage when the system voltage is lowered below a certain reference value. These switches operate in a manner similar to power switches 21, 31, 41 so that system state saver 12 can be activated once low battery state has occurred. The system voltage detection command switches are implemented in consideration of battery cell characteristics, the system state, time dependent decreasing variation of the system and other factors, and detect such a state using the save process start detector when the battery drive system charge capacity of the system becomes lower before shutdown of the system.

The system state information includes the contents of a main memory, I/O status relating to the setting of I/O ports and devices in the system, the CPU state, and the like. The I/O states merely requires that it be explicitly stated in terms of the setting configurations and values. Any method using the information about the I/O ports and the devices may be utilized. In terms of information, however, the I/O status can be handled in a manner similar to the handling of the information representing the state of the main memory and CPU. In the following embodiments of the system state saver, there will be described a method of outputting this information into an external storage.

Figure 7:
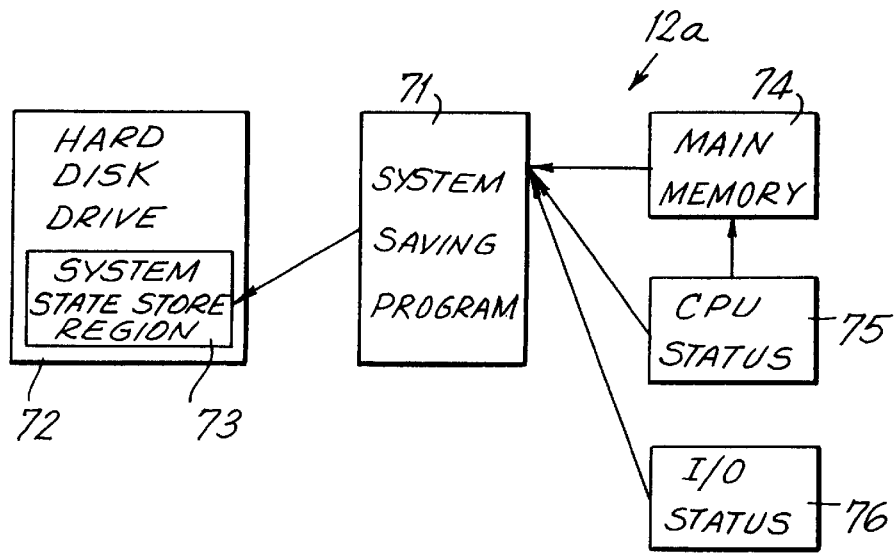
FIG. 7 is a block diagram of a system state saver constructed in accordance with the invention.

Reference is now made to FIG. 7 in which a system state saver, generally indicated as 12a, constructed in accordance with the invention is provided. A system saving program 71 operates on inputs such as I/O status 76, a CPU status 75 from a main memory 74. System savings program 71 provides an information output to a hard disk drive 72. A system state storage 73 is provided within hard disk drive 72.

The contents of main memory 74, CPU status 75 and I/O status 76 are input to system saving program 71. When system saving program 71 is activated, system saving program 71, outputs the content of main memory 74, the CPU status 75 and the I/O status 76 into system state store region 73 within hard disk drive 72. Hard disk drive 72 is an external storage. After completion of that outputting task, the control initiative is transferred to post-save processor 13.

The content of the main memory 74 which is to be transferred need only consist of information sufficient for realizing the system continuity. In general, the memory information that is not managed by the continuity method and mechanism needs to be separately saved in the state as established prior to activation of save process start detector 12.

CPU status 75 is transferred to system state restorer 15, enabling system state restorer 15 to restore the CPU state at the time of last power switch turn off, of an earlier power switch turn off, or at a time instructed by the user. This information is utilized when the power switch is to be a reactivated or when the user provides an instruction. Generally, CPU status 75 is stored in a stack of main memory 74, and hence saved at the same time as the contents of main memory 74. The information is separately saved in a special register or the like within the CPU.

I/O status 76 transfers information about I/O ports and devices, which enables resetting of the I/O ports and devices to the state which existed immediately before activation of save process start detector 11. This information is utilized when the power switch is next reactivated, or when the system state is restored through an instruction from the user. Those parts among the I/O information which remain unchanged irrespective of the state of the power switch are not required to be saved.

System state store region 73 within hard disk drive 72 has a capacity reserved at the time of logical formatting. Only enough capacity to store additional information necessary for completely saving the content of main memory 74, CPU status 75 and I/O status 76 under control is reserved, separating system state store region 73 from the region for storing the disk operating system (hereinafter "DOS") as well as programs and data utilized under DOS. Thus, system state store region 73 is fixedly maintained within hard disk drive 72 to be read by system state restorer 15 means to restore the system state.

Figure 8:
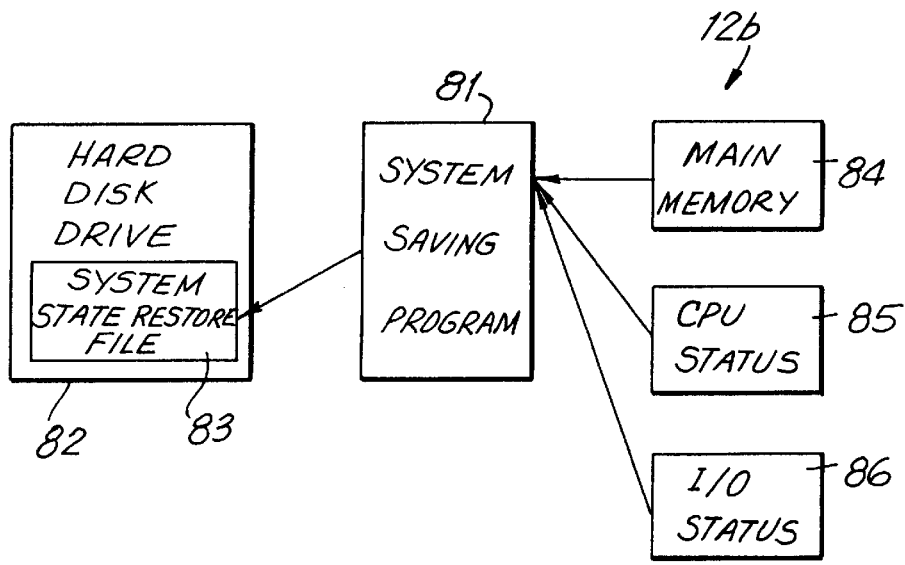
FIG. 8 is a block diagram of a system state saver constructed in accordance with a fifth embodiment of the invention.

Reference is now made to FIG. 8 in which a system state saver, generally indicated as 12b, constructed in accordance with a second embodiment of the invention is provided. System state saver 12b is similar to system state saver 12a, the primary difference being the substitution of a restore file 83 for store region 73. A system saving program 81 receives inputs from main memory 84, the CPU status 85 and the I/O status 86. System saving program 81 then provides an information input to a hard disk drive 82 which includes a system state restore file 83.

When system saving program 81 is activated, it outputs the contents of main memory 84, CPU status 85 and I/O status 86, in the form of a single file, to hard disk drive 82. This file is system state store file 83. Hard disk drive 82 is an external storage. While main memory 84, CPU status 85 and I/O status 86 are the same as those described in connection with the system state saver 12a, system state saver 12b utilizes system state store file 83 instead of system state store region 73 to store this information.

Storing the system state in the form of a file can increase the number of states logically stored. This makes it possible to restore the system not only to the state at the time of last power switch turn off or at the time instructed by the user, but also the system state at the time of an even earlier power switch turn off or at any time instructed by the user. Handling the information in the form of a file also permits ready deletion or correction of the information. Because of the probability of change in the content of the external storage, when restoring the system to a state previous to the last power switch turn off it is required that system state restorer 15 execute the processing without leaving any contradictions.

Figure 9:
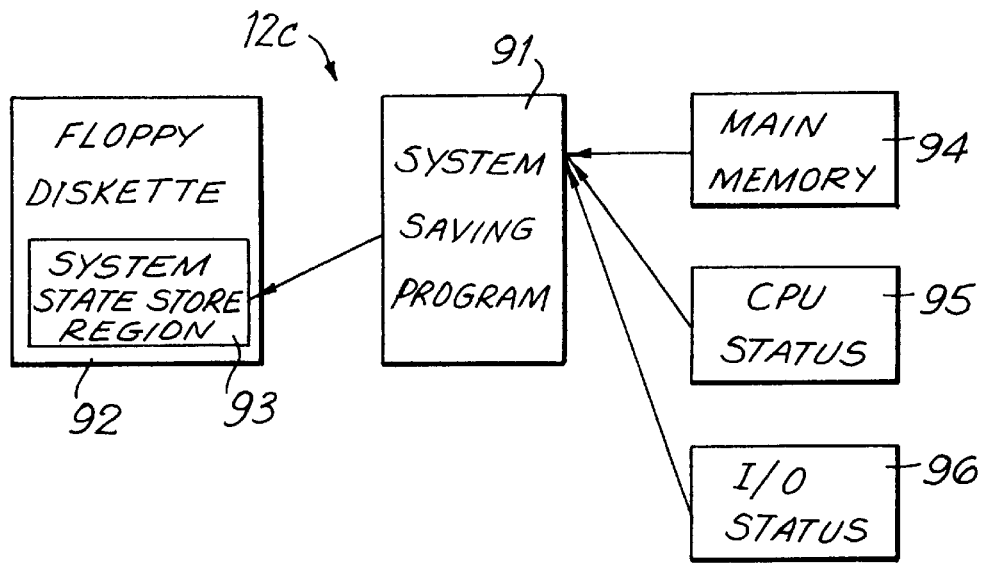
FIG. 9 is a block diagram of a system state saver constructed in accordance with a sixth embodiment of the invention.

Reference is now made to FIG. 9 in which a system state saver, generally indicated as 12c, constructed in accordance with a third embodiment of the invention is provided. System state saver 12c is similar to system state saver 12a, the primary difference being the substitution of a floppy diskette for a hard disk drive. System state saver 12c includes a system saving program 91 which receives as input the contents of main memory 94, the CPU status 95 and the I/O status 96. System saving program 91 outputs information to be stored in a system state storage 93 contained within a floppy diskette 92.

In system state saver 12c hard disk drive 72 of system state saver 12a is replaced with floppy diskette 92. Information such as the contents of main memory 94, CPU status 95 and I/O status 96 is saved in a manner identical to system state saver 12a.

While hard disk drive 72 is fixed to the computer body, the floppy diskette 92 is removable from the computer body and can be replaced as a recording medium. Although system state store region 93 is fixed in one floppy diskette, multiple system states can be recorded and retained using a plurality of floppy diskettes. In this respect, the similar considerations as to system state saver 12b should be paid to system state saver 12c.

Figure 10:
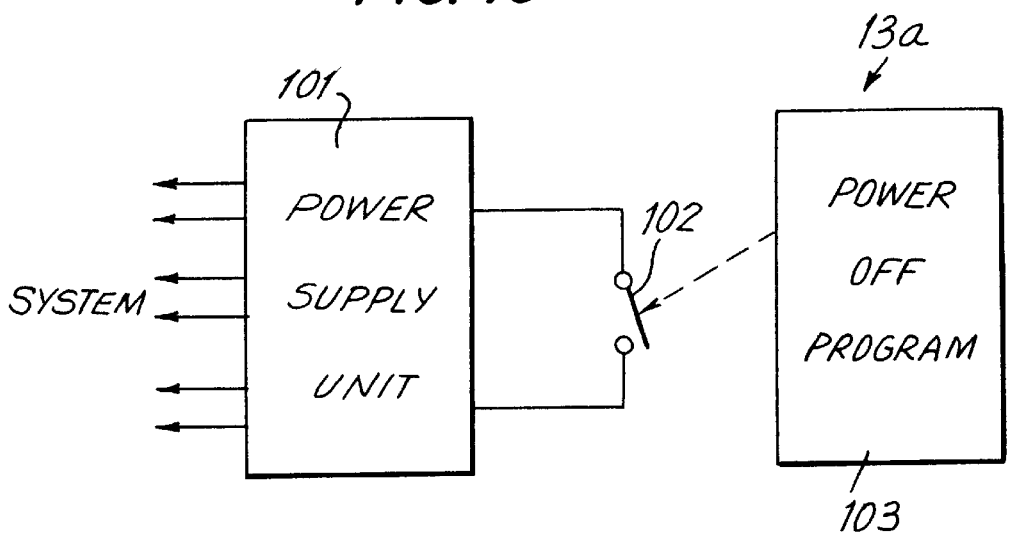
FIG. 10 is a block diagram of a post-save processor constructed in accordance with the invention.

Reference is now made to FIG. 10 in which a post-save processor, generally indicated as 13a, constructed in accordance with the invention is provided. A power supply 101 is controlled by an electric power switch 102. A power off program 103 operates electric power switch 102.

Power supply unit 101 supplies power to the system. Electrical power switch 102 is connected to power supply unit 101 and is capable of disconnecting power supply unit 101 in accordance with software instructions. Power off program 103 provides the software. Upon power off program 103 turning off the electric power switch 102, power supply unit 101 is disconnected and the supply of power to the system is stopped, cutting off the system's power. Thus, post-save processor 13a permits cutting off the power supply to the system using software.

Figure 11:
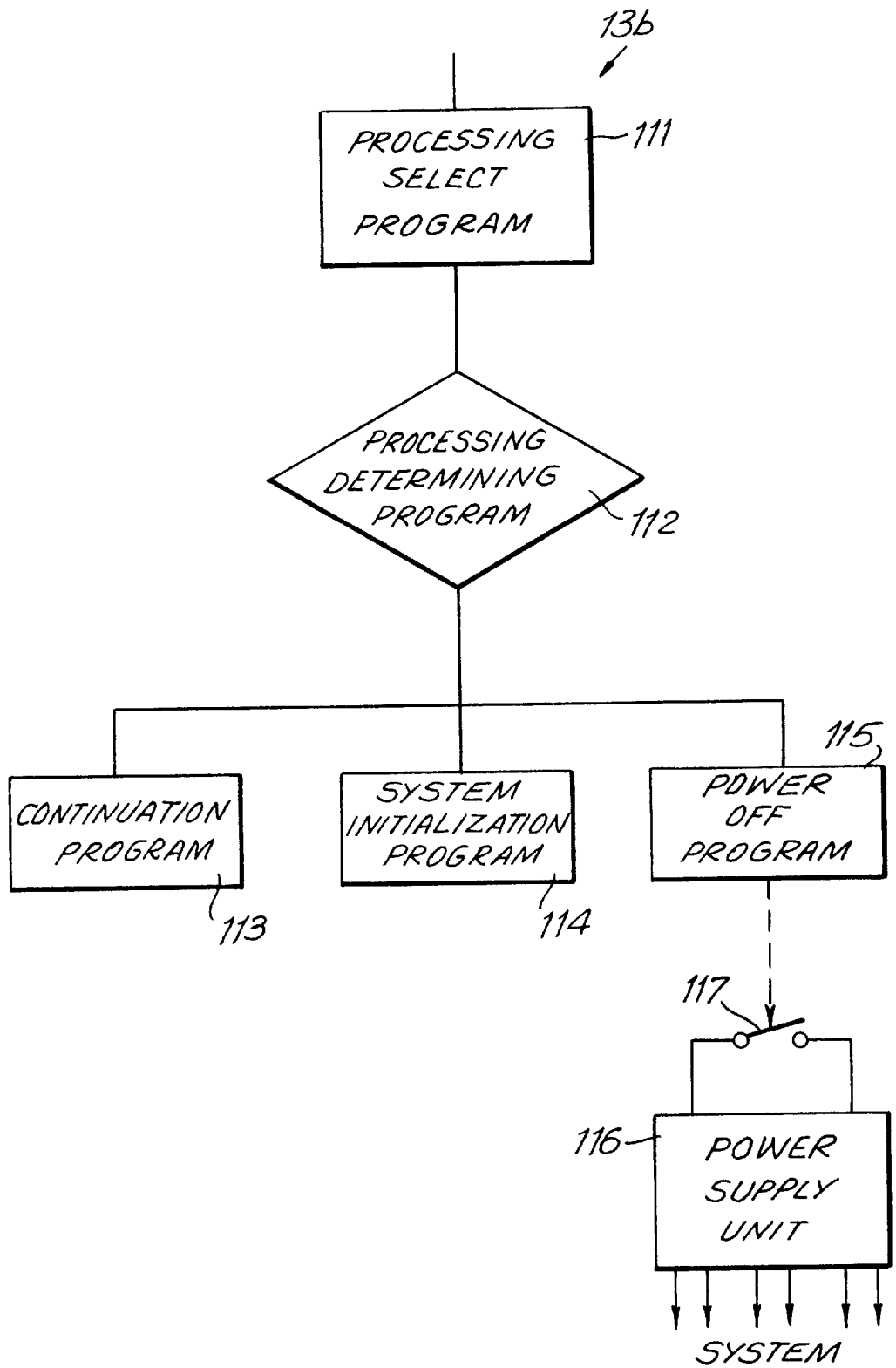
FIG. 11 is a block diagram of a post-save processor constructed in accordance with a seventh embodiment of the invention.

Reference is now made to FIG. 11 in which a post-save processor, generally indicated as 13b, constructed in accordance with the invention is provided. Post-save processor 13b includes a processing select program 111 which causes a processing determining program 112 to select one of a continuation program 113, a system initialization program 114 or a power off program 115. A power supply unit 116 is coupled to an electric power switch 117. Electric power switch 117 is controlled by power off program 115.

Post-save processor 13b enables execution of the processing selected upon an instruction from the user, after the system state has been saved in the external storage. Post-save processor 13b provides three choices to the system user as to the type of processing to be selected. Processing select program 111 displays for the user the types of processing which may be executed after the system state has been saved, and prompts the user to select any one of the choices for instructing the system as to which type of processing is to be executed. If the instruction from the user is appropriate, processing determination program 112 executes the selected processing program. In an exemplary embodiment three choices of processing are utilized: 1) continue the same previous processing after it has been saved; 2) initialize the system and raise it from the beginning; and 3) cut off the power. Depending on which of the three choices are selected continuation program 113, system initialization program 114 or power off program 115 is executed.

Continuation program 113 allows continuation of the processing which was being executed before activation of save process start detector 11. In this case, it is required to eliminate the cause with which the save process start detecting means was activated, or to prevent the save process start detecting means from being immediately operated again.

System initialization program 114 initializes the system. In practice, the control is advanced to a previously prepared initialization routine.

Power off program 115 cuts off the power for the system in a manner similar to post-save processor 13a.

Once the system has been turned off, a time will arise when it is desired that processing continue. At that time, the system will be reactivated. Restore process starter 14 executes restoring of the system state upon the powering on of the system or upon instruction from the user.

Reference is now made to FIG. 12 in which a restore processor starter, generally indicated as 14a constructed in accordance with the invention is provided. A power on processing program 121 operates upon receipt of a power on indication and provides an output to a bootstrap loader 122. A process start determination program 123 receives an input from bootstrap loader 122 and determines whether to restore the system to the condition prior to power cut off or to perform processing in accordance with instructions by user.

When the system power is turned on, the power on processing program 121 starts operating to perform a basic system check confirm and fixedly define the system configuration, as well as initialize the I/O ports and the devices, such as RAM, making up the system. Messages or the like are delivered, as required, to report the system state. Bootstrap loader 122 is activated by power on processing program 121 to load an operating system. After loading, the control initiative is usually transferred to the loaded operating system or the loader contained therein for raising the operating system. With restore process starter 14a, however, the control is advanced to process start determination program 123 to confirm whether processing can be continued. If processing is to continue, system state restorer 15 is activated either directly or after receiving an instruction from the user for confirmation.

For determining the continuity, process start determination program 123 checks whether the system state has been saved by system state saver 13. System state restorer 15 can be activated either after waiting for confirmation by the user or without conditions. Whether to continuously execute the processing is determined by the user in the former case, whereas in the latter the processing runs continuously at all times.

Reference is now made to FIG. 13 in which a restore process starter, generally indicated as 14b constructed in accordance with another embodiment of the invention is provided. A processing start program 131 is provided as one of the commands for DOS and runs system state restorer 15 if the system state has been saved by system state saver 12. If the system state has not yet been saved, processing start program 131 issues a message or the like to inform the user that the system state cannot be restored.

Reference is now made to FIG. 14 in which a system state restorer generally indicated as 15a, constructed in accordance with the invention is provided. System state restorer 15a includes a hard disk drive 142 which includes a system state storage 143. System state storage 143 provides information to a system restoring program 141 which provides respective outputs to a main memory 144, a CPU status 145 and I/O status 146.

System state restorer 15a cooperates with the system state saver 12a in pair. When system restoring program 141 is activated, the system restoring program reads the system state, which has previously been saved by system state saver 12a, from system state store region 143 within the hard disk drive 142. Thereby the system state such as the contents of main memory 144, CPU status 145 and I/O status 146 are restored to their respective preceding status. CPU status 145 is completely restored to its original state in a final step of post-restore processor 16, and that state in the final step is held as CPU status 145. I/O status 146 is primarily restored by system state restorer 15a, but the status may be changed in a final step performed by post-restore processor 16. Such changes are coordinated by post-restore processor 16 to completely restore I/O status 146 to the preceding state.

Reference is now made to FIG. 15 in which a system state restorer, generally indicated 15b, constructed in accordance with the invention is provided. System state restorer 15b is similar to system state restorer 15a, the primary difference being the substitution of a system store file for a system state store region. System state restore 15b includes a hard disk drive 152 containing a system state store file 153 which is read by a system restoring program 151. System restoring program 141 then provides an output to a main memory 154, a CPU status 155 and I/O status 156 respectively.

System state restorer 15b cooperates with system state saver 12b in pair. When system restoring program 151 is activated, system restoring program 151 reads the system state, which has been previously saved by the system state saver 12b, from system state store file 153 within hard disk drive 152. Thereby the system state such as the content of main memory 154, CPU status 155 and I/O status 156 are restored to the state prior to the power switch turn off. The restoring method is the same as utilized by system state restorer 15a. As stated in connection with system state saver 12b, in some cases there are present a plurality of system state store files. In such cases, it is required to arrange system restoring program 151 for restoring the system state that was last saved, or for displaying the list of files to the user to prompt selection of any one file.

Reference is now made FIG. 16 in which a system state restorer, generally indicated as 15c, constructed in accordance with the invention is provided. System state restorer 15c includes a floppy diskette 152 having a system state store region 163. Information is read from system state store region 163 by a system restoring program 161. This information is then transmitted to a main memory 164, a CPU status 165 and I/O status 166 respectively.

System state restoring means 15c cooperates with system state saver 12c in pair. When system restoring program 161 is activated, system restoring program 161 reads the system state, which has been saved by the system state saver 12c, out of system state store region 163 of floppy diskette 162. Thereby, the system state including the main memory, CPU, and I/O ports are restored in accordance with the contents of main memory 164, CPU status 165 and I/O status 166; the previous system status. The restoring method is the same as that for the system state restorer 15a.

Reference is now made to FIG. 17 in which a post restore processor, generally indicated as 16a, constructed in accordance with the invention is provided. Post restore processor 16a is a continuation processing program 171. After the system state corresponding to the preceding state has been stored by the system state restorer 15, the system control is advanced to continuation processing program 171. Continuation processing program 171 coordinates a change in the system state restored by system state restorer 16 into the final state allowing the continuation of processing, as required. Continuation processing program 171 then advances the control to the program at the point immediately after operation of the save process start detector 11. At this time, the system is already restored to the preceding state, so that the program which was previously being executed is finally run in a continued manner.

Reference is now made to FIG. 18 in which a post-restore processor, generally indicated as 16b, constructed in accordance with the invention is provided. Post restore processor 16b includes a processing select program 181. Processing select program 182 selects between one of a continuation processing program 183 and a continuation break program 184.

Post-restore processor 16b allows the user to instruct which type of processing is to be executed, after the system state has been restored by system state restorer 15. Post-restore processor 16b provides two choices as to the processing types to be selected. Processing select program 181 displays for the user the types of processing which may be executed after restoring of the system state, and prompts the user to select any one of the choices for instructing which type of processing is to be executed. If the instruction is appropriate, processing determination program 182 executes the selected processing program. In an exemplary embodiment, two types of processing are available: 1) restore the system to the preceding state for continuation of the processing; and 2) discontinue the processing and then return to the command mode of DOS. Depending on which choice is selected one of continuation processing program 183 or continuation break program 184 is executed.

Continuation processing program 183 is the same as continuation program 171 for continuing processing. Continuation break program 184 returns the processing to the usual command mode of DOS. Accordingly, continuation of the processing is suspended.

Figure 19:
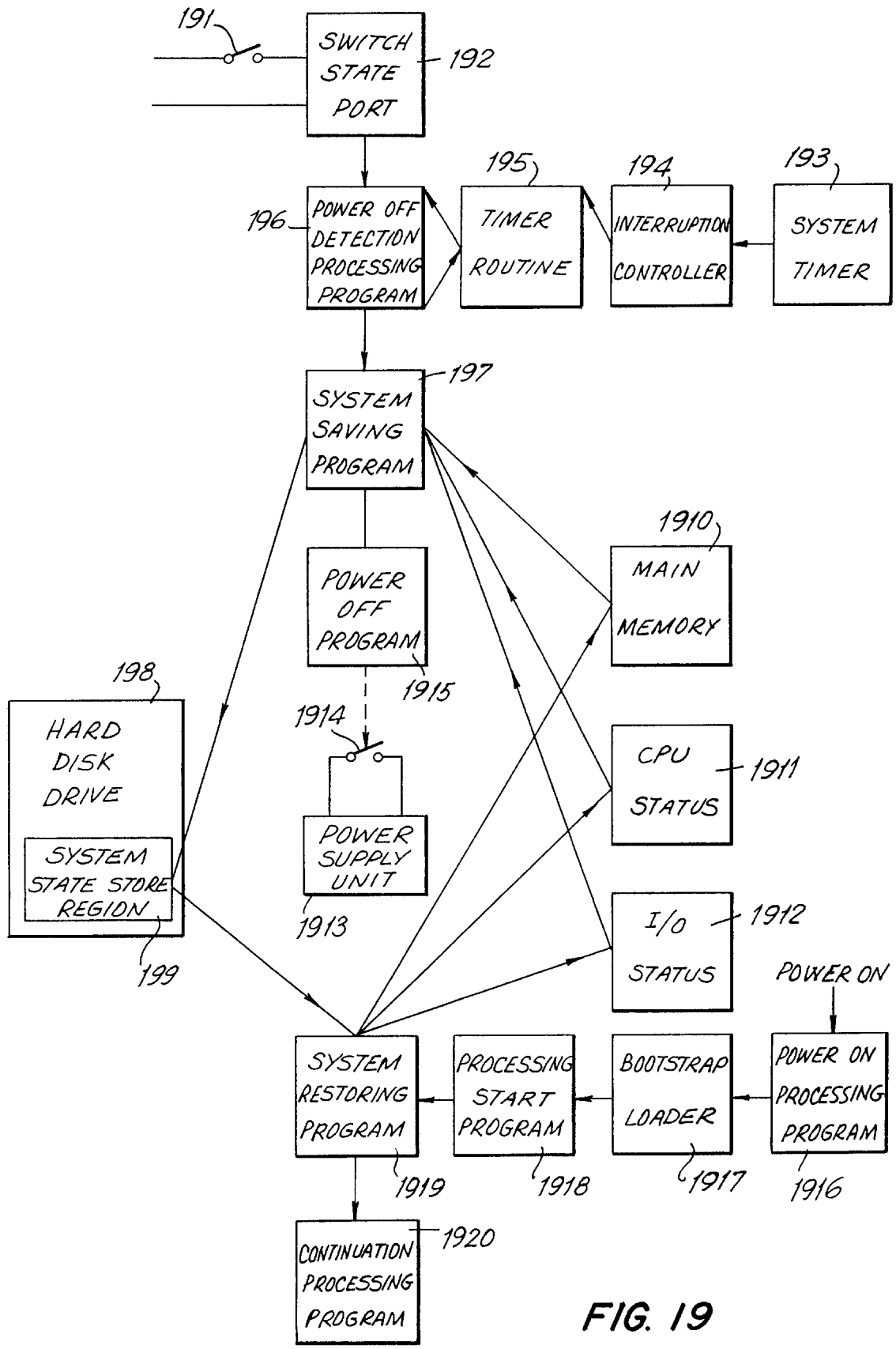
FIG. 19 is a block diagram of an apparatus for providing continuity of operation in a computer constructed in accordance with another embodiment of the present invention.

Each element 11, 12, 13, 14, 15, 16 of the apparatus for providing continuity of operation in a computer has been defined above. Reference is now made to FIG. 19 in which an apparatus for providing continuity of operation in a computer constructed in accordance with the invention including save process start detector 11b, system state saver 12a, post-save processor 13a, restore processor 14a, system state restorer 15a and post restore processor 16a is provided.

When a power switch 191 is turned off by the user, a switch state port 192, connected to power switch 191 and capable of reading the power switch state utilizing a program, indicates that power switch 191 has been turned off.

Simultaneously a system timer 193 sends an interruption request signal at predetermined intervals to an interruption controller 194, so that interruption controller 194 causes a timer interruption during an interruptible state. A timer routine 195 is activated in response to the interruption request, to carry out the necessary processing such as updating of a counter. A power-off detection processing program 196 is called by timer routine 195. Power-off detection processing program 196 reads switch state port 192, when it is allowed to detect the power switch state and continue the processing. If power switch 191 is turned off, power off detection program 196 activates a system saving program 197. If power switch 191 is turned on, power off detection program 196 returns the control back to timer routine 195 to terminate the timer interruption processing.

System saving program 197 receives inputs from main memory 1910, the CPU status 1911, and the I/O status 1912. System saving program 197 then outputs the contents of main memory 1910, CPU status 1911 and I/O status 1912 into a system state store region 199 within a hard disk drive 198. Hard disk drive 198 is an external storage. After completion of outputting a power-off program 1915 is activated. Main memory 1910, CPU status 1911, and I/O status 1912, contain information defined in connection with system state saver 12a.

A power supply unit 1913 supplies power to the system. An electrical power switch 1914 is connected to power supply unit 1913 and capable of disconnecting the power supply unit 1913 in conjunction with software instructions supplied by a power off program 1915. Upon turning off the electric power switch 1914 by power-off program 1915 power supply unit 1913 is disconnected and the supply of power to the system is stopped. Thus, the power for the system is cut off.

Next, when the system power is turned on, a power on processing program 1916 starts operating to perform a basic system check, confirm and fixedly define the system configuration, as well as initialize the I/O ports and the devices, such as RAM, which constitute the system. A bootstrap loader 1917 is then activated to load an operating system, DOS. Subsequently, a process start determination program 1918 is activated to determine whether the processing can be continued. If so, the control is advanced to a system restoring program 1919.

The system restoring program 1919 reads the system state, which has been previously saved by system saving program 197, from system state store region 199 within hard disk drive 198. Thereby the system state including the contents of main memory 1910, CPU status 1911, I/O status 1912 and the like is restored to the state which existed when the power switch was last turned off. The conditions to be established in restoring the contents of main memory 1910, CPU status 1911, I/O status 1912, and the like are as set forth in connection with system state restorer 15.

In order for system restoring program 1919 to completely restore the system state by returning the control to the point under the command executed when the power was last cut off, i.e. immediately after interruption of timer routine 195, without any contradictions, the final system state is coordinated by a continuation processing program 1920 so that the control is returned to the state which existed immediately after interruption of timer routine 195. In this way, continuation of the processing which has been suspended midway by cut off of the power may be achieved.

Figure 20:
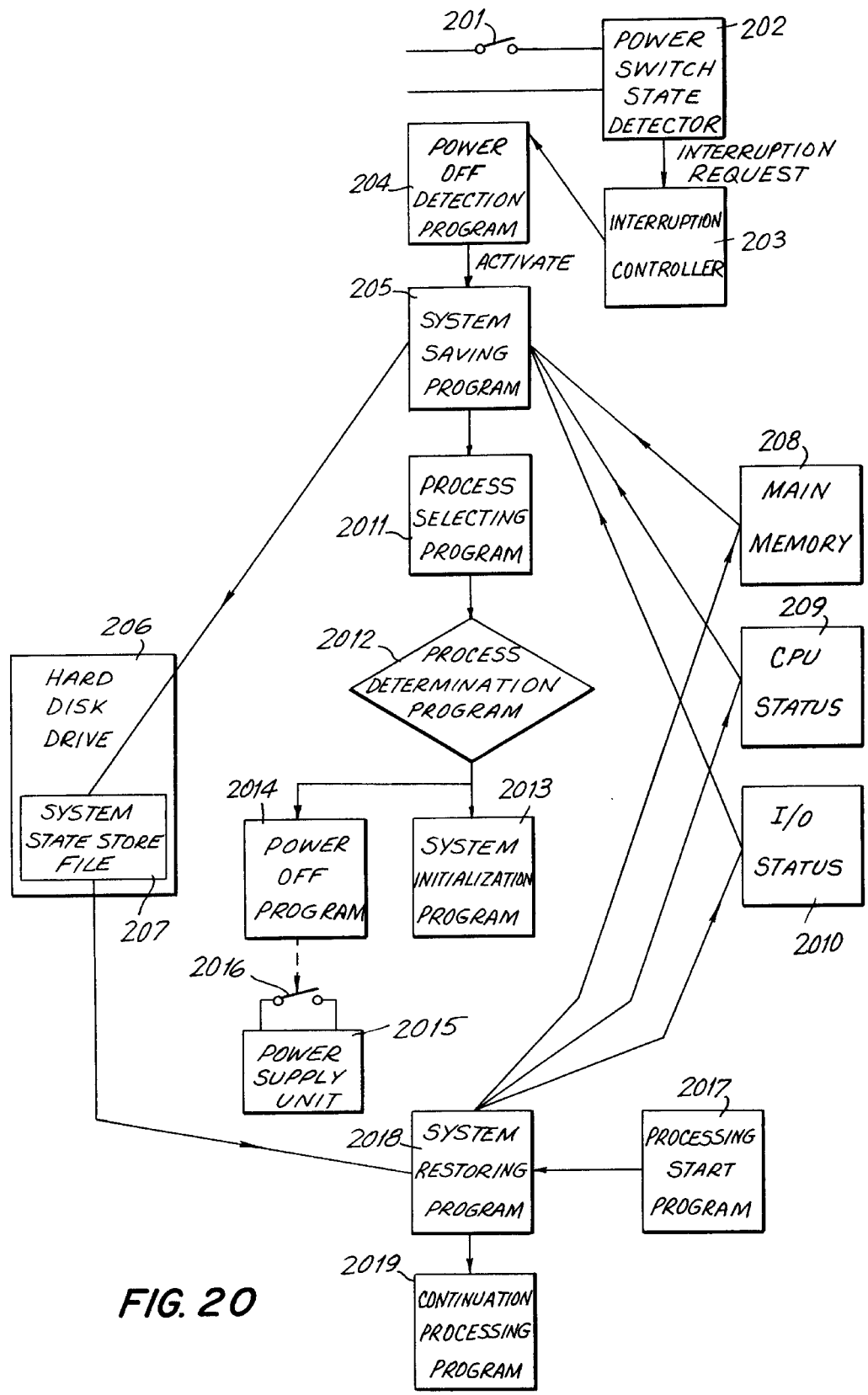
FIG. 20 is a block diagram of an apparatus for providing continuity of operation in a computer constructed in accordance with still another embodiment of the present invention.

Reference is now made to FIG. 20 in which a second embodiment of the apparatus for providing continuity of operation in a computer is provided. This embodiment of the apparatus includes save process start detector 11a, system state saver 12b, post save processor 13b, restore processor 14b, system state restorer 15b and post restore processor 16a.

When a power switch 201 is turned off, a power switch state detector 202 detects the turning off of power switch 201 and issues a signal requesting an interruption to an interruption controller 203 in accordance with the cut off of power. Upon receiving the signal, interruption controller 203 causes an interruption indicating power cut off during an interruptible state. In response to the interruption, a power off detection program 204 and then a system saving program 205 are activated.

System saving program 204 receives information from a main memory 208, a CPU status 209 and an I/O status 210. System saving program 205 then outputs the contents of main memory 208, CPU status 209 and I/O status 2010, in the form of a single file, to a hard disk drive 206. This file is system state store file 207. Hard disk drive 206 is an external storage. A processing select program 2011 is activated after completion of outputting. Main memory 208, CPU status 209, and I/O status 2010 are structured as explained in connection with system state saver 12b. Additionally, the parameters of concern in handling the file are those explained in connection with system state saver 12b.

After the system state has been saved a process selecting program 2011 displays for the user choices for allowing the user to select the type of processing to be executed, and then waits for an instruction from the user. In this embodiment by way of example, there are provided two processing choices: 1) initialize the system and raise it from the beginning; and 2) cut off the power. Depending on selection of one of the two choices, processing determination program 2012 activates one of a system initialization program 2013 or a power off program 2014. System initialization program 2013 initializes the system. In practice, the control is advanced to a previously prepared initialization routine. Power off program 2014 operates an electric power switch 2016 to disconnect the power supply unit 2015, so that the supply of power to the system is cut off, as with the foregoing embodiment.

Next, the system power is turned on to raise the system and activate a processing start program 2017 with the command of the operating system, whereupon processing start program 2017 in turn activates a system restoring program 2018. System restoring program 2018 reads the system state, which has been previously saved by system saving program 205, from system state store file 207 within hard disk drive 206. Thereby the system state including the contents of main memory 208, CPU status 209, I/O status 2010, and the like are restored to the state existing when power switch 201 was last turned off. The parameters to take into consideration in restoring the content of main memory 208, CPU status 209, I/O status 2010 and the like are the same as set forth in connection with system state restorer 15b. Also, the parameters to take into consideration including a plurality of system state store files are as described in connection with system state restorer 15b.

For system restoring program 2018 to completely restore the system state by returning the control to the process step just before the command executed immediately before the power was last cut off, i.e. immediately after interruption of power off detection program 204, or to the process step being operated when the process was suspended, without any contradictions, the final system state is coordinated by a continuation processing program 2019. In this way the control is returned to the state which existed immediately after interruption of power off detection program 204.

While various embodiments of the present invention halve been described above, it will be understood and taken into account that even in light of the practical implementations of the respective elements and the combinations thereof that there still exist many other embodiments of the present invention, in addition to the illustrated embodiments. For example, the external storage need not be limited to hard disk drives and floppy disk drives, but may include IC cards, compact disk drives, tapes, or the like. The system state to be saved can be determined dependent on the need for being reduced in the amount thereof.

In any of these embodiments, the present invention can provide an inexpensive and reliable continuity device for computers, which is necessitated to fully take advantage of the portable nature of small-sized, battery driven computers which are likely to become more commonly used in future, thereby making it possible to improve performance and convenience of that computer type.

It will thus be seen that the objects set forth above, among those made apparent from the preceding description, are efficiently attained and, since certain changes may be made in carrying out the above method and in the constructions set forth without departing from the spirit and scope of the invention, it is intended that all matter contained from the above description or shown in the accompanying drawings shall be interpreted as illustrative and not in a limiting sense.

It is also to be understood that the following claims are intended to cover all of the generic and specific features of the invention herein described and all statements of the scope of the invention which, as a matter of language might be said to fall therebetween.

What is claimed:

1. An apparatus for providing continuity of operation in a system which exhibits a system condition and which performs a process, the system including a CPU having a status, a main memory for storing data and a power supply for supplying power to said system, said apparatus for providing continuity comprising:

save process start detecting means for detecting a demand to begin a save process initiated by a user and producing a demand signal, said save process start detecting means including user instruction input means to provide a user input, said user input indicating a demand to begin a save process and said save process start detecting means producing said demand signal in response to said user input indicating a demand to begin a save process;

non-volatile memory means for storing data representing the condition of said system including a fixedly reserved system state store region;

system state saving means coupled to said save process start detecting means for receiving said demand signal, and coupled to said CPU and said main memory for receiving a CPU status corresponding to the status of said CPU at the time of said demand and the data in said memory at the time of said demand, the CPU status and data representing a condition of said system at an occurrence of said demand, and being further coupled to said non-volatile memory means for storing said system condition in said non-volatile memory means in response to said demand signal to the extent necessary to restore said system to enable said apparatus to continue processing based on said stored system condition said system state saving means storing said system condition in said fixedly reserved system state store region of said non-volatile memory means;

post-save processing means coupled to said system state saving means for performing processing after said system state saving means has completely output said system condition to said non-volatile memory means.

2. An apparatus for providing continuity of operation in a system which exhibits a system condition and which performs a process, the system including a CPU having a status, a main memory for storing data and a power supply for supplying power to said system, said apparatus for providing continuity comprising:

save process start detecting means for detecting a demand to begin a save process initiated by a user and producing a demand signal, said save process start detecting means including user instruction input means to provide a user input, said user input indicating a demand to begin a save process and said save process start detecting means producing said demand signal in response to said user input indicating a demand to begin a save process;

non-volatile memory means for storing data representing the condition of said system including a contiguous system state store region within said non-volatile memory means;

system state saving means coupled to said save process start detecting means for receiving said demand signal, and coupled to said CPU and said main memory for receiving a CPU status corresponding to the status of said CPU at the time of said demand and the data in said memory at the time of said demand, the CPU status and data representing a condition of said system at an occurrence of said demand, and being further coupled to said non-volatile memory means for storing said system condition in said non-volatile memory means in response to said demand signal to the extent necessary to restore said system to enable said apparatus to continue processing based on said stored system condition, said system state saving means storing said system condition in said contiguous system state store region of said non-volatile memory means;

post-save processing means coupled to said system state saving means for performing processing after said system state saving means has completely output said system condition to said non-volatile memory means.

3. An apparatus for providing continuity of operation in a system which exhibits a system condition and which performs a process, the system including a CPU having a status, a main memory for storing data and a power supply for supplying power to said system, said apparatus for providing continuity comprising:

save process start detecting means for detecting a demand to begin a save process initiated by a user and producing a demand signal, said save process start detecting means including user instruction input means to provide a user input, said user input indicating a demand to begin a save process and said save process start detecting means producing said demand signal in response to said user input indicating a demand to begin a save process;

non-volatile memory means for storing data representing the condition of said system;

system state saving means coupled to said save process start detecting means for receiving said demand signal, and coupled to said CPU and said main memory for receiving a CPU status corresponding to the status of said CPU at the time of said demand and the data in said memory at the time of said demand, the CPU status and data representing a condition of said system at an occurrence of said demand, and being further coupled to said non-volatile memory means for storing said system condition in said non-volatile memory means in response to said demand signal to the extent necessary to restore said system to enable said apparatus to continue processing based on said stored system condition; and post-save processing means coupled to said system state saving means for performing processing after said system state saving means has completely output said system condition to said non-volatile memory means and including process selecting means operatively coupled to said system state saving means for displaying to a user a plurality of processes which may be executed after said system condition has been stored in said non-volatile memory means, and process determination means for permitting selection of one of said plurality of displayed processes in accordance with an input from said user, at least one of said processes being continuing with the current process.

4. An apparatus for providing continuity of operation in a system which exhibits a system condition and which performs a process, the system including a CPU having a status, a main memory for storing data and a power supply for supplying power to said system, said apparatus for providing continuity comprising:

save process start detecting means for detecting a demand to begin a save process initiated by a user and producing a demand signal, said save process start detecting means including user instruction input means to provide a user input, said user input indicating a demand to begin a save process and said save process start detecting means producing said demand signal in response to said user input indicating a demand to begin a save process;

non-volatile memory means for storing data representing the condition of said system;

system state saving means coupled to said save process start detecting means for receiving said demand signal, and coupled to said CPU and said main memory for receiving a CPU status corresponding to the status of said CPU at the time of said demand and the data in said memory at the time of said demand, the CPU status and data representing a condition of said system at an occurrence of said demand, and being further coupled to said non-volatile memory means for storing said system condition in said non-volatile memory means in response to said demand signal to the extent necessary to restore said system to enable said apparatus to continue processing based on said stored system condition;

post-save processing means coupled to said system state saving means for performing processing after said system state saving means has completely output said system condition to said non-volatile memory means;

restore process start means coupled to said power supply for detecting when said power supply is turned on and outputting a detection signal in response thereto;

process selecting means operatively coupled to said restore process start means for displaying to a user a plurality of processes which may be executed, at least one of said displayed processes being continuing the operation of said process after the system condition has been restored; and system state restoring means coupled to said non-volatile memory means for reading said system condition therefrom, and coupled to said CPU and said main memory for restoring said CPU and said main memory to the system condition stored in said non-volatile memory means when said demand was detected by said save process start detecting means.

5. An apparatus for providing continuity of operation in a system which exhibits a system condition and which performs a process, the system including a CPU having a status, a main memory for storing data and a power supply for supplying power to said system, said apparatus for providing continuity comprising:

save process start detecting means for detecting a demand to begin a save process initiated by a user and producing a demand signal, said save process start detecting means including user instruction input means to provide a user input, said user input indicating a demand to begin a save process and said save process start detecting means producing said demand signal in response to said user input indicating a demand to begin a save process;

non-volatile memory means for storing data representing the condition of said system;

system state saving means coupled to said save process start detecting means for receiving said demand signal, and coupled to said CPU and said main memory for receiving a CPU status corresponding to the status of said CPU at the time of said demand and the data in said memory at the time of said demand, the CPU status and data representing a condition of said system at an occurrence of said demand, and being further coupled to said non-volatile memory means for storing said system condition in said non-volatile memory means in response to said demand signal to the extent necessary to restore said system to enable said apparatus to continue processing based on said stored system condition;

post-save processing means coupled to said system state saving means for performing processing after said system state saving means has completely output said system condition to said non-volatile memory means;

restore process start means coupled to said power supply for detecting when said power supply is turned on and outputting a detection signal in response thereto;

process selecting means operatively coupled to said restore process start means for receiving said detection signal, said process selecting means displaying to a user, in response to said detection signal, a plurality of saved system conditions stored in said non-volatile memory means from which said system may be restored;

process determination means for permitting selection of one of said plurality of displayed saved system conditions in accordance with an input from said user; and system state restoring means coupled to said process determination means for receiving said selection, coupled to said non-volatile memory means for reading said selected one of said plurality of saved system conditions therefrom, and coupled to said CPU and said main memory for restoring said CPU and said main memory to said selected system condition.

6. An apparatus for providing continuity of operation in a system which exhibits a system condition and which performs a process, the system including a CPU having a status, a main memory for storing data and a power supply for supplying power to said system, said apparatus for providing continuity comprising:

save process start detecting means for detecting a demand to begin a save process and producing a demand signal in response thereto;

non-volatile memory means for storing data representing the condition of said system, said non-volatile memory means including a fixedly reserved system state store region;

system state saving means coupled to said save process start detecting means for receiving said demand signal, and coupled to said CPU and said main memory for receiving a CPU status corresponding to the status of said CPU at the time of said demand and the data in said memory at the time of said demand, the CPU status and data representing a condition of said system at an occurrence of said demand, and being further coupled to said non-volatile memory means for storing said system condition in said non-volatile memory means in response to said demand signal to the extent necessary to restore said system to enable said apparatus to continue processing based on said stored system condition said system state saving means storing said system condition in said fixedly reserved system state store region of said non-volatile memory means; and post-save processing means coupled to said system state saving means for performing processing after said system state saving means has completely output said system condition to said non-volatile memory means.

7. The apparatus for providing continuity of operation of claim 6, wherein said save process start detecting means further includes a power switch having an on state and an off state, and power off detection processing means for reading the power switch state indicated by said switch and producing a demand signal when said power switch state is in an off state.

8. The apparatus for providing continuity of operation of claim 6, wherein said power supply further includes a battery having a voltage, and said save process start detecting means includes a battery voltage detection processing means for detecting the voltage of the battery and producing a demand signal when said voltage falls below a predetermined value.

9. The apparatus for providing continuity of operation of claim 6, wherein said demand to begin a save process is initiated by a user, and wherein said save process start detecting means further includes user instruction input means to provide a user input, said user input indicating a demand to begin a save process and wherein said save process start detecting means produces said demand signal in response to said user input indicating a demand to begin a save process.

10. The apparatus for providing continuity of operation of claim 6, wherein said fixedly reserved system state store region is a contiguous store region within said non-volatile memory means.

11. The apparatus for providing continuity of operation of claim 6, wherein said post-save processing means is further coupled to said power supply and turns off said power supply after said system state saving means has completely stored said system condition to said non-volatile memory means.

12. The apparatus for providing continuity of operation of claim 6, wherein said post-save processing means further includes process selecting means operatively coupled to said system state saving means for displaying to a user a plurality of processes which may be executed after said system condition has been stored in said non-volatile memory means, and process determination means for permitting selection of one of said plurality of displayed processes in accordance with an input from said user, at least one of said processes being continuing with the current process.

13. The apparatus for providing continuity of operation of claim 6, further comprising:
restore process start means coupled to said power supply for detecting when said power supply is turned on and outputting a detection signal in response thereto; and
system state restoring means coupled to said restore process start means for receiving said detection signal, coupled to said non-volatile memory means for reading said system condition therefrom, and coupled to said CPU and main memory for restoring, in response to said detection signal, said CPU and main memory to the system condition stored in said non-volatile memory means, whereby said process can be continued based on said system condition stored when said demand was detected by said save process start detecting means.

14. The apparatus for providing continuity of operation of claim 6, further comprising:
restore process start means coupled to said power supply for detecting when said power supply is turned on and outputting a detection signal in response thereto;
process selecting means operatively coupled to said restore process start means for displaying to a user a plurality of processes which may be executed, at least one of said displayed processes being continuing the operation of said process after the system condition has been restored; and
system state restoring means coupled to said non-volatile memory means for reading said system condition therefrom, and coupled to said CPU and said main memory for restoring said CPU and said main memory to the system condition stored in said non-volatile memory means when said demand was detected by said save process start detecting means.

15. The apparatus for providing continuity of operation of claim 6, further comprising:
restore process start means coupled to said power supply for detecting when said power supply is turned on and outputting a detection signal in response thereto;
process selecting means operatively coupled to said restore process start means for receiving said detection signal, said process selecting means displaying to a user, in response to said detection signal, a plurality of saved system conditions stored in said non-volatile memory means from which said system may be restored;
process determination means for permitting selection of one of said plurality of displayed saved system conditions in accordance with an input from said user; and
system state restoring means coupled to said process determination means for receiving said selection, coupled to said non-volatile memory means for reading said selected one of said plurality of saved system conditions therefrom, and coupled to said CPU and said main memory for restoring said CPU and said main memory to said selected system condition.

16. The apparatus for providing continuity of operation of claim 6, further comprising:
restore process start means coupled to said power supply for detecting when said power supply is turned on and outputting a detection signal in response thereto;
process start determination means coupled to said restore process start means for receiving said detection signal, said process start determination means confirming, in response to said detection signal, whether processing can be continued from a system condition saved in said non-volatile memory means and outputting a confirmation if said processing can continue;
system state restoring means coupled to said process start determination means, coupled to said non-volatile memory means for reading said system condition therefrom, and coupled to said CPU and main memory for restoring said CPU and main memory to the system condition stored in said non-volatile memory means in response to said confirmation from said process start determination means that processing can be continued from a system condition saved in said non-volatile memory means; and
post-restore processing means coupled to said system state restoring means for determining when the CPU and main memory are restored to the system condition which existed at the time of said demand to begin a save process, and coupled to said CPU and main memory for controlling the operation of said process after the system state restoring means has restored said system condition, said post-restore processing means continuing said process based on said system condition stored when said demand was detected by said save process start detecting means.

17. An apparatus for providing continuity of operation in a system which exhibits a system condition and which performs a process, the system including a CPU having a status, a main memory for storing data and a power supply for supplying power to said system, said apparatus for providing continuity comprising:

save process start detecting means for detecting a demand to begin a save process and producing a demand signal;

non-volatile memory means for storing data representing the condition of said system, said non-volatile memory means including a contiguous system state store region within said non-volatile memory means;

system state saving means coupled to said save process start detecting means for receiving said demand signal, and coupled to said CPU and said main memory for receiving a CPU status corresponding to the status of said CPU at the time of said demand and the data in said memory at the time of said demand, the CPU status and data representing a condition of said system at an occurrence of said demand, and being further coupled to said non-volatile memory means for storing said system condition in said non-volatile memory means in response to said demand signal to the extent necessary to restore said system to enable said apparatus to continue processing based on said stored system condition said system state saving means storing said system condition in said contiguous system state store region of said non-volatile memory means; and post-save processing means coupled to said system state saving means for performing processing after said system state saving means has completely output said system condition to said non-volatile memory means.

18. The apparatus for providing continuity of operation of claim 17, wherein said save process start detecting means further includes a power switch having an on state and an off state, and power off detection processing means for reading the power switch state indicated by said switch and producing a demand signal when said power switch state is in an off state.

19. The apparatus for providing continuity of operation of claim 17, wherein said power supply includes a battery having a voltage, and said save process start detecting means includes a battery voltage detection processing means for detecting the voltage of the battery and producing a demand signal when said voltage falls below a predetermined value.

20. The apparatus for providing continuity of operation of claim 17, wherein said demand to begin a save process is initiated by a user, and wherein said save process start detecting means further includes user instruction input means to provide a user input, said user input indicating a demand to begin a save process and wherein said save process start detecting means produces said demand signal in response to said user input indicating a demand to begin a save process.

21. The apparatus for providing continuity of operation of claim 17, wherein said contiguous system state store region is a reserved store region within said non-volatile memory means.

22. The apparatus for providing continuity of operation of claim 17, wherein said contiguous system state store region includes a file within said non-volatile memory means.

23. The apparatus for providing continuity of operation of claim 17, wherein said post-save processing means is further coupled to said power supply and turns off said power supply after said system state saving means has completely stored said system condition to said non-volatile memory means.

24. The apparatus for providing continuity of operation of claim 17, wherein said post-save processing means further includes process selecting means operatively coupled to said system state saving means for displaying to a user a plurality of processes which may be executed after said system condition has been stored in said non-volatile memory means, and process determination means for permitting selection of one of said plurality of displayed processes in accordance with an input from said user, at least one of said processes being continuing with the current process.

25. The apparatus for providing continuity of operation of claim 17, further comprising:

restore process start means coupled to said power supply for detecting when said power supply is turned on and outputting a detection signal in response thereto; and system state restoring means coupled to said restore process start means for receiving said detection signal, coupled to said non-volatile memory means for reading said system condition therefrom, and coupled to said CPU and main memory for restoring, in response to said detection signal, said CPU and main memory to the system condition stored in said non-volatile memory means, whereby said process can be continued based on said system condition stored when said demand was detected by said save process start detecting means.

26. The apparatus for providing continuity of operation of claim 17, further comprising:

restore process start means coupled to said power supply for detecting when said power supply is turned on and outputting a detection signal in response thereto;

process selecting means operatively coupled to said restore process start means for displaying to a user a plurality of processes which may be executed, at least one of said displayed processes being continuing the operation of said process after the system condition has been restored; and system state restoring means coupled to said non-volatile memory means for reading said system condition therefrom, and coupled to said CPU and said main memory for restoring said CPU and said main memory to the system condition stored in said non-volatile memory means when said demand was detected by said save process start detecting means.

27. The apparatus for providing continuity of operation of claim 17, further comprising:

restore process start means coupled to said power supply for detecting when said power supply is turned on and outputting a detection signal in response thereto;

process selecting means operatively coupled to said restore process start means for receiving said detection signal, said process selecting means displaying to a user, in response to said detection signal, a plurality of saved system conditions stored in said non-volatile memory means from which said system may be restored;

process determination means for permitting selection of one of said plurality of displayed saved system conditions in accordance with an input from said user; and system state restoring means coupled to said process determination means for receiving said selection, coupled to said non-volatile memory means for reading said selected one of said plurality of saved system conditions therefrom, and coupled to said CPU and said main memory for restoring said CPU and said main memory to said selected system condition.

28. The apparatus for providing continuity of operation of claim 17, further comprising:

restore process start means coupled to said power supply for detecting when said power supply is turned on and outputting a detection signal in response thereto;

process start determination means coupled to said restore process start means for receiving said detection signal, said process start determination means confirming, in response to said detection signal, whether processing can be continued from a system condition saved in said non-volatile memory means and outputting a confirmation if said processing can continue;

system state restoring means coupled to said process start determination means, coupled to said non-volatile memory means for reading said system condition therefrom, and coupled to said CPU and main memory for restoring said CPU and main memory to the system condition stored in said non-volatile memory means in response to said confirmation from said process start determination means that processing can be continued from a system condition saved in said non-volatile memory means; and post-restore processing means coupled to said system state restoring means for determining when the CPU and main memory are restored to the system condition which existed at the time of said demand to begin a save process, and coupled to said CPU and main memory for controlling the operation of said process after the system state restoring means has restored said system condition, said post-restore processing means continuing said process based on said system condition stored when said demand was detected by said save process start detecting means.

29. An apparatus for providing continuity of operation in a system which exhibits a system condition and which performs a process, the system including a CPU having a status, a main memory for storing data and a power supply for supplying power to said system, said apparatus for providing continuity comprising:

save process start detecting means for detecting a demand to begin a save process and producing a demand signal in response thereto;

non-volatile memory means for storing data representing the condition of said system;

system state saving means coupled to said save process start detecting means for receiving said demand signal, and coupled to said CPU and main memory for receiving a CPU status corresponding to the status of said CPU at the time of said demand and the data in said memory at the time of said demand, the CPU status and data representing a condition of said system at an occurrence of said demand, and being further coupled to said non-volatile memory means for storing said system condition to said non-volatile memory means in response to said demand signal to the extent necessary to restore said system condition and to continue said process based on said stored system condition, said system state saving means storing said system condition in said non-volatile memory means;

process selecting means operatively coupled to said system state saving means for displaying to a user a plurality of processes which may be executed after said system condition has been stored in said non-volatile memory means; and process determination means operatively coupled to said process selecting means for permitting selection of one of said plurality of displayed processes in accordance with an input from said user, at least one of said displayed processes being continuing with the current process.

30. The apparatus for providing continuity of operation of claim 29, wherein said save process start detecting means further includes a power switch having an on state and an off state, and power off detection processing means for reading the power switch state indicated by said switch and producing a demand signal when said switch state is in an off state.

31. The apparatus for providing continuity of operation of claim 29, wherein said power supply includes a battery having a voltage, and said save process start detecting means includes a battery voltage detection processing means for detecting the voltage of the battery and producing a demand signal when said voltage falls below a predetermined value.

32. The apparatus for providing continuity of operation of claim 29, wherein said demand to begin a save process is initiated by a user, and wherein said save process start detecting means further includes user instruction input means to provide a user input, said user input indicating a demand to begin a save process and wherein said save process start detecting means produces said demand signal in response to said user input indicating a demand to begin a save process.

33. The apparatus for providing continuity of operation of claim 29, wherein said non-volatile memory means further includes a fixedly reserved system state store region, and wherein said system state saving means stores said system condition in said fixedly reserved system state store region of said non-volatile memory means.

34. The apparatus for providing continuity of operation of claim 29, wherein said non-volatile memory means further includes at least one system state store file, and wherein said system state saving means stores said system condition in said at least one system state store file of said non-volatile memory means.

35. The apparatus for providing continuity of operation of claim 29, wherein said non-volatile memory means further includes a contiguous system state store region within said non-volatile memory means, and wherein said system state saving means stores said system condition in said contiguous system state store region of said non-volatile memory means.

36. The apparatus for providing continuity of operation of claim 29, wherein said process determination means is further coupled to said power supply and wherein at least one of said plurality of displayed processes is turning off the power supply.

37. The apparatus for providing continuity of operation of claim 29, further comprising:

restore process start means coupled to said power supply for detecting when said power supply is turned on and outputting a detection signal in response thereto; and system state restoring means coupled to said restore process start means for receiving said detection signal, coupled to said non-volatile memory means for reading said system condition therefrom, and coupled to said CPU and main memory for restoring, in response to said detection signal, said CPU and main memory to the system condition stored in said non-volatile memory means, whereby said process can be continued based on said system condition stored when said demand was detected by said save process start detecting means.

38. The apparatus for providing continuity of operation of claim 29, further comprising:

restore process start means coupled to said power supply for detecting when said power supply is turned on and outputting a detection signal in response thereto;

process selecting means operatively coupled to said restore process start means for displaying to a user a plurality of processes which may be executed, at least one of said displayed processes being continuing the operation of said process after the system condition has been restored; and system state restoring means coupled to said non-volatile memory means for reading said system condition therefrom, and coupled to said CPU and said main memory for restoring said CPU and said main memory to the system condition stored in said non-volatile memory means said demand was detected by said save process start detecting means.

39. The apparatus for providing continuity of operation of claim 29, further comprising:

restore process start means coupled to said power supply for detecting when said power supply is turned on and outputting a detection signal in response thereto;

process selecting means operatively coupled to said restore process start means for receiving said detection signal, said process selecting means displaying to a user, in response to said detection signal, a plurality of saved system conditions stored in said non-volatile memory means from which said system may be restored;

process determination means for permitting selection of one of said plurality of displayed saved system conditions in accordance with an input from said user; and system state restoring means coupled to said process determination means for receiving said selection, coupled to said non-volatile memory means for reading said selected one of said plurality of saved system conditions therefrom, and coupled to said CPU and said main memory for restoring said CPU and said main memory to said selected system condition.

40. The apparatus for providing continuity of operation of claim 29, further comprising:

restore process start means coupled to said power supply for detecting when said power supply is turned on and outputting a detection signal in response thereto;

process start determination means coupled to said restore process start means for receiving said detection signal, said process start determination means confirming, in response to said detection signal, whether processing can be continued from a system condition saved in said non-volatile memory means and outputting a confirmation if said processing can continue;

system state restoring means coupled to said process start determination means, coupled to said non-volatile memory means for reading said system condition therefrom, and coupled to said CPU and main memory for restoring said CPU and main memory to the system condition stored in said non-volatile memory means in response to said confirmation from said process start determination means that processing can be continued from a system condition saved in said non-volatile memory means; and post-restore processing means coupled to said system state restoring means for determining when the CPU and main memory are restored to the system condition which existed at the time of said demand to begin a save process, and coupled to said CPU and main memory for controlling the operation of said process after the system state restoring means has restored said system condition, said post-restore processing means continuing said process based on said system condition stored when said demand was detected by said save process start detecting means.

41. An apparatus for providing continuity of operation in a system which exhibits a system condition and which performs a process, the system including a CPU having a status, a main memory for storing data and a power supply for supplying power to said system, said apparatus for providing continuity comprising:

save process start detecting means for detecting a demand to begin a save process and producing a demand signal in response thereto;

non-volatile memory means for storing data representing the condition of said system;

system state saving means coupled to said save process start detecting means for receiving said demand signal, and coupled to said CPU and main memory for receiving a CPU status corresponding to the status of said CPU at the time of said demand and the data in said memory at the time of said demand, the CPU status and data representing a condition of said system at an occurrence of said demand, and being further coupled to said non-volatile memory means for storing said system condition to said non-volatile memory means in response to said demand signal to the extent necessary to restore said system condition and to continue processing based on said stored system condition;

post-save processing means coupled to said system state saving means for performing processing after said system state saving means has completely output said system condition to said non-volatile memory means;

restore process start means coupled to said power supply for detecting when said power supply is turned on and outputting a detection signal in response thereto;

process selecting means operatively coupled to said restore process start means for displaying to a user a plurality of processes which may be executed after the power supply has been turned on, at least one of said displayed processes being continuing the operation of said process based upon the system condition stored when said demand was detected by said save process start detecting means; and system state restoring means coupled to said non-volatile memory means for reading said system condition therefrom, and coupled to said CPU and said main memory for restoring said CPU and said main memory to the system condition stored in said non-volatile memory means.

42. The apparatus for providing continuity of operation of claim 41, wherein said save process start detecting means further includes a power switch having an on state and an off state, and power off detection processing means for reading the power switch state indicated by said switch and producing a demand signal when said power switch state is in an off state.

43. The apparatus for providing continuity of operation of claim 41, wherein said power supply includes a battery having a voltage, and said save process start detecting means includes a battery voltage detection processing means for detecting the voltage of the battery and producing a demand signal when said voltage falls below a predetermined value.

44. The apparatus for providing continuity of operation of claim 41, wherein said demand to begin a save process is initiated by a user, and wherein said save process start detecting means further includes user instruction input means to provide a user input, said user input indicating a demand to begin a save process and wherein said save process start detecting means produces said demand signal in response to said user input indicating a demand to begin a save process.

45. The apparatus for providing continuity of operation of claim 41, wherein said non-volatile memory means further includes a fixedly reserved system state store region, and wherein said system state saving means stores said system condition in said fixedly reserved system state store region of said non-volatile memory means.

46. The apparatus for providing continuity of operation of claim 41, wherein said non-volatile memory means further includes at least one system state store file, and wherein said system state saving means stores said system condition in said at least one system state stoic file of said non-volatile memory means.

47. The apparatus for providing continuity of operation of claim 41, wherein said non-volatile memory means further includes a contiguous system state store region within said non-volatile memory means, and wherein said system state saving means stores said system condition in said contiguous system state store region of said non-volatile memory means.

48. The apparatus for providing continuity of operation of claim 41, wherein said post-save processing means is further coupled to said power supply and turns off said power supply after said system state saving means has completely stored said system condition to said non-volatile memory means.

49. The apparatus for providing continuity of operation of claim 41, wherein said post-save processing means further includes process selecting means operatively coupled to said system state saving means for displaying to a user a plurality of processes which may be executed after said system condition has been stored in said non-volatile memory means, and process determination means for permitting selection of one of said plurality of displayed processes in accordance with an input from said user, at least one of said processes being continuing with the current process.

50. The apparatus for providing continuity of operation of claim 41, and including process start determination means operatively coupled to said restore process start means for confirming in response to said detection signal whether processing can be continued from a system condition saved in said non-volatile memory means.

51. An apparatus for providing continuity of operation in a system which exhibits a system condition and which performs a process, the system including a CPU having a status, a main memory for storing data and a power supply for supplying power to said system, said apparatus for providing continuity comprising:

save process start detecting means for detecting a demand to begin a save process and producing a demand signal in response thereto;

non-volatile memory means for storing data representing the condition of said system at a plurality of demands;

system state saving means coupled to said save process start detecting means for receiving said demand signal, and coupled to said CPU and main memory for receiving a CPU status corresponding to the status of said CPU at the time of said demand and the data in said memory at the time of said demand, the CPU status and data representing a condition of said system at an occurrence of said demand and being further coupled to said non-volatile memory means for storing said system condition to said non-volatile memory means in response to said demand signal to the extent necessary to restore said system condition and to continue processing based on said stored system condition;

post-save processing means coupled to said system state saving means for performing processing after said system state saving means has completely output said system condition to said non-volatile memory means;

restore process start means coupled to said power supply for detecting when said power supply is turned on and outputting a detection signal in response thereto;

process selecting means operatively coupled to said restore process start means for receiving said detection signal, said process selecting means displaying to a user, in response to said detection signal, the one or more saved system conditions which may be restored from said non-volatile memory means;

process determination means for permitting selection of one of said displayed saved system conditions in accordance with an input from said user; and system state restoring means coupled to said process determination means for receiving said selection, and coupled to said non-volatile memory means for reading one of said saved system conditions corresponding to said selection therefrom, and coupled to said CPU and said main memory for restoring said CPU and said main memory to said selected saved system condition stored in said non-volatile memory means.

52. The apparatus for providing continuity of operation of claim 51, wherein said save process start detecting means further includes a power switch having an on state and an off state, and power off detection processing means for reading the power switch state indicated by said switch and producing a demand signal when said power switch state is in an off state.

53. The apparatus for providing continuity of operation of claim 51, wherein said power supply includes a battery having a voltage, and said save process start detecting means includes a battery voltage detection processing means for detecting the voltage of the battery and producing a demand signal when said voltage falls below a predetermined value.

54. The apparatus for providing continuity of operation of claim 51, wherein said demand to begin a save process is initiated by a user, and wherein said save process start detecting means further includes user instruction input means to provide a user input, said user input indicating a demand to begin a save process and wherein said save process start detecting means produces said demand signal in response to said user input indicating a demand to begin a save process.

55. The apparatus for providing continuity of operation of claim 51, wherein said non-volatile memory means further includes a reserved system state store region, and wherein said system state saving means stores said system conditions in said reserved system state store region of said non-volatile memory means.

56. The apparatus for providing continuity of operation of claim 51, wherein said non-volatile memory means further includes at least one system state store file, and wherein said system state saving means stores said system conditions in said at least one system state store file of said non-volatile memory means.

57. The apparatus for providing continuity of operation of claim 51, wherein said non-volatile memory means further includes a contiguous system state store region within said non-volatile memory means, and wherein said system state saving means stores said system conditions in said contiguous system state store region of said non-volatile memory means.

58. The apparatus for providing continuity of operation of claim 51, wherein said post-save processing means is further coupled to said power supply and turns off said power supply after said system state saving means has completely stored said system condition to said non-volatile memory means.

59. The apparatus for providing continuity of operation of claim 51, wherein said post-save processing means further includes process selecting means operatively coupled to said system state saving means for displaying to a user a plurality of processes which may be executed after said system condition has been stored in said non-volatile memory means, and process determination means for permitting selection of one of said plurality of displayed processes in accordance with an input from said user, at least one of said processes being continuing with the current process.

60. The apparatus for providing continuity of operation of claim 51, and including process start determination means operatively coupled to said restore process start means for confirming in response to said detection signal whether processing can be continued from a system condition saved in said non-volatile memory means.

61. An apparatus for providing continuity of operation in a system which exhibits a system condition and which performs a process, the system including a CPU having a status a main memory for storing data and a power supply for supplying power to said system, said apparatus for providing continuity comprising:
- save process start detecting means for detecting a demand to begin a save process initiated by a user and producing a demand signal, said save process start detecting means including user instruction input means to provide a user input, said user input indicating a demand to begin a save process and said save process start detecting means producing said demand signal in response to said user input indicating a demand to begin a save process;
- external storage means for storing data representing the condition of said system including a fixedly reserved system state store region;
- system state saving means coupled to said save process start detecting for receiving said demand signal, and coupled to said CPU and said main memory for receiving a CPU status corresponding to the status of said CPU at the time of said demand and the data in said memory at the time of said demand, the CPU status and data representing a condition of said system at an occurrence of said demand, and being further coupled to said external storage means for storing said system condition in said external storage means in response to said demand signal to the extent necessary to restore said system to enable said apparatus to continue processing based on said stored system condition said system state saving means storing said system condition in said fixedly reserved system state store region of said external storage means;
- post-save processing means coupled to said system state saving means for performing processing after said system state saving means has completely output said system condition to said external storage means.

62. An apparatus for providing continuity of operation in a system which exhibits a system condition and which performs a process, the system including a CPU having a status a main memory for storing data and a power supply for supplying power to said system, said apparatus for providing continuity comprising:
- save process start detecting means for detecting a demand to begin a save process initiated by a user and producing a demand signal, said save process start detecting means including user instruction input means to provide a user input, said user input indicating a demand to begin a save process and said save process start detecting means producing said demand signal in response to said user input indicating a demand to begin a save process;
- external storage means for storing data representing the condition of said system including a contiguous system state store region within said external storage means;
- system state saving means coupled to said save process start detecting means for receiving said demand signal, and coupled to said CPU and said main memory for receiving a CPU status corresponding to the status of said CPU at the time of said demand and the data in said memory at the time of said demand, the CPU status and data representing a condition of said system at an occurrence of said demand, and being further coupled to said external storage means for storing said system condition in said external storage means in response to said demand signal to the extent necessary to restore said system to enable said apparatus to continue processing based on said stored system condition said system state saving means storing said system condition in said contiguous system state store region of said external storage means;
- post-save processing means coupled to said system state saving means for performing processing after said system state saving means has completely output said system condition to said external storage means.

63. An apparatus for providing continuity of operation in a system which exhibits a system condition and which performs a process, the system including a CPU having a status, a main memory for storing data and a power supply for supplying power to said system, said apparatus for providing continuity comprising:
- save process start detecting means for detecting a demand to begin a save process initiated by a user and producing a demand signal, said save process start detecting means including user instruction input means to provide a user input, said user input indicating a demand to begin a save process and said save process start detecting means producing said demand signal in response to said user input indicating a demand to begin a save process;
- external storage means for storing data representing the condition of said system;
- system state saving means coupled to said save process start detecting means for receiving said demand signal, and coupled to said CPU and said main memory for receiving a CPU status corresponding to the status of said CPU at the time of said demand and the data in said memory at the time of said demand, the CPU status and data representing a condition of said system at an occurrence of said demand, and being further coupled to said external storage means for storing said system condition in said external storage means in response to said demand signal to the extent necessary to restore said system to enable said apparatus to continue processing based on said stored system condition; and
- post-save processing means coupled to said system state saving means for performing processing after said system state saving means has completely output said system condition to said external storage means and including process selecting means operatively coupled to said system state saving means for displaying to a user a plurality of processes which may be executed after said system condition has been stored in said external storage means, and process determination means for permitting selection of one of said plurality of displayed processes in accordance with an input from said user, at least one of said processes being continuing with the current process.

64. An apparatus for providing continuity of operation in a system which exhibits a system condition and which performs a process, the system including a CPU having a status, a main memory for storing data and a power supply for supplying power to said system, said apparatus for providing continuity comprising:

save process start detecting means for detecting a demand to begin a save process initiated by a user and producing a demand signal, said save process start detecting means including user instruction input means to provide a user input, said user input indicating a demand to begin a save process and said save process start detecting means producing said demand signal in response to said user input indicating a demand to begin a save process;

external storage means for storing data representing the condition of said system;

system state saving means coupled to said save process start detecting means for receiving said demand signal, and coupled to said CPU and said main memory for receiving a CPU status corresponding to the status of said CPU at the time of said demand and the data in said memory at the time of said demand, the CPU status and data representing a condition of said system at an occurrence of said demand, and being further coupled to said external storage means for storing said system condition in said external storage means in response to said demand signal to the extent necessary to restore said system to enable said apparatus to continue processing based on said stored system condition;

post-save processing means coupled to said system state saving means for performing processing after said system state saving means has completely output said system condition to said external storage means;

restore process start means coupled to said power supply for detecting when said power supply is turned on and outputting a detection signal in response thereto;

process selecting means operatively coupled to said restore process start means for displaying to a user a plurality of processes which may be executed, at least one of said displayed processes being continuing the operation of said process after the system condition has been restored; and system state restoring means coupled to said external storage means for reading said system condition therefrom, and coupled to said CPU and said main memory for restoring said CPU and said main memory to the system condition stored in said external storage means when said demand was detected by said save process start detecting means.

65. An apparatus for providing continuity of operation in a system which exhibits a system condition and which performs a process, the system including a CPU having a status, a main memory for storing data and a power supply for supplying power to said system, said apparatus for providing continuity comprising:

save process start detecting means for detecting a demand to begin a save process initiated by a user and producing a demand signal, said save process start detecting means including user instruction input means to provide a user input, said user input indicating a demand to begin a save process and said save process start detecting means producing said demand signal in response to said user input indicating a demand to begin a save process;

external storage means for storing data representing the condition of said system;

system state saving means coupled to said save process start detecting for receiving said demand signal, and coupled to said CPU and said main memory for receiving a CPU status corresponding to the status of said CPU at the time of said demand and the data in said memory at the time of said demand, the CPU status and data representing a condition of said system at an occurrence of said demand, and being further coupled to said external storage means for storing said system condition in said external storage means in response to said demand signal to the extent necessary to restore said system to enable said apparatus to continue processing based on said stored system condition;

post-save processing means coupled to said system state saving means for performing processing after said system state saving means has completely output said system condition to said external storage means;

restore process start means coupled to said power supply for detecting when said power supply is turned on and outputting a detection signal in response thereto;

process selecting means operatively coupled to said restore process start means for receiving said detection signal, said process selecting means displaying to a user, in response to said detection signal, a plurality of saved system conditions stored in said external storage means from which said system may be restored;

process determination means for permitting selection of one of said plurality of displayed saved system conditions in accordance with an input from said user; and system state restoring means coupled to said process determination means for receiving said selection, coupled to said external storage means for reading said selected one of said plurality of saved system conditions therefrom, and coupled to said CPU and said main memory for restoring said CPU and said main memory to said selected system condition.

66. An apparatus for providing continuity of operation in a system which exhibits a system condition and which performs a process, the system including a CPU having a status, a main memory for storing data and a power supply for supplying power to said system, said apparatus for providing continuity comprising:

save process start detecting means for detecting a demand to begin a save process and producing a demand signal in response thereto;

external storage means for storing data representing the condition of said system, said external storage means including a fixedly reserved system state store region;

system state saving means coupled to said save process start detecting means for receiving said demand signal, and coupled to said CPU and said main memory for receiving a status corresponding to the status of said CPU at the time of said demand and the data in said memory at the time of said demand, the CPU status and data representing a condition of said system at an occurrence of said demand, and being further coupled to said external storage means for storing said system condition in said external storage means in response to said demand signal to the extent necessary to restore said system to enable said apparatus to continue processing based on said stored system condition, said system state saving means storing said system condition in said fixedly reserved system state store region of said external storage means; and post-save processing means coupled to said system state saving means for performing processing after said system state saving means has completely output said system condition to said external storage means.

67. The apparatus for providing continuity of operation of claim 66, wherein said save process start detecting means further includes a power switch having an on state and an off state, and power off detection processing means for reading the power switch state indicated by said switch and producing a demand signal when said power switch state is in an off state.

68. The apparatus for providing continuity of operation of claim 66, wherein said power supply further includes a battery having a voltage, and said save process start detecting means includes a battery voltage detection processing means for detecting the voltage of the battery and producing a demand signal when said voltage falls below a predetermined value.

69. The apparatus for providing continuity of operation of claim 66, wherein said demand to begin a save process is initiated by a user, and wherein said save process start detecting means further includes user instruction input means to provide a user input, said user input indicating a demand to begin a save process and wherein said save process start detecting means produces said demand signal in response to said user input indicating a demand to begin a save process.

70. The apparatus for providing continuity of operation of claim 66, wherein said fixedly reserved system state store region is a contiguous store region within said external storage means.

71. The apparatus for providing continuity of operation of claim 66, wherein said post-save processing means is further coupled to said power supply and turns off said power supply after said system state saving means has completely stored said system condition to said external storage means.

72. The apparatus for providing continuity of operation of claim 66, wherein said post-save processing means further includes process selecting means operatively coupled to said system state saving means for displaying to a user a plurality of processes which may be executed after said system condition has been stored in said external storage means, and process determination means for permitting selection of one of said plurality of displayed processes in accordance with an input from said user, at least one of said processes being continuing with the current process.

73. The apparatus for providing continuity of operation of claim 66, further comprising:

restore process start means coupled to said power supply for detecting when said power supply is turned on and outputting a detection signal in response thereto; and system state restoring means coupled to said restore process start means for receiving said detection signal, coupled to said external storage means for reading said system condition therefrom, and coupled to said CPU and main memory for restoring, in response to said detection signal, said CPU and main memory to the system condition stored in said external storage means, whereby said process can be continued based upon said stored system condition when said demand was detected by said save process start detecting means.

74. The apparatus for providing continuity of operation of claim 66, further comprising:

restore process start means coupled to said power supply for detecting when said power supply is turned on and outputting a detection signal in response thereto;

process selecting means operatively coupled to said restore process start means for displaying to a user a plurality of processes which may be executed, at least one of said displayed processes being continuing the operation of said process after the system condition has been restored; and system state restoring means coupled to said external storage means for reading said system condition therefrom, and coupled to said CPU and said main memory for restoring said CPU and said main memory to the system condition stored in said external storage means when said demand was detected by said save process start detecting means.

75. The apparatus for providing continuity of operation of claim 66, further comprising:

restore process start means coupled to said power supply for detecting when said power supply is turned on and outputting a detection signal in response thereto;

process selecting means operatively coupled to said restore process start means for receiving said detection signal, said process selecting means displaying to a user, in response to said detection signal, a plurality of saved system conditions stored in said external storage means from which said system may be restored;

process determination means for permitting selection of one of said plurality of displayed saved system conditions in accordance with an input from said user; and system state restoring means coupled to said process determination means for receiving said selection, coupled to said external storage means for reading said selected one of said plurality of saved system conditions therefrom, and coupled to said CPU and said main memory for restoring said CPU and said main memory to said selected system condition.

76. The apparatus for providing continuity of operation of claim 66, further comprising:

restore process start means coupled to said power supply for detecting when said power supply is turned on and outputting a detection signal in response thereto;

process start determination means coupled to said restore process start means for receiving said detection signal, said process start determination means confirming, in response to said detection signal, whether processing can be continued from a system condition saved in said external storage means and outputting a confirmation if said processing can continue;

system state restoring means coupled to said process start determination means, coupled to said external storage means for reading said system condition therefrom, and coupled to said CPU and main memory for restoring said CPU and main memory to the system condition stored in said external storage means in response to said confirmation from said process start determination means that processing can be continued from a system condition saved in said external storage means; and post-restore processing means coupled to said system state restoring means for determining when the CPU and main memory are restored to the system condition which existed at the time of said demand to begin a save process, and coupled to said CPU and main memory for controlling the operation of said process after the system state restoring means has restored said system condition, said post-restore processing means continuing said process based upon the system condition stored when said demand was detected by said save process start detecting means.

77. An apparatus for providing continuity of operation in a system which exhibits a system condition and which performs a process, the system including a CPU having a status, a main memory for storing data and a power supply for supplying power to said system, said apparatus for providing continuity comprising:

save process start detecting means for detecting a demand to begin a save process and producing a demand signal;

external storage means for storing data representing the condition of said system, said external storage means including a contiguous system state store region within said external storage means;

system state saving means coupled to said save process start detecting means for receiving said demand signal, and coupled to said CPU and said main memory for receiving a CPU status corresponding to the status of said CPU at the time of said demand and the data in said memory at the time of said demand, the CPU status and data representing a condition of said system at an occurrence of said demand, and being further coupled to said external storage means for storing said system condition in said external storage means in response to said demand signal to the extent necessary to restore said system to enable said apparatus to continue processing based on said stored system condition, said system state saving means storing said system condition in said contiguous system state store region of said external storage means; and post-save processing means coupled to said system state saving means for performing processing after said system state saving means has completely output said system condition to said external storage means.

78. The apparatus for providing continuity of operation of claim 77, wherein said save process start detecting means further includes a power switch having an on state and an off state, and power off detection processing means for reading the power switch state indicated by said switch and producing a demand signal when said power switch state is in an off state.

79. The apparatus for providing continuity of operation of claim 77, wherein said power supply includes a battery having a voltage, and said save process start detecting means includes a battery voltage detection processing means for detecting the voltage of the battery and producing a demand signal when said voltage falls below a predetermined value.

80. The apparatus for providing continuity of operation of claim 77, wherein said demand to begin a save process is initiated by a user, and wherein said save process start detecting means further includes user instruction input means to provide a user input, said user input indicating a demand to begin a save process and wherein said save process start detecting means produces said demand signal in response to said user input indicating a demand to begin a save process.

81. The apparatus for providing continuity of operation of claim 77, wherein said contiguous system state store region is a reserved store region within said external storage means.

82. The apparatus for providing continuity of operation of claim 77, wherein said contiguous system state store region includes a file within said external storage means.

83. The apparatus for providing continuity of operation of claim 77, wherein said post-save processing means is further coupled to said power supply and turns off said power supply after said system state saving means has completely stored said system condition to said external storage means.

84. The apparatus for providing continuity of operation of claim 77, wherein said post-save processing means further includes process selecting means operatively coupled to said system state saving means for displaying to a user a plurality of processes which may be executed after said system condition has been stored in said external storage means, and process determination means for permitting selection of one of said plurality of displayed processes in accordance with an input from said user, at least one of said processes being continuing with the current process.

85. The apparatus for providing continuity of operation of claim 77, further comprising:

restore process start means coupled to said power supply for detecting when said power supply is turned on and outputting a detection signal in response thereto; and system state restoring means coupled to said restore process start means for receiving said detection signal, coupled to said external storage means for reading said system condition therefrom, and coupled to said CPU and main memory for restoring, in response to said detection signal, said CPU and main memory to the system condition stored in said external storage means, whereby said process can be continued based upon said system condition stored when said demand was detected by said save process start detecting means.

86. The apparatus for providing continuity of operation of claim 77, further comprising:

restore process start means coupled to said power supply for detecting when said power supply is turned on and outputting a detection signal in response thereto;

process selecting means operatively coupled to said restore process start means for displaying to a user a plurality of processes which may be executed, at least one of said displayed processes being continuing the operation of said process after the system condition has been restored; and system state restoring means coupled to said external storage means for reading said system condition therefrom, and coupled to said CPU and said main memory for restoring said CPU and said main memory to the system condition stored in said external storage means when said demand was detected by said save process start detecting means.

87. The apparatus for providing continuity of operation of claim 77, further comprising:

restore process start means coupled to said power supply for detecting when said power supply is turned on and outputting a detection signal in response thereto;

process selecting means operatively coupled to said restore process start means for receiving said detection signal, said process selecting means displaying to a user, in response to said detection signal, a plurality of saved system conditions stored in said external storage means from which said system may be restored;

process determination means for permitting selection of one of said plurality of displayed saved system conditions in accordance with an input from said user; and system state restoring means coupled to said process determination means for receiving said selection, coupled to said external storage means for reading said selected one of said plurality of saved system conditions therefrom, and coupled to said CPU and said main memory for restoring said CPU and said main memory to said selected system condition.

88. The apparatus for providing continuity of operation of claim 77, further comprising:

restore process start means coupled to said power supply for detecting when said power supply is turned on and outputting a detection signal in response thereto;

process start determination means coupled to said restore process start means for receiving said detection signal, said process start determination means confirming, in response to said detection signal, whether processing can be continued from a system condition saved in said external storage means and outputting a confirmation if said processing can continue;

system state restoring means coupled to said process start determination means, coupled to said external storage means for reading said system condition therefrom, and coupled to said CPU and main memory for restoring said CPU and main memory to the system condition stored in said external storage means in response to said confirmation from said process start determination means that processing can be continued from a system condition saved in said external storage means; and post-restore processing means coupled to said system state restoring means for determining when the CPU and main memory are restored to the system condition which existed at the time of said demand to begin a save process, and coupled to said CPU and main memory for controlling the operation of said process after the system state restoring means has restored said system condition, said post-restore processing means continuing said process based upon said system condition stored when said demand was detected by said save process start detecting means.

89. An apparatus for providing continuity of operation in a system which exhibits a system condition and which performs a process, the system including a CPU having a status, a main memory for storing data and a power supply for supplying power to said system, said apparatus for providing continuity comprising:

save process start detecting means for detecting a demand to begin a save process and producing a demand signal in response thereto;

external storage means for storing data representing the condition of said system;

system state saving means coupled to said save process start detecting means for receiving said demand signal, and coupled to said CPU and main memory for receiving a CPU status corresponding to the status of said CPU at the time of said demand and the data in said memory at the time of said demand, the CPU status and data representing a condition of said system at an occurrence of said demand, and being further coupled to said external storage means for storing said system condition to said external storage means in response to said demand signal to the extent necessary to restore said system condition and to continue processing based on said stored system condition, said system state saving means storing said system condition in said external storage means;

process selecting means operatively coupled to said system state saving means for displaying to a user a plurality of processes which may be executed after said system condition has been stored in said external storage means; and process determination means operatively coupled to said process selecting means for permitting selection of one of said plurality of displayed processes in accordance with an input from said user, at least one of said displayed processes being continuing with the current process.

90. The apparatus for providing continuity of operation of claim 89, wherein said save process start detecting means further includes a power switch having an on state and an off state, and power off detection processing means for reading the power switch state indicated by said switch and producing a demand signal when said switch state is in an off state.

91. The apparatus for providing continuity of operation of claim 89, wherein said power supply includes a battery having a voltage, and said save process start detecting means includes a battery voltage detection processing means for detecting the voltage of the battery and producing a demand signal when said voltage falls below a predetermined value.

92. The apparatus for providing continuity of operation of claim 89, wherein said demand to begin a save process is initiated by a user, and wherein said save process start detecting means further includes user instruction input means to provide a user input, said user input indicating a demand to begin a save process and wherein said save process start detecting means produces said demand signal in response to said user input indicating a demand to begin a save process.

93. The apparatus for providing continuity of operation of claim 89, wherein said external storage means further includes a fixedly reserved system state store region,. and wherein said system state saving means stores said system condition in said fixedly reserved system state store region of said external storage means.

94. The apparatus for providing continuity of operation of claim 89, wherein said external storage means further includes at least one system state store file, and wherein said system state saving means stores said system condition in said at least one system state store file of said external storage means.

95. The apparatus for providing continuity of operation of claim 89, wherein said external storage means further includes a contiguous system state store region within said external storage means, and wherein said system state saving means stores said system condition in said contiguous system state store region of said external storage means.

96. The apparatus for providing continuity of operation of claim 89, wherein said process determination means is further coupled to said power supply and wherein at least one of said plurality of displayed processes is turning off the power supply.

97. The apparatus for providing continuity of operation of claim 89, further comprising:

restore process start means coupled to said power supply for detecting when said power supply is turned on and outputting a detection signal in response thereto; and system state restoring means coupled to said restore process start means for receiving said detection signal, coupled to said external storage means for reading said system condition therefrom, and coupled to said CPU and main memory for restoring, in response to said detection signal, said CPU and main memory to the system condition stored in said external storage means, whereby said process can be continued based upon said system condition stored when said demand was detected by said save process start detecting means.

98. The apparatus for providing continuity of operation of claim 89, further comprising:

restore process start means coupled to said power supply for detecting when said power supply is turned on and outputting a detection signal in response thereto;

process selecting means operatively coupled to said restore process start means for displaying to a user a plurality of processes which may be executed, at least one of said displayed processes being continuing the operation of said process after the system condition has been restored; and system state restoring means coupled to said external storage means for reading said system condition therefrom, and coupled to said CPU and said main memory for restoring said CPU and said main memory to the system condition stored in said external storage means when said demand was detected by said save process start detecting means.

99. The apparatus for providing continuity of operation of claim 89, further comprising:

restore process start means coupled to said power supply for detecting when said power supply is turned on and outputting a detection signal in response thereto;

process selecting means operatively coupled to said restore process start means for receiving said detection signal, said process selecting means displaying to a user, in response to said detection signal, a plurality of saved system conditions stored in said external storage means from which said system may be restored;

process determination means for permitting selection of one of said plurality of displayed saved system conditions in accordance with an input from said user; and system state restoring means coupled to said process determination means for receiving said selection, coupled to said external storage means for reading said selected one of said plurality of saved system conditions therefrom, and coupled to said CPU and said main memory for restoring said CPU and said main memory to said selected system condition.

100. The apparatus for providing continuity of operation of claim 89, further comprising:

restore process start means coupled to said power supply for detecting when said power supply is turned on and outputting a detection signal in response thereto;

process start determination means coupled to said restore process start means for receiving said detection signal, said process start determination means confirming, in response to said detection signal, whether processing can be continued from a system condition saved in said external storage means and outputting a confirmation if said processing can continue;

system state restoring means coupled to said process start determination means, coupled to said external storage means for reading said system condition therefrom, and coupled to said CPU and main memory for restoring said CPU and main memory to the system condition stored in said external storage means in response to said confirmation from said process start determination means that processing can be continued from a system condition saved in said external storage means; and post-restore processing means coupled to said system state restoring means for determining when the CPU and main memory are restored to the system condition which existed at the time of said demand to begin a save process, and coupled to said CPU and main memory for controlling the operation of said process after the system state restoring means has restored said system condition, said post-restore processing means continuing said process based upon said system condition stored when said demand was detected by said save process start detecting means.

101. An apparatus for providing continuity of operation in a system which exhibits a system condition and which performs a process, the system including a CPU having a status, a main memory for storing data and a power supply for supplying power to said system, said apparatus for providing continuity comprising:

save process start detecting means for detecting a demand to begin a save process and producing a demand signal in response thereto;

external storage means for storing data representing the condition of said system;

system state saving means coupled to said save process start detecting means for receiving said demand signal, and coupled to said CPU and main memory for receiving a CPU status corresponding to the status of said CPU at the time of said demand and the data in said memory at the time of said demand, the CPU status and data representing a condition of said system at an occurrence of said demand, and being further coupled to said external storage means for storing said system condition to said external storage means in response to said demand signal to the extent necessary to restore said system condition and to continue processing based upon said stored system condition;

post-save processing means coupled to said system state saving means for performing processing after said system state saving means has completely output said system condition to said external storage means;

restore process start means coupled to said power supply for detecting when said power supply is turned on and outputting a detection signal in response thereto;

process selecting means operatively coupled to said restore process start means for displaying to a user a plurality of processes which may be executed after the power supply has been turned on, at least one of said displayed processes being continuing the operation of said process based upon said system condition stored when said demand was detected by said save process start detecting means; and system state restoring means coupled to said external storage means for reading said system condition therefrom, and coupled to said CPU and said main memory for restoring said CPU and said main memory to the system condition stored in said external storage means.

102. The apparatus for providing continuity of operation of claim 101, wherein said save process start detecting means further includes a power switch having an on state and an off state, and power off detection processing means for reading the power switch state indicated by said switch and producing a demand signal when said power switch state is in an off state.

103. The apparatus for providing continuity of operation of claim 101, wherein said power supply includes a battery having a voltage, and said save process start detecting means includes a battery voltage detection processing means for detecting the voltage of the battery anti producing a demand signal when said voltage falls below a predetermined value.

104. The apparatus for providing continuity of operation of claim 101, wherein said demand to begin a save process is initiated by a user, and wherein said save process start detecting means further includes user instruction input means to provide a user input, said user input indicating a demand to begin a save process and wherein said save process start detecting means produces said demand signal in response to said user input indicating a demand to begin a save process.

105. The apparatus for providing continuity of operation of claim 101, wherein said external storage means further includes a fixedly reserved system state store region, and wherein said system state saving means stores said system condition in said fixedly reserved system state store region of said external storage means.

106. The apparatus for providing continuity of operation of claim 101, wherein said external storage means further includes at least one system state store file, and wherein said system state saving means stores said system condition in said at least one system state store file of said external storage means.

107. The apparatus for providing continuity of operation of claim 101, wherein said external storage means further includes a contiguous system state store region within said external storage means, and wherein said system state saving means stores said system condition in said contiguous system state store region of said external storage means.

108. The apparatus for providing continuity of operation of claim 101, wherein said post-save processing means is further coupled to said power supply and turns off said power supply after said system state saving means has completely stored said system condition to said external storage means.

109. The apparatus for providing continuity of operation of claim 101, wherein said post-save processing means further includes process selecting means operatively coupled to said system state saving means for displaying to a user a plurality of processes which may be executed after said system condition has been stored in said external storage means, and process determination means for permitting selection of one of said plurality of displayed processes in accordance with an input from said user, at least one of said processes being continuing with the current process.

110. The apparatus for providing continuity of operation of claim 101, and including process start determination means operatively coupled to said restore process start means for confirming in response to said detection signal whether processing can be continued from a system condition saved in said external storage means.

111. An apparatus for providing continuity of operation in a system which exhibits a system condition and which performs a process, the system including a CPU having a status, a main memory for storing data and a power supply for supplying power to said system, said apparatus for providing continuity comprising:

save process start detecting means for detecting a demand to begin a save process and producing a demand signal in response thereto;

external storage means for storing data representing the condition of said system at a plurality of demands;

system state saving means coupled to said save process start detecting means for receiving said demand signal, and coupled to said CPU and main memory for receiving a CPU status corresponding to the status of said CPU at the time of said demand and the data in said memory at the time of said demand, the CPU status and data representing a condition of said system at an occurrence of said demand and being further coupled to said external storage means for storing said system condition to external storage means in response to said demand signal to the extent necessary to continue processing based upon said stored system condition, said system state saving means storing said system condition in said external storage means to the extent necessary to restore said system condition and to continue processing based upon said stored system condition;

post-save processing means coupled to said system state saving means for performing processing after said system state saving means has completely output said system condition to said external storage means;

restore process start means coupled to said power supply for detecting when said power supply is turned on and outputting a detection signal in response thereto;

process selecting means operatively coupled to said restore process start means for receiving said detection signal, said process selecting means displaying to a user, in response to said detection signal, the one or more saved system conditions which may be restored from said external storage means;

process determination means for permitting selection of one of said displayed saved system conditions in accordance with an input from said user; and system state restoring means coupled to said process determination means for receiving said selection, and coupled to said external storage means for reading one of said saved system conditions corresponding to said selection therefrom, and coupled to said CPU and said main memory for restoring said CPU and said main memory to said selected saved system condition stored in said external storage means.

112. The apparatus for providing continuity of operation of claim 111, wherein said save process start detecting means further includes a power switch having an on state and an off state, and power off detection processing means for reading the power switch state indicated by said switch and producing a demand signal when said power switch state is in an off state.

113. The apparatus for providing continuity of operation of claim 111, wherein said power supply includes a battery having a voltage, and said save process start detecting means includes a battery voltage detection processing means for detecting the voltage of the battery and producing a demand signal when said voltage falls below a predetermined value.

114. The apparatus for providing continuity of operation of claim 111, wherein said demand to begin a save process is initiated by a user, and wherein said save process start detecting means further includes user instruction input means to provide a user input, said user input indicating a demand to begin a save process and wherein said save process state detecting means produces said demand signal in response to said user input indicating a demand to begin a save process.

115. The apparatus for providing continuity of operation of claim 111, wherein said external storage means further includes a reserved system state store region, and wherein said system state saving means stores said system conditions in said reserved system state store region of said external storage means.

116. The apparatus for providing continuity of operation of claim 111, wherein said external storage means further includes at least one system state store file, and wherein said system state saving means stores said system conditions in said at least one system state store file of said external storage means.

117. The apparatus for providing continuity of operation of claim 111, wherein said external storage means further includes a contiguous system state store region within said external storage means, and wherein said system state saving means stores said system conditions in said contiguous system state store region of said external storage means.

118. The apparatus for providing continuity of operation of claim 111, wherein said post-save processing means is further coupled to said power supply and turns off said power supply after said system state saving means has completely stored said system condition to said external storage means.

119. The apparatus for providing continuity of operation of claim 111, wherein said post-save processing means further includes process selecting means operatively coupled to said system state saving means for displaying to a user a plurality of processes which may be executed after said system condition has been stored in said external storage means, and process determination means for permitting selection of one of said plurality of displayed processes in accordance with an input from said user, at least one of said processes being continuing with the current process.

120. The apparatus for providing continuity of operation of claim 111, and including process start determination means operatively coupled to said restore process start means for confirming in response to said detection signal whether processing can be continued from a system condition saved in said external storage means.

121. An apparatus for providing continuity of operation in a system which exhibits a system condition and which performs a process, the system including a CPU having a status, a plurality of input/output ports and/or devices having a status, a main memory for storing data and a power supply for supplying power to said system, said apparatus for providing continuity comprising:

save process start detecting means for detecting a demand to begin a save process initiated by a user and producing a demand signal, said save process start detecting means including user instruction input means to provide a user input, said user input indicating a demand to begin a save process and said save process start detecting means producing said demand signal in response to said user input indicating a demand to begin a save process;

non-volatile memory means for storing data representing the condition of said system including a fixedly reserved system state store region;

system state saving means coupled to said save process start detecting means for receiving said demand signal, and coupled to said CPU, said plurality of input/output ports and/or devices and said main memory for receiving a CPU status corresponding to the status of said CPU at the time of said demand, an I/O status corresponding to the status of said plurality of input/output ports and/or devices at the time of said demand, and the data in said memory at the time of said demand, the CPU status, I/O status and data representing a condition of said system at an occurrence of said demand, and being further coupled to said non-volatile memory means for storing said system condition in said non-volatile memory means in response to said demand signal to the extent necessary to restore said system to enable said apparatus to continue processing based on said stored system condition said system state saving means storing said system condition in said fixedly reserved system state store region of said non-volatile memory means;

post-save processing means coupled to said system state saving means for performing processing after said system state saving means has completely output said system condition to said non-volatile memory means.

122. An apparatus for providing continuity of operation in a system which exhibits a system condition and which performs a process, the system including a CPU having a status, a plurality of input/output ports and/or devices having a status, a main memory for storing data and a power supply for supplying power to said system, said apparatus for providing continuity comprising:

save process start detecting means for detecting a demand to begin a save process initiated by a user and producing a demand signal, said save process start detecting means including user instruction input means to provide a user input, said user input indicating a demand to begin a save process and said save process start detecting means producing said demand signal in response to said user input indicating a demand to begin a save process;

non-volatile memory means for storing data representing the condition of said system including a contiguous system state store region within said non-volatile memory means;

system state saving means coupled to said save process start detecting means for receiving said demand signal, and coupled to said CPU, said plurality of input/output ports and/or devices and said main memory for receiving a CPU status corresponding to the status of said CPU at the time of said demand, an I/O status corresponding to the status of said plurality of input/output ports and/or devices at the time of said demand, and the data in said memory at the time of said demand, the CPU status, I/O status and data representing a condition of said system at an occurrence of said demand, and being further coupled to said non-volatile memory means for storing said system condition in said non-volatile memory means in response to said demand signal to the extent necessary to restore said system to enable said apparatus to continue processing based on said stored system condition, said system state saving means storing said system condition in said contiguous system state store region of said non-volatile memory means;

post-save processing means coupled to said system state saving means for performing processing after said system state saving means has completely output said system condition to said non-volatile memory means.

123. An apparatus for providing continuity of operation in a system which exhibits a system condition and which performs a process, the system including a CPU having a status, a plurality of input/output ports and/or devices having a status, a main memory for storing data and a power supply for supplying power to said system, said apparatus for providing continuity comprising:

save process start detecting means for detecting a demand to begin a save process initiated by a user and producing a demand signal, said save process start detecting means including user instruction input means to provide a user input, said user input indicating a demand to begin a save process and said save process start detecting means producing said demand signal in response to said user input indicating a demand to begin a save process;

non-volatile memory means for storing data representing the condition of said system;

system state saving means coupled to said save process start detecting means for receiving said demand signal, and coupled to said CPU, said plurality of input/output ports and/or devices and said main memory for receiving a CPU status corresponding to the status of said CPU at the time of said demand, an I/O status corresponding to the status of said plurality of input/output ports and/or devices at the time of said demand, and the data in said memory at the time of said demand, the CPU status, I/O status and data representing a condition of said system at an occurrence of said demand, and being further coupled to said non-volatile memory means for storing said system condition in said non-volatile memory means in response to said demand signal to the extent necessary to restore said system to enable said apparatus to continue processing based on said stored system condition;

post-save processing means coupled to said system state saving means for performing processing after said system state saving means has completely output said system condition to said non-volatile memory means and including process selecting means operatively coupled to said system state saving means for displaying to a user a plurality of processes which may be executed after said system condition has been stored in said non-volatile memory means, and process determination means for permitting selection of one of said plurality of displayed processes in accordance with an input from said user, at least one of said processes being continuing with the current process.

124. An apparatus for providing continuity of operation in a system which exhibits a system condition and which performs a process, the system including a CPU having a status, a plurality of input/output ports and/or devices having a status, a main memory for storing data and a power supply for supplying power to said system, said apparatus for providing continuity comprising:

save process start detecting means for detecting a demand to begin a save process initiated by a user and producing a demand signal, said save process start detecting means including user instruction input means to provide a user input, said user input indicating a demand to begin a save process and said save process start detecting means producing said demand signal in response to said user input indicating a demand to begin a save process;

non-volatile memory means for storing data representing the condition of said system;

system state saving means coupled to said save process start detecting means for receiving said demand signal, and coupled to said CPU, said plurality of input/output ports and/or devices and said main memory for receiving a CPU status corresponding to the status of said CPU at the time of said demand, an I/O status corresponding to the status of said plurality of input/output ports and/or devices at the time of said demand, and the data in said memory at the time of said demand, the CPU status, I/O status and data representing a condition of said system at an occurrence of said demand, and being further coupled to said non-volatile memory means for storing said system condition in said non-volatile memory means in response to said demand signal to the extent necessary to restore said system to enable said apparatus to continue processing based on said stored system condition;

post-save processing means coupled to said system state saving means for performing processing after said system state saving means has completely output said system condition to said non-volatile memory means;

restore process start means coupled to said power supply for detecting when said power supply is turned on and outputting a detection signal in response thereto;

process selecting means operatively coupled to said restore process start means for displaying to a user a plurality of processes which may be executed, at least one of said displayed processes being continuing the operation of said process after the system condition has been restored; and system state restoring means coupled to said non-volatile memory means for reading said system condition therefrom, and coupled to said CPU, said plurality of input/output ports and/or devices and said main memory for restoring said CPU, said plurality of input/output ports and/or devices and said main memory to the system condition stored in said non-volatile memory means when said demand was detected by said save process start detecting means.

125. An apparatus for providing continuity of operation in a system which exhibits a system condition and which performs a process, the system including a CPU having a status, a plurality of input/output ports and/or devices having a status, a main memory for storing data and a power supply for supplying power to said system, said apparatus for providing continuity comprising:

save process start detecting means for detecting a demand to begin a save process initiated by a user and producing a demand signal, said save process start detecting means including user instruction input means to provide a user input, said user input indicating a demand to begin a save process and said save process start detecting means producing said demand signal in response to said user input indicating a demand to begin a save process;

non-volatile memory means for storing data representing the condition of said system;

system state saving means coupled to said save process start detecting means for receiving said demand signal, and coupled to said CPU, said plurality of input/output ports and/or devices and said main memory for receiving a CPU status corresponding to the status of said CPU at the time of said demand, an I/O status corresponding to the status of said plurality of input/output ports and/or devices at the time of said demand, and the data in said memory at the time of said demand, the CPU status, I/O status and data representing a condition of said system at an occurrence of said demand, and being further coupled to said non-volatile memory means for storing said system condition in said non-volatile memory means in response to said demand signal to the extent necessary to restore said system to enable said apparatus to continue processing based on said stored system condition;

post-save processing means coupled to said system state saving means for performing processing after said system state saving means has completely output said system condition to said non-volatile memory means;

restore process start means coupled to said power supply for detecting when said power supply is turned on and outputting a detection signal in response thereto;

process selecting means operatively coupled to said restore process start means for receiving said detection signal, said process selecting means displaying to a user, in response to said detection signal, a plurality of saved system conditions stored in said non-volatile memory means from which said system may be restored;

process determination means for permitting selection of one of said plurality of displayed saved system conditions in accordance with an input from said user; and system state restoring means coupled to said process determination means for receiving said selection, coupled to said non-volatile memory means for reading said selected one of said plurality of saved system conditions therefrom and coupled to said CPU, said plurality of input/output ports and/or devices and said main memory for restoring said CPU, said plurality of input/output ports and/or devices and said main memory to said selected system condition.

126. An apparatus for providing continuity of operation in a system which exhibits a system condition and which performs a process, the system including a CPU having a status, a plurality of input/output ports and/or devices having a status, a main memory for storing data and a power supply for supplying power to said system, said apparatus for providing continuity comprising:

save process start detecting means for detecting a demand to begin a save process and producing a demand signal in response thereto;

non-volatile memory means for storing data representing the condition of said system, said non-volatile memory means including a fixedly reserved system state store region;

system state saving means coupled to said save process start detecting means for receiving said demand signal, and coupled to said CPU, said plurality of input/output ports and/or devices and said main memory for receiving a CPU status corresponding to the status of said CPU at the time of said demand, an I/O status corresponding to the status of said plurality of input/output ports and/or devices at the time of said demand, and the data in said memory at the time of said demand, the CPU status, I/O status and data representing a condition of said system at an occurrence of said demand, and being further coupled to said non-volatile memory means for storing said system condition in said non-volatile memory means in response to said demand signal to the extent necessary to restore said system to enable said apparatus to to continue processing based upon said stored system condition, said system state saving means storing said system condition in said fixedly reserved system state store region of said non-volatile memory means; and post-save processing means coupled to said system state saving means for performing processing after said system state saving means has completely output said system condition to said non-volatile memory means.

127. The apparatus for providing continuity of operation of claim 126, wherein said save process start detecting means further includes a power switch having an on state and an off state, and power off detection processing means for reading the power switch state indicated by said switch and producing a demand signal when said power switch state is in an off state.

128. The apparatus for providing continuity of operation of claim 126, wherein said power supply further includes a battery having a voltage, and said process start detecting means includes a battery voltage detection processing means for detecting the voltage of the battery and producing a demand signal when said voltage falls below a predetermined value.

129. The apparatus for providing continuity of operation of claim 126, wherein said demand to begin a save process is initiated by a user, and wherein said save process start detecting means further includes user instruction input means to provide a user input, said user input indicating a demand to begin a save process and wherein said save process start detecting means produces said demand signal in response to said user input indicating a demand to begin a save process.

130. The apparatus for providing continuity of operation of claim 126, wherein said fixedly reserved system state store region is a contiguous store region within said non-volatile memory means.

131. The apparatus for providing continuity of operation of claim 126, wherein said post-save processing means is further coupled to said power supply and turns off said power supply after said system state saving means has completely stored said system condition to said non-volatile memory means.

132. The apparatus for providing continuity of operation of claim 126, wherein said post-save processing means further includes process selecting means operatively coupled to said system state saving means for displaying to a user a plurality of processes which may be executed after said system condition has been stored in said non-volatile memory means, and process determination means for permitting selection of one of said plurality of displayed processes in accordance with an input from said user, at least one of said processes being continuing with the current process.

133. The apparatus for providing continuity of operation of claim 126, further comprising:

restore process start means coupled to said power supply for detecting when said power supply is turned on and outputting a detection signal in response thereto; and system state restoring means coupled to said restore process start means for receiving said detection signal, coupled to said non-volatile memory means for reading said system condition therefrom, and coupled to said CPU, said plurality of input/output ports and/or devices and main memory for restoring, in response to said detection signal, said CPU, said plurality of input/output ports and/or devices and main memory to the system condition stored in said non-volatile memory means, whereby said process can be continued based upon said system condition stored when said demand was detected by said save process start detecting means.

134. The apparatus for providing continuity of operation of claim 126, further comprising:

restore process start means coupled to said power supply for detecting when said power supply is turned on and outputting a detection signal in response thereto;

process selecting means operatively coupled to said restore process start means for displaying to a user a plurality of processes which may be executed, at least one of said displayed processes being continuing the operation of said process after the system condition has been restored; and system state restoring means coupled to said non-volatile memory means for reading said system condition therefrom, and coupled to said CPU, said plurality of input/output ports and/or devices and said main memory for restoring said CPU, said plurality of input/output ports and/or devices and said main memory to the system condition stored in said non-volatile memory means when said demand was detected by said save process start detecting means.

135. The apparatus for providing continuity of operation of claim 126, further comprising:

restore process start means coupled to said power supply for detecting when said power supply is turned on and outputting a detection signal in response thereto;

process selecting means operatively coupled to said restore process start means for receiving said detection signal, said process selecting means displaying to a user, in response to said detection signal, a plurality of saved system conditions stored in said non-volatile memory means from which said system may be restored;

process determination means for permitting selection of one of said plurality of displayed saved system conditions in accordance with an input from said user; and system state restoring means coupled to said process determination means for receiving said selection, coupled to said non-volatile memory means for reading said selected one of said plurality of saved system conditions therefrom, and coupled to said CPU, said plurality of input/output ports and/or devices and said main memory for restoring said CPU, said plurality of input/output ports and/or devices and said main memory to said selected system condition.

136. The apparatus for providing continuity of operation of claim 126, further comprising:

restore process start means coupled to said power supply for detecting when said power supply is turned on and outputting a detection signal in response thereto;

process start determination means coupled to said restore process start means for receiving said detection signal, said process start determination means confirming, in response to said detection signal, whether processing can be continued from a system condition saved in said non-volatile memory means and outputting a confirmation if said processing can continue;

system state restoring means coupled to said process start determination means, coupled to said non-volatile memory means for reading said system condition therefrom, and coupled to said CPU, said plurality of input/output ports and/or devices and main memory for restoring said CPU, said plurality of input/output ports and/or devices and main memory to the system condition stored in said non-volatile memory means in response to said confirmation from said process start determination means that processing can be continued from a system condition saved in said non-volatile memory means; and post-restore processing means coupled to said system state restoring means for determining when said CPU, said plurality of input/output ports and/or devices and main memory are restored to the system condition which existed at the time of said demand to begin a save process, and coupled to said CPU, said plurality of input/output ports and/or devices and main memory for controlling the operation of said process after the system state restoring means has restored said system condition, said post-restore processing means continuing said process based upon said system condition stored when said demand was detected by said save process start detecting means.

137. An apparatus for providing continuity of operation in a system which exhibits a system condition and which performs a process, the system including a CPU having a status, a plurality of input/output ports and/or devices having a status, a main memory for storing data and a power supply for supplying power to said system, said apparatus for providing continuity comprising:

save process start detecting means for detecting a demand to begin a save process and producing a demand signal;

non-volatile memory means for storing data representing the condition of said system, said non-volatile memory means including a contiguous system state store region within said non-volatile memory means;

system state saving means coupled to said save process start detecting means for receiving said demand signal, and coupled to said CPU, said plurality of input/output ports and/or devices and said main memory for receiving a CPU status corresponding to the status of said CPU at the time of said demand, an I/O status corresponding to the status of said plurality of input/output ports and/or devices at the time of said demand, and the data in said memory at the time of said demand, the CPU status, I/O status and data representing a condition of said system at an occurrence of said demand, and being further coupled to said non-volatile memory means for storing said system condition in said non-volatile memory means in response to said demand signal to the extent necessary to restore said system to enable said apparatus to continue processing based upon said stored system condition, said system state saving means storing said system condition in said contiguous system state store region of said non-volatile memory means; and post-save processing means coupled to said system state saving means for performing processing after said system state saving means has completely output said system condition to said non-volatile memory means.

138. The apparatus for providing continuity of operation of claim 137, wherein said save process start detecting means further includes a power switch having an on state and an off state, and power off detection processing means for reading the power switch state indicated by said switch and producing a demand signal when said power switch state is in an off state.

139. The apparatus for providing continuity of operation of claim 137, wherein said power supply includes a battery having a voltage, and said save process start detecting means includes a battery voltage detection processing means for detecting the voltage of the battery and producing a demand signal when said voltage falls below a predetermined value.

140. The apparatus for providing continuity of operation of claim 137, wherein said demand to begin a save process is initiated by a user, and wherein said save process start detecting means further includes user instruction input means to provide a user input, said user input indicating a demand to begin a save process and wherein said save process start detecting means produces said demand signal in response to said user input indicating a demand to begin a save process.

141. The apparatus for providing continuity of operation of claim 137, wherein said contiguous system state store region is a reserved store region within said non-volatile memory means.

142. The apparatus for providing continuity of operation of claim 137, wherein said contiguous system state store region includes a file within said non-volatile memory means.

143. The apparatus for providing continuity of operation of claim 137, wherein said post-save processing means is further coupled to said power supply and turns off said power supply after said system state saving means has completely stored said system condition to said non-volatile memory means.

144. The apparatus for providing continuity of operation of claim 137, wherein said post-save processing means further includes process selecting means operatively coupled to said system state saving means for displaying to a user a plurality of processes which may be executed after said system condition has been stored in said non-volatile memory means, and process determination means for permitting selection of one of said plurality of displayed processes in accordance with an input from said user, at least one of said processes being continuing with the current process.

145. The apparatus for providing continuity of operation of claim 137, further comprising:

restore process start means coupled to said power supply for detecting when said power supply is turned on and outputting a detection signal in response thereto; and system state restoring means coupled to said restore process start means for receiving said detection signal, coupled to said non-volatile memory means for reading said system condition therefrom, and coupled to said CPU, said plurality of input/output ports and/or devices and main memory for restoring, in response to said detection signal, said CPU, said plurality of input/output ports and/or devices and main memory to the system condition stored in said non-volatile memory means, whereby said process can be continued based upon said system condition stored when said demand was detected by said save process start detecting means.

146. The apparatus for providing continuity of operation of claim 137, further comprising:

restore process start means coupled to said power supply for detecting when said power supply is turned on and outputting a detection signal in response thereto;

process selecting means operatively coupled to said restore process start means for displaying to a user a plurality of processes which may be executed, at least one of said displayed processes being continuing the operation of said process performed by said system after the system condition has been restored; and system state restoring means coupled to said non-volatile memory means for reading said system condition therefrom, and coupled to said CPU, said plurality input/output ports and/or devices and said main memory for restoring said CPU, said plurality input/output ports and/or devices and said main memory to the system condition stored in said non-volatile memory means at one of the same, next or prior process step as the process step occurring when said demand was detected by said save process start detecting means.

147. The apparatus for providing continuity of operation of claim 137, further comprising:

restore process start means coupled to said power supply for detecting when said power supply is turned on and outputting a detection signal in response thereto;

process selecting means operatively coupled to said restore process start means for receiving said detection signal, said process selecting means displaying to a user, in response to said detection signal, a plurality of saved system conditions stored in said non-volatile memory means from which said system may be restored;

process determination means for permitting selection of one of said plurality of displayed saved system conditions in accordance with an input from said user; and system state restoring means coupled to said process determination means for receiving said selection, coupled to said non-volatile memory means for reading said selected one of said plurality of saved system conditions therefrom, and coupled to said CPU, said plurality input/output ports and/or devices and said main memory for restoring said CPU, said plurality input/output ports and/or devices and said main memory to said selected system condition.

148. The apparatus for providing continuity of operation of claim 137, further comprising:

restore process start means coupled to said power supply for detecting when said power supply is turned on and outputting a detection signal in response thereto;

process start determination means coupled to said restore process start means for receiving said detection signal, said process start determination means confirming, in response to said detection signal, whether processing can be continued from a system condition saved in said non-volatile memory means and outputting a confirmation if said processing can continue;

system state restoring means coupled to said process start determination means, coupled to said non-volatile memory means for reading said system condition therefrom, and coupled to said CPU, said plurality of input/output and/or devices and main memory for restoring said CPU, said plurality of input/output and/or devices and main memory to the system condition stored in said non-volatile memory means in response to said confirmation from said process start determination means that processing can be continued from a system condition saved in said non-volatile memory means; and post-restore processing means coupled to said system state restoring means for determining when said CPU, said plurality of input/output and/or devices and main memory are restored to the system condition which existed at the time of said demand to begin a save process, and coupled to said CPU, said plurality of input/output and/or devices and main memory for controlling the operation of said process after the system state restoring means has restored said system condition, said post-restore processing means continuing said process based upon said system condition stored when said demand was detected by said save process start detecting means.

149. An apparatus for providing continuity of operation in a system which exhibits a system condition and which performs a process, the system including a CPU having a status, a plurality of input/output ports and/or devices having a status, a main memory for storing data and a power supply for supplying power to said system, said apparatus for providing continuity comprising:

save process start detecting means for detecting a demand to begin a save process and producing a demand signal in response thereto;

non-volatile memory means for storing data representing the condition of said system;

system state saving means coupled to said save process start detecting means for receiving said demand signal, and coupled to said CPU, said plurality of input/output ports and/or devices and main memory for receiving a CPU status corresponding to the status of said CPU at the time of said demand, an I/O status corresponding to the status of said plurality of input/output ports and/or devices at the time of said demand, and the data in said memory at the time of said demand, the CPU status, I/O status and data representing a condition of said system at an occurrence of said demand, and being further coupled to said non-volatile memory means for storing said system condition to said non-volatile memory means in response to said demand signal to the extent necessary to restore said system condition and to continue said process based upon said stored system condition;

process selecting means operatively coupled to said system state saving means for displaying to a user a plurality of processes which may be executed after said system condition has been stored in said non-volatile memory means; and process determination means operatively coupled to said process selecting means for permitting selection of one of said plurality of displayed processes in accordance with an input from said user, at least one of said displayed processes being continuing with the current process.

150. The apparatus for providing continuity of operation of claim 149, wherein said save process start detecting means further includes a power switch having an on state and an off state, and power off detection processing means for reading the power switch state indicated by said switch and producing a demand signal when said switch state is in an off state.

151. The apparatus for providing continuity of operation of claim 149, wherein said power supply includes a battery having a voltage, and said save process start detecting means includes a battery voltage detection processing means for detecting the voltage of the battery and producing a demand signal when said voltage falls below a predetermined value.

152. The apparatus for providing continuity of operation of claim 149, wherein said demand to begin a save process is initiated by a user, and wherein said save process start detecting means further includes user instruction input means to provide a user input, said user input indicating a demand to begin a save process and wherein said save process start detecting means produces said demand signal in response to said user input indicating a demand to begin a save process.

153. The apparatus for providing continuity of operation of claim 149, wherein said non-volatile memory means further includes a fixedly reserved system state store region, and wherein said system state saving means stores said system condition in said fixedly reserved system state store region of said non-volatile memory means.

154. The apparatus for providing continuity of operation of claim 149, wherein said non-volatile memory means further includes at least one system state store file, and wherein said system state saving means stores said system condition in said at least one system state store file of said non-volatile memory means.

155. The apparatus for providing continuity of operation of claim 149, wherein said non-volatile memory means further includes a contiguous system state store region within said non-volatile memory means, and wherein said system state saving means stores said system condition in said contiguous system state store region of said non-volatile memory means.

156. The apparatus for providing continuity of operation of claim 149, wherein said process determination means is further coupled to said power supply and wherein at least one of said plurality of displayed processes is turning off the power supply.

157. The apparatus for providing continuity of operation of claim 149, further comprising:

restore process start means coupled to said power supply for detecting when said power supply is turned on and outputting a detection signal in response thereto; and system state restoring means coupled to said restore process start means for receiving said detection signal, coupled to said non-volatile memory means for reading said system condition therefrom, and coupled to said CPU, said plurality of input/output ports and/or devices and main memory for restoring, in response to said detection signal, said CPU, said plurality of input/output ports and/or devices and main memory to the system condition stored in said non-volatile memory means, whereby said process can be continued based upon the system condition stored when said demand was detected by said save process start detecting means.

158. The apparatus for providing continuity of operation of claim 149, further comprising:

restore process start means coupled to said power supply for detecting when said power supply is turned on and outputting a detection signal in response thereto;

process selecting means operatively coupled to said restore process start means for displaying to a user a plurality of processes which may be executed, at least one of said displayed processes being continuing the operation of said process after the system condition has been restored; and system state restoring means coupled to said non-volatile memory means for reading said system condition therefrom, and coupled to said CPU, said plurality of input/output ports and/or devices and said main memory for restoring said CPU, said plurality of input/output ports and/or devices and said main memory to the system condition stored in said non-volatile memory means when said demand was detected by said save process start detecting means.

159. The apparatus for providing continuity of operation of claim 149, further comprising:

restore process start means coupled to said power supply for detecting when said power supply is turned on and outputting a detection signal in response thereto;

process selecting means operatively coupled to said restore process start means for receiving said detection signal, said process selecting means displaying to a user, in response to said detection signal, a plurality of saved system conditions stored in said non-volatile memory means from which said system may be restored;

process determination means for permitting selection of one of said plurality of displayed saved system conditions in accordance with an input from said user; and system state restoring means coupled to said process determination means for receiving said selection, coupled to said non-volatile memory means for reading said selected one of said plurality of saved system conditions therefrom, and coupled to said CPU, said plurality of input/output ports and/or devices and said main memory for restoring said CPU, said plurality of input/output ports and/or devices and said main memory to said selected system condition.

160. The apparatus for providing continuity of operation of claim 149, further comprising:

restore process start means coupled to said power supply for detecting when said power supply is turned on and outputting a detection signal in response thereto;

process start determination means coupled to said restore process start means for receiving said detection signal, said process start determination means confirming, in response to said detection signal, whether processing can be continued from a system condition saved in said non-volatile memory means and outputting a confirmation if said processing can continue;

system state restoring means coupled to said process start determination means, coupled to said non-volatile memory means for reading said system condition therefrom, and coupled to said CPU, said plurality of input/output ports and/or devices and main memory for restoring said CPU, said plurality of input/output ports and/or devices and main memory to the system condition stored in said non-volatile memory means in response to said confirmation from said process start determination means that processing can be continued from a system condition saved in said non-volatile memory means; and post-restore processing means coupled to said system state restoring means for determining when said CPU, said plurality of input/output ports and/or devices and main memory are restored to the system condition which existed at the time of said demand to begin a save process, and coupled to said CPU, said plurality of input/output ports and/or devices and main memory for controlling the operation of said process after the system state restoring means has restored said system condition, said post-restore processing means continuing said process based upon said system condition stored when said demand was detected by said save process start detecting means.

161. An apparatus for providing continuity of operation in a system which exhibits a system condition and which performs a process, the system including a CPU having a status, a plurality of input/output ports and/or devices having a status, a main memory for storing data and a power supply for supplying power to said system, said apparatus for providing continuity comprising:

save process start detecting means for detecting a demand to begin a save process and producing a demand signal in response thereto;

non-volatile memory means for storing data representing the condition of said system;

system state saving means coupled to said save process start detecting means for receiving said demand signal, and coupled to said CPU, said plurality of input/output ports and/or devices and main memory for receiving a CPU status corresponding to the status of said CPU at the time of said demand, an I/O status corresponding to the status of said plurality of input/output ports and/or devices at the time of said demand, and the data in said memory at the time of said demand, the CPU status, I/O status and data representing a condition of said system at an occurrence of said demand, and being further coupled to said non-volatile memory means for storing said system condition to said non-volatile memory means in response to said demand signal to the extent necessary to restore said system condition and to continue processing based on the stored system condition;

post-save processing means coupled to said system state saving means for performing processing after said system state saving means has completely output said system condition to said non-volatile memory means;

restore process start means coupled to said power supply for detecting when said power supply is turned on and outputting a detection signal in response thereto;

process selecting means operatively coupled to said restore process start means for displaying to a user a plurality of processes which may be executed after the power supply has been turned on, at least one of said displayed processes being continuing the operation of said process after said system condition has been restored based upon the system condition stored when said demand was detected by said save process start detecting means; and system state restoring means coupled to said non-volatile memory means for reading said system condition therefrom, and coupled to said CPU and said main memory for restoring said CPU and said main memory to the system condition stored in said non-volatile memory means.

162. The apparatus for providing continuity of operation of claim 161, wherein said save process start detecting means further includes a power switch having an on state and an off state, and power off detection processing means for reading the power switch state indicated by said switch and producing a demand signal when said power switch state is in an off state.

163. The apparatus for providing continuity of operation of claim 161, wherein said power supply includes a battery having a voltage, and said save process start detecting means includes a battery voltage detection processing means for detecting the voltage of the battery and producing a demand signal when said voltage falls below a predetermined value.

164. The apparatus for providing continuity of operation of claim 161, wherein said demand to begin a save process is initiated by a user, and wherein said save process start detecting means further includes user instruction input means to provide a user input, said user input indicating a demand to begin a save process and wherein said save process start detecting means produces said demand signal in response to said user input indicating a demand to begin a save process.

165. The apparatus for providing continuity of operation of claim 161, wherein said non-volatile memory means further includes a fixedly reserved system state store region, and wherein said system state saving means stores said system condition in said fixedly reserved system state store region of said non-volatile memory means.

166. The apparatus for providing continuity of operation of claim 161, wherein said non-volatile memory means further includes at least one system state store file, and wherein said system state saving means stores said system condition in said at least one system state store file of said non-volatile memory means.

167. The apparatus for providing continuity of operation of claim 161, wherein said non-volatile memory means further includes a contiguous system state store region within said non-volatile memory means, and wherein said system state saving means stores said system condition in said contiguous system state store region of said non-volatile memory means.

168. The apparatus for providing continuity of operation of claim 161, wherein said post-save processing means is further coupled to said power supply and turns off said power supply after said system state saving means has completely stored said system condition to said non-volatile memory means.

169. The apparatus for providing continuity of operation of claim 161, wherein said post-save processing means further includes process selecting means operatively coupled to said system state saving means for displaying to a user a plurality of processes which may be executed after said system condition has been stored in said non-volatile memory means, and process determination means for permitting selection of one of said plurality of displayed processes in accordance with an input from said user, at least one of said processes being continuing with the current process.

170. The apparatus for providing continuity of operation of claim 161, and including process start determination means operatively coupled to said restore process start means for confirming in response to said detection signal whether processing can be continued from a system condition saved in said non-volatile memory means.

171. An apparatus for providing continuity of operation in a system which exhibits a system condition and which performs a process, the system including a CPU having a status, a plurality of input/output ports and/or devices having a status, a main memory for storing data and a power supply for supplying power to said system, said apparatus for providing continuity comprising:

save process start detecting means for detecting a demand to begin a save process and producing a demand signal in response thereto;

non-volatile memory means for storing data representing the condition of said system at a plurality of demands;

system state saving means coupled to said save process start detecting means for receiving said demand signal, and coupled to said CPU, said plurality of input/output ports and/or devices and main memory for receiving a CPU status corresponding to the status of said CPU at the time of said demand, an I/O status corresponding to the status of said plurality of input/output ports and/or devices at the time of said demand, and the data in said memory at the time of said demand, the CPU status, I/O status and data representing a condition of said system at an occurrence of said demand and being further coupled to said non-volatile memory means for storing said system condition to said non-volatile memory means in response to said demand signal to the extent necessary to restore said system state and to continue processing based upon said stored system condition;

post-save processing means coupled to said system state saving means for performing processing after said system state saving means has completely output said system condition to said non-volatile memory means;

restore process start means coupled to said power supply for detecting when said power supply is turned on and outputting a detection signal in response thereto;

process selecting means operatively coupled to said restore process start means for receiving said detection signal, said process selecting means displaying to a user, in response to said detection signal, the one or more saved system conditions which may be restored from said non-volatile memory means;

process determination means for permitting selection of one of said displayed saved system conditions in accordance with an input from said user; and system state restoring means coupled to said process determination means for receiving said selection, and coupled to said non-volatile memory means for reading one of said saved system conditions corresponding to said selection therefrom, and coupled to said CPU, said plurality of input/output ports and/or devices and said main memory for restoring said CPU, said plurality of input/output ports and/or devices and said main memory to said selected saved system condition stored in said non-volatile memory means.

172. The apparatus for providing continuity of operation of claim 171, wherein said save process start detecting means further includes a power switch having an on state and an off state, and power off detection processing means for reading the power switch state indicated by said switch and producing a demand signal when said power switch state is in an off state.

173. The apparatus for providing continuity of operation of claim 171, wherein said power supply includes a battery having a voltage, and said save process start detecting means includes a battery voltage detection processing means for detecting the voltage of the battery and producing a demand signal when said voltage falls below a predetermined value.

174. The apparatus for providing continuity of operation of claim 171, wherein said demand to begin a save process is initiated by a user, and wherein said save process start detecting means further includes user instruction input means to provide a user input, said user input indicating a demand to begin a save process and wherein said save process start detecting means produces said demand signal in response to said user input indicating a demand to begin a save process.

175. The apparatus for providing continuity of operation of claim 171, wherein said non-volatile memory means further includes a reserved system state store region, and wherein said system state saving means stores said system conditions in said reserved system state store region of said non-volatile memory means.

176. The apparatus for providing continuity of operation of claim 171, wherein said non-volatile memory means further includes at least one system state store file, and wherein said system state saving means stores said system conditions in said at least one system state store file of said non-volatile memory means.

177. The apparatus for providing continuity of operation of claim 171, wherein said non-volatile memory means further includes a contiguous system state store region within said non-volatile memory means, and wherein said system state saving means stores said system conditions in said contiguous system state store region of said non-volatile memory means.

178. The apparatus for providing continuity of operation of claim 171, wherein said post-save processing means is further coupled to said power supply and turns off said power supply after said system state saving means has completely stored said system condition to said non-volatile memory means.

179. The apparatus for providing continuity of operation of claim 171, wherein said post-save processing means further includes process selecting means operatively coupled to said system state saving means for displaying to a user a plurality of processes which may be executed after said system condition has been stored in said non-volatile memory means, and process determination means for permitting selection of one of said plurality of displayed processes in accordance with an input from said user, at least one of said processes being continuing with the current process.

180. The apparatus for providing continuity of operation of claim 171, and including process start determination means operatively coupled to said restore process start means for confirming in response to said detection signal whether processing can be continued from a system condition saved in said non-volatile memory means.

181. An apparatus for providing continuity of operation in a system which exhibits a system condition and which performs a process, the system including a CPU having a status, a plurality of input/output ports and/or devices having a status, a main memory for storing data and a power supply for supplying power to said system, said apparatus for providing continuity comprising:

save process start detecting means for detecting a demand to begin a save process initiated by a user and producing a demand signal, said save process start detecting means including user instruction input means to provide a user input, said user input indicating a demand to begin a save process and said save process start detecting means producing said demand signal in response to said user input indicating a demand to begin a save process;

external storage means for storing data representing the condition of said system, said external storage means further including a fixedly reserved system state store region;

system state saving means coupled to said save process start detecting means for receiving said demand signal, and coupled to said CPU, said plurality of input/output ports and/or devices and said main memory for receiving a CPU status corresponding to the status of said CPU at the time of said demand, an I/O status corresponding to the status of said plurality of input/output ports and/or devices at the time of said demand, and the data in said memory at the time of said demand, the CPU status, I/O status and data representing a condition of said system at an occurrence of said demand, and being further coupled to said external storage means for storing said system condition in said external storage means in response to said demand signal to the extent necessary to restore said system to enable said apparatus to continue processing based upon said stored system condition, said system state saving means storing said system condition in said fixedly reserved system state store region of said external storage means;

post-save processing means coupled to said system state saving means for performing processing after said system state saving means has completely output said system condition to said external storage means.

182. An apparatus for providing continuity of operation in a system which exhibits a system condition and which performs a process, the system including a CPU having a status, a plurality of input/output ports and/or devices having a status, a main memory for storing data and a power supply for supplying power to said system, said apparatus for providing continuity comprising:

save process start detecting means for detecting a demand to begin a save process initiated by a user and producing a demand signal, said save process start detecting means including user instruction input means to provide a user input, said user input indicating a demand to begin a save process and said save process start detecting means producing said demand signal in response to said user input indicating a demand to begin a save process;

external storage means for storing data representing the condition of said system including a contiguous system state store region within said external storage means; system state saving means coupled to said save process start detecting means for receiving said demand signal, and coupled to said CPU, said plurality of input/output ports and/or devices and said main memory for receiving a CPU status corresponding to the status of said CPU at the time of said demand, an I/O status corresponding to the status of said plurality of input/output ports and/or devices at the time of said demand, and the data in said memory at the time of said demand, the CPU status, I/O status and data representing a condition of said system at an occurrence of said demand, and being further coupled to said external storage means for storing said system condition in said external storage means in response to said demand signal to the extent necessary to restore said system to enable said apparatus to continue processing based upon said stored system condition, said system state saving means storing said system condition in said contiguous system state store region of said external storage means; and post-save processing means coupled to said system state saving means for performing processing after said system state saving means has completely output said system condition to said external storage means.

183. An apparatus for providing continuity of operation in a system which exhibits a system condition and which performs a process, the system including a CPU having a status, a plurality of input/output ports and/or devices having a status, a main memory for storing data and a power supply for supplying power to said system, said apparatus for providing continuity comprising:

save process start detecting means for detecting a demand to begin a save process initiated by a user and producing a demand signal, said save process start detecting means including user instruction input means to provide a user input, said user input indicating a demand to begin a save process and said save process start detecting means producing said demand signal in response to said user input indicating a demand to begin a save process;

external storage means for storing data representing the condition of said system;

system state saving means coupled to said save process start detecting means for receiving said demand signal, and coupled to said CPU, said plurality of input/output ports and/or devices and said main memory for receiving a CPU status corresponding to the status of said CPU at the time of said demand, an I/O status corresponding to the status of said plurality of input/output ports and/or devices at the time of said demand, and the data in said memory at the time of said demand, the CPU status, I/O status and data representing a condition of said system at an occurrence of said demand, and being further coupled to said external storage means for storing said system condition in said external storage means in response to said demand signal to the extent necessary to restore said system to enable said apparatus to continue processing based upon said stored system condition; and post-save processing means coupled to said system state saving means for performing processing after said system state saving means has completely output said system condition to said external storage means said post save processing means including process selecting means operatively coupled to said system state saving means for displaying to a user a plurality of processes which may be executed after said system condition has been stored in said external storage means, and process determination means for permitting selection of one of said plurality of displayed processes in accordance with an input from said user, at least one of said processes being continuing with the current process.

184. An apparatus for providing continuity of operation in a system which exhibits a system condition and which performs a process, the system including a CPU having a status, a plurality of input/output ports and/or devices having a status, a main memory for storing data and a power supply for supplying power to said system, said apparatus for providing continuity comprising:

save process start detecting means for detecting a demand to begin a save process initiated by a user and producing a demand signal, said save process start detecting means including user instruction input means to provide a user input, said user input indicating a demand to begin a save process and said save process start detecting means producing said demand signal in response to said user input indicating a demand to begin a save process;

external storage means for storing data representing the condition of said system;

system state saving means coupled to said save process start detecting means for receiving said demand signal, and coupled to said CPU, said plurality of input/output ports and/or devices and said main memory for receiving a CPU status corresponding to the status of said CPU at the time of said demand, an I/O status corresponding to the status of said plurality of input/output ports and/or devices at the time of said demand, and the data in said memory at the time of said demand, the CPU status, I/O status and data representing a condition of said system at an occurrence of said demand, and being further coupled to said external storage means for storing said system condition in said external storage means in response to said demand signal to the extent necessary to restore said system to enable said apparatus to continue processing based upon said stored system condition;

post-save processing means coupled to said system state saving means for performing processing after said system state saving means has completely output said system condition to said external storage means;

restore process start means coupled to said power supply for detecting when said power supply is turned on and outputting a detection signal in response thereto;

process selecting means operatively coupled to said restore process start means for displaying to a user a plurality of processes which may be executed, at least one of said displayed processes being continuing the operation of said process after the system condition has been restored; and system state restoring means coupled to said external storage means for reading said system condition therefrom, and coupled to said CPU, said plurality of input/output ports and/or devices and said main memory for restoring said CPU, said plurality of input/ output ports and/or devices and said main memory to the system condition stored in said external storage means when said demand was detected by said save process start detecting means.

185. An apparatus for providing continuity of operation in a system which exhibits a system condition and which performs a process, the system including a CPU having a status, a plurality of input/output ports and/or devices having a status, a main memory for storing data and a power supply for supplying power to said system, said apparatus for providing continuity comprising:

save process start detecting means for detecting a demand to begin a save process initiated by a user and producing a demand signal, said save process start detecting means including user instruction input means to provide a user input, said user input indicating a demand to begin a save process and said save process start detecting means producing said demand signal in response to said user input indicating a demand to begin a save process;

external storage means for storing data representing the condition of said system;

system state saving means coupled to said save process start detecting means for receiving said demand signal, and coupled to said CPU, said plurality of input/output ports and/or devices and said main memory for receiving a CPU status corresponding to the status of said CPU at the time of said demand, an I/O status corresponding to the status of said plurality of input/output ports and/or devices at the time of said demand, and the data in said memory at the time of said demand, the CPU status, I/O status and data representing a condition of said system at an occurrence of said demand, and being further coupled to said external storage means for storing said system condition in said external storage means in response to said demand signal to the extent necessary to restore said system to enable said apparatus to continue processing based upon said stored system condition;

post-save processing means coupled to said system state saving means for performing processing after said system state saving means has completely output said system condition to said external storage means;

restore process start means coupled to said power supply for detecting when said power supply is turned on and outputting a detection signal in response thereto;

process selecting means operatively coupled to said restore process start means for receiving said detection signal, said process selecting means displaying to a user, in response to said detection signal, a plurality of saved system conditions stored in said external storage means from which said system may be restored;

process determination means for permitting selection of one of said plurality of displayed saved system conditions in accordance with an input from said user; and system state restoring means coupled to said process determination means for receiving said selection, coupled to said external storage means for reading said selected one of said plurality of saved system conditions therefrom, and coupled to said CPU, said plurality of input/output ports and/or devices and said main memory for restoring said CPU, and plurality of input/ output ports and/or devices and said main memory to said selected system condition.

186. An apparatus for providing continuity of operation in a system which exhibits a system condition and which performs a process, the system including a CPU having a status, a plurality of input/output ports, and/or devices having a status, a main memory for storing data and a power supply for supplying power to said system, said apparatus for providing continuity comprising:

save process start detecting means for detecting a demand to begin a save process and producing a demand signal in response thereto;

external storage means for storing data representing the condition of said system, said external storage means including a fixedly reserved system state store region;

system state saving means coupled to said save process start detecting means for receiving said demand signal, and coupled to said CPU, said plurality of input/output ports and/or devices and said main memory for receiving a CPU status corresponding to the status of said CPU at the time of said demand, an I/O status corresponding to the status of said plurality of input/output ports and/or devices at the time of said demand, and the data in said memory at the time of said demand, the CPU status, I/O status and data representing a condition of said system at an occurrence of said demand, and being further coupled to said external storage means for storing said system condition in said external storage means in response to said demand signal to the extent necessary to restore said system to enable said apparatus to continue processing based on said stored system condition, said system state saving means storing said system condition in said fixedly reserved system state store region of said external storage means; and post-save processing means coupled to said system state saving means for performing processing after said system state saving means has completely output said system condition to said external storage means.

187. The apparatus for providing continuity of operation of claim 186, wherein said save process start detecting means further includes a power switch having an on state and an off state, and power off detection processing means for reading the power switch state indicated by said switch and producing a demand signal when said power switch state is in an off state.

188. The apparatus for providing continuity of operation of claim 186, wherein said power supply further includes a battery having a voltage, and said save process start detecting means includes a battery voltage detection processing means for detecting the voltage of the battery and producing a demand signal when said voltage falls below a predetermined value.

189. The apparatus for providing continuity of operation of claim 186, wherein said demand to begin a save process is initiated by a user, and wherein said save process start detecting means further includes user instruction input means to provide a user input, said user input indicating a demand to begin a save process and wherein said save process start detecting means produces said demand signal in response to said user input indicating a demand to begin a save process.

190. The apparatus for providing continuity of operation of claim 186, wherein said fixedly reserved system state store region is a contiguous store region within said external storage means.

191. The apparatus for providing continuity of operation of claim 186, wherein said post-save processing means is further coupled to said power supply and turns off said power supply after said system state saving means has completely stored said system condition to said external storage means.

192. The apparatus for providing continuity of operation of claim 186, wherein said post-save processing means further includes process selecting means operatively coupled to said system state saving means for displaying to a user a plurality of processes which may be executed after said system condition has been stored in said external storage means, and process determination means for permitting selection of one of said plurality of displayed processes in accordance with an input from said user, at least one of said processes being continuing with the current process.

193. The apparatus for providing continuity of operation of claim 186, further comprising:

restore process start means coupled to said power supply for detecting when said power supply is turned on and outputting a detection signal in response thereto; and system state restoring means coupled to said restore process start means for receiving said detection signal, coupled to said external storage means for reading said system condition therefrom, and coupled to said CPU, said plurality of input/output ports and/or devices and main memory for restoring, in response to said detection signal, said CPU, said plurality of input/output ports and/or devices and main memory to the system condition stored in said external storage means, whereby said process can be continued based on said system condition stored when said demand was detected by said save process start detecting means.

194. The apparatus for providing continuity of operation of claim 186, further comprising:

restore process start means coupled to said power supply for detecting when said power supply is turned on and outputting a detection signal in response thereto;

process selecting means operatively coupled to said restore process start means for displaying to a user a plurality of processes which may be executed, at least one of said displayed processes being continuing the operation of said process after the system condition has been restored; and system state restoring means coupled to said external storage means for reading said system condition therefrom, and coupled to said CPU, said plurality of input/output ports and/or devices and said main memory for restoring said CPU, said plurality of input/output ports and/or devices and said main memory to the system condition stored in said external storage means when said demand was detected by said save process start detecting means.

195. The apparatus for providing continuity of operation of claim 186, further comprising:

restore process start means coupled to said power supply for detecting when said power supply is turned on and outputting a detection signal in response thereto;

process selecting means operatively coupled to said restore process start means for receiving said detection signal, said process selecting means displaying to a user, in response to said detection signal, a plurality of saved system conditions stored in said external storage means from which said system may be restored;

process determination means for permitting selection of one of said plurality of displayed saved system conditions in accordance with an input from said user; and system state restoring means coupled to said process determination means for receiving said selection, coupled to said external storage means for reading said selected one of said plurality of saved system conditions therefrom, and coupled to said CPU, said plurality of input/output ports and/or devices and said main memory for restoring said CPU, said plurality of input/output ports and/or devices and said main memory to said selected system condition.

196. The apparatus for providing continuity of operation of claim 186, further comprising:

restore process start means coupled to said power supply for detecting when said power supply is turned on and outputting a detection signal in response thereto;

process start determination means coupled to said restore process start means for receiving said detection signal, said process start determination means confirming, in response to said detection signal, whether processing can be continued from a system condition saved in said external storage means and outputting a confirmation if said processing can continue;

system state restoring means coupled to said process start determination means, coupled to said external storage means for reading said system condition therefrom, and coupled to said CPU, said plurality of input/output ports and/or devices and main memory for restoring said CPU, said plurality of input/output ports and/or devices and main memory to the system condition stored in said external storage means in response to said confirmation from said process start determination means that processing can be continued from a system condition saved in said external storage means; and post-restore processing means coupled to said system state restoring means for determining when said CPU, said plurality of input/output ports and/or devices and main memory are restored to the system condition which existed at the time of said demand to begin a save process, and coupled to said CPU, said plurality of input/output ports and/or devices and main memory for controlling the operation of said process after the system state restoring means has restored said system condition, said post-restore processing means continuing said process based on said system condition stored when said demand was detected by said save process start detecting means.

197. An apparatus for providing continuity of operation in a system which exhibits a system condition and which performs a process, the system including a CPU having a status, a plurality of input/output ports and/or devices having a status, a main memory for storing data and a power supply for supplying power to said system, said apparatus for providing continuity comprising:

save process start detecting means for detecting a demand to begin a save process and producing a demand signal;

external storage means for storing data representing the condition of said system, said external storage means including a contiguous system state store region within said external storage means;

system state saving means coupled to said save process start detecting means for receiving said demand signal, and coupled to said CPU, said plurality of input/output ports and/or devices and said main memory for receiving a CPU status corresponding to the status of said CPU at the time of said demand, an I/O status corresponding to the status of said plurality of input/output ports and/or devices at the time of said demand, and the data in said memory at the time of said demand, the CPU status, I/O status and data representing a condition of said system at an occurrence of said demand, and being further coupled to said external storage means for storing said system condition in said external storage means in response to said demand signal to the extent necessary to restore said system to enable said apparatus to continue processing based on the stored system condition, said system state saving means storing said system condition in said contiguous system state store region of said external storage means; and post-save processing means coupled to said system state saving means for performing processing after said system state saving means has completely output said system condition to said external storage means.

198. The apparatus for providing continuity of operation of claim 197, wherein said save process start detecting means further includes a power switch having an on state and an off state, and power off detection processing means for reading the power switch state indicated by said switch and producing a demand signal when said power switch state is in an off state.

199. The apparatus for providing continuity of operation of claim 197, wherein said power supply includes a battery having a voltage, and said save process start detecting means includes a battery voltage detection processing means for detecting the voltage of the battery and producing a demand signal when said voltage falls below a predetermined value.

200. The apparatus for providing continuity of operation of claim 197, wherein said demand to begin a save process is initiated by a user, and wherein said save process start detecting means further includes user instruction input means to provide a user input, said user input indicating a demand to begin a save process and wherein said save process start detecting means produces said demand signal in response to said user input indicating a demand to begin a save process.

201. The apparatus for providing continuity of operation of claim 197, wherein said contiguous system state store region is a reserved store region within said external storage means.

202. The apparatus for providing continuity of operation of claim 197, wherein said contiguous system state store region includes a file within said external storage means.

203. The apparatus for providing continuity of operation of claim 197, wherein said post-save processing means is further coupled to said power supply and turns off said power supply after said system state saving means has completely stored said system condition to said external storage means.

204. The apparatus for providing continuity of operation of claim 197, wherein said post-save processing means further includes process selecting means operatively coupled to said system state saving means for displaying to a user a plurality of processes which may be executed after said system condition has been stored in said external storage means, and process determination means for permitting selection of one of said plurality of displayed processes in accordance with an input from said user, at least one of said processes being continuing with the current process.

205. The apparatus for providing continuity of operation of claim 197, further comprising:

restore process start means coupled to said power supply for detecting when said power supply is turned on and outputting a detection signal in response thereto; and system state restoring means coupled to said restore process start means for receiving said detection signal, coupled to said external storage means for reading said system condition therefrom, and coupled to said CPU, said plurality of input/output ports and/or devices and main memory for restoring, in response to said detection signal, said CPU, said plurality of input/output ports and/or devices and main memory to the system condition stored in said external storage means, whereby said process can be continued based on the system condition stored when said demand was detected by said save process start detecting means.

206. The apparatus for providing continuity of operation of claim 197, further comprising:

restore process start means coupled to said power supply for detecting when said power supply is turned on and outputting a detection signal in response thereto;

process selecting means operatively coupled to said restore process start means for displaying to a user a plurality of processes which may be executed, at least one of said displayed processes being continuing the operation of said process after the system condition has been restored; and system state restoring means coupled to said external storage means for reading said system condition therefrom, and coupled to said CPU, said plurality of input/output ports and/or devices and said main memory for restoring said CPU, said plurality of input/output ports and/or devices and said main memory to the system condition stored in said external storage means when said demand was detected by said save process start detecting means.

207. The apparatus for providing continuity of operation of claim 197, further comprising:

restore process start means coupled to said power supply for detecting when said power supply is turned on and outputting a detection signal in response thereto;

process selecting means operatively coupled to said restore process start means for receiving said detection signal, said process selecting means displaying to a user, in response to said detection signal, a plurality of saved system conditions stored in said external storage means from which said system may be restored;

process determination means for permitting selection of one of said plurality of displayed saved system conditions in accordance with an input from said user; and system state restoring means coupled to said process determination means for receiving said selection, coupled to said external storage means for reading said selected one of said plurality of saved system conditions therefrom, and coupled to said CPU, said plurality of input/output ports and/or devices and said main memory for restoring said CPU, said plurality of input/output ports and/or devices and said main memory to said selected system condition.

208. The apparatus for providing continuity of operation of claim 197, further comprising:

restore process start means coupled to said power supply for detecting when said power supply is turned on and outputting a detection signal in response thereto;

process start determination means coupled to said restore process start means for receiving said detection signal, said process start determination means confirming, in response to said detection signal, whether processing can be continued from a system condition saved in said external storage means and outputting a confirmation if said processing can continue;

system state restoring means coupled to said process start determination means, coupled to said external storage means for reading said system condition therefrom, and coupled to said CPU, said plurality of input/output ports and/or devices and main memory for restoring said CPU, said plurality of input/output ports and/or devices and main memory to the system condition stored in said external storage means in response to said confirmation from said process start determination means that processing can be continued from a system condition saved in said external storage means; and post-restore processing means coupled to said system state restoring means for determining when said CPU, said plurality of input/output ports and/or devices and main memory are restored to the system condition which existed at the time of said demand to begin a save process, and coupled to said CPU, said plurality of input/output ports and/or devices and main memory for controlling the operation of said process after the system state restoring means has restored said system condition, said post-restore processing means continuing said process based on said system condition stored when said demand was detected by said save process start detecting means.

209. An apparatus for providing continuity of operation in a system which exhibits a system condition and which performs a process, the system including a CPU having a status, a plurality of input/output ports and/or devices having a status, a main memory for storing data and a power supply for supplying power to said system, said apparatus for providing continuity comprising:

save process start detecting means for detecting a demand to begin a save process and producing a demand signal in response thereto;

external storage means for storing data representing the condition of said system;

system state saving means coupled to said save process start detecting means for receiving said demand signal, and coupled to said CPU, said plurality of input/output ports and/or devices and main memory for receiving a CPU status corresponding to the status of said CPU at the time of said demand, an I/O status corresponding to the status of said plurality of input/output ports and/or devices at the time of said demand, and the data in said memory at the time of said demand, the CPU status, I/O status and data representing a condition of said system at an occurrence of said demand, and being further coupled to said external storage means for storing said system condition to said external storage means in response to said demand signal to the extent necessary to restore said system condition and to continue processing based on said stored system condition;

process selecting means operatively coupled to said system state saving means for displaying to a user a plurality of processes which may be executed after said system condition has been stored in said external storage means; and process determination means operatively coupled to said process selecting means for permitting selection of one of said plurality of displayed processes in accordance with an input from said user, at least one of said displayed processes being continuing with the current process.

210. The apparatus for providing continuity of operation of claim 209, wherein said save process start detecting means further includes a power switch having an on state and an off state, and power off detection processing means for reading the power switch state indicated by said switch and producing a demand signal when said switch state is in an off state.

211. The apparatus for providing continuity of operation of claim 209, wherein said power supply includes a battery having a voltage, and said save process start detecting means includes a battery voltage detection processing means for detecting the voltage of the battery and producing a demand signal when said voltage falls below a predetermined value.

212. The apparatus for providing continuity of operation of claim 209, wherein said demand to begin a save process is initiated by a user, and wherein said save process start detecting means further includes user instruction input means to provide a user input, said user input indicating a demand to begin a save process and wherein said save process start detecting means produces said demand signal in response to said user input indicating a demand to begin a save process.

213. The apparatus for providing continuity of operation of claim 209, wherein said external storage means further includes a fixedly reserved system state store region, and wherein said system state saving means stores said system condition in said fixedly reserved system state store region of said external storage means.

214. The apparatus for providing continuity of operation of claim 209, wherein said external storage means further includes at least one system state store file, and wherein said system state saving means stores said system condition in said at least one system state store file of said external storage means.

215. The apparatus for providing continuity of operation of claim 209, wherein said external storage means further includes a contiguous system state store region within said external storage means, and wherein said system state saving means stores said system condition in said contiguous system state store region of said external storage means.

216. The apparatus for providing continuity of operation of claim 209, wherein said process determination means is further coupled to said power supply and wherein at least one of said plurality of displayed processes is turning off the power supply.

217. The apparatus for providing continuity of operation of claim 209, further comprising:
    restore process start means coupled to said power supply for detecting when said power supply is turned on and outputting a detection signal in response thereto; and
    system state restoring means coupled to said restore process start means for receiving said detection signal, coupled to said external storage means for reading said system condition therefrom, and coupled to said CPU, said plurality of input/output ports and/or devices and main memory for restoring, in response to said detection signal, said CPU, said plurality of input/output ports and/or devices and main memory to the system condition stored in said external storage means, whereby said process can be continued based upon said system condition stored when said demand was detected by said save process start detecting means.

218. The apparatus for providing continuity of operation of claim 209, further comprising:
    restore process start means coupled to said power supply for detecting when said power supply is turned on and outputting a detection signal in response thereto;
    process selecting means operatively coupled to said restore process start means for displaying to a user a plurality of processes which may be executed, at least one of said displayed processes being continuing the operation of said process after the system condition has been restored; and
    system state restoring means coupled to said external storage means for reading said system condition therefrom, and coupled to said CPU, said plurality of input/output ports and/or devices and said main memory for restoring said CPU, said plurality of input/output ports and/or devices and said main memory to the system condition stored in said external storage means when said demand was detected by said save process start detecting means.

219. The apparatus for providing continuity of operation of claim 209, further comprising:
    restore process start means coupled to said power supply for detecting when said power supply is turned on and outputting a detection signal in response thereto;
    process selecting means operatively coupled to said restore process start means for receiving said detection signal, said process selecting means displaying to a user, in response to said detection signal, a plurality of saved system conditions stored in said external storage means from which said system may be restored;
    process determination means for permitting selection of one of said plurality of displayed saved system conditions in accordance with an input from said user; and
    system state restoring means coupled to said process determination means for receiving said selection, coupled to said external storage means for reading said selected one of said plurality of saved system conditions therefrom, and coupled to said CPU, said plurality of input/output ports and/or devices and said main memory for restoring said CPU, said plurality of input/output ports and/or devices and said main memory to said selected system condition.

220. The apparatus for providing continuity of operation of claim 209, further comprising:
    restore process start means coupled to said power supply for detecting when said power supply is turned on and outputting a detection signal in response thereto;
    process start determination means coupled to said restore process start means for receiving said detection signal, said process start determination means confirming, in response to said detection signal, whether processing can be continued from a system condition saved in said external storage means and outputting a confirmation if said processing can continue;
    system state restoring means coupled to said process start determination means, coupled to said external storage means for reading said system condition therefrom, and coupled to said CPU, said plurality of input/output ports and/or devices and main memory for restoring said CPU, said plurality of input/output ports and/or devices and main memory to the system condition stored in said external storage means in response to said confirmation from said process start determination means that processing can be continued from a system condition saved in said external storage means; and
    post-restore processing means coupled to said system state restoring means for determining when said CPU, said plurality of input/output ports and/or devices and main memory are restored to the system condition which existed at the time of said demand to begin a save process, and coupled to said CPU, said plurality of input/output ports and/or devices and main memory for controlling the operation of said process after the system state restoring means has restored said system condition, said post-restore processing means continuing said process based on said system condition stored when said demand was detected by said save process start detecting means.

221. An apparatus for providing continuity of operation in a system which exhibits a system condition and which performs a process, the system including a CPU having a status, a plurality of input/output ports and/or devices having a status, a main memory for storing data and a power supply for supplying power to said system, said apparatus for providing continuity comprising:
    save process start detecting means for detecting a demand to begin a save process and producing a demand signal in response thereto;
    external storage means for storing data representing the condition of said system;
    system state saving means coupled to said save process start detecting means for receiving said demand signal, and coupled to said CPU, said plurality of input/output ports and/or devices and main memory for receiving a CPU status corresponding to the status of said CPU at the time of said demand, an I/O status corresponding to the status of said plurality of input/output ports and/or devices of the time of said demand, and the data in said memory at the time of said demand, the CPU status, I/O status and data representing a condition of said system at an occurrence of said demand, and being further coupled to said external storage means for storing said system condition to said external storage means in response to said demand signal to the extent necessary to restore said system condition and to continue processing based on said stored system condition;

post-save processing means coupled to said system state saving means for performing processing after said system state saving means has completely output said system condition to said external storage means;

restore process start means coupled to said power supply for detecting when said power supply is turned on and outputting a detection signal in response thereto;

process selecting means operatively coupled to said restore process start means for displaying to a user a plurality of processes which may be executed after the power supply has been turned on, at least one of said displayed processes being continuing the operation of said process based upon said system condition when said demand was detected by said save process start detecting means; and system state restoring means coupled to said external storage means for reading said system condition therefrom, and coupled to said CPU, said plurality of input/output ports and/or devices and said main memory for restoring said CPU, said plurality of input/output ports and/or devices and said main memory to the system condition stored in said external storage means.

222. The apparatus for providing continuity of operation of claim 221, wherein said save process start detecting means further includes a power switch having an on state and an off state, and power off detection processing means for reading the power switch state vindicated by said switch and producing a demand signal when said power switch state is in an off state.

223. The apparatus for providing continuity of operation of claim 221, wherein said power supply includes a battery having a voltage, and said save process start detecting means includes a battery voltage detection processing means for detecting the voltage of the battery and producing a demand signal when said voltage falls below a predetermined value.

224. The apparatus for providing continuity of operation of claim 221, wherein said demand to begin a save process is initiated by a user, and wherein said save process start detecting means further includes user instruction input means to provide a user input, said user input indicating a demand to begin a save process and wherein said save process start detecting means produces said demand signal in response to said user input indicating a demand to begin a save process.

225. The apparatus for providing continuity of operation of claim 221, wherein said external storage means further includes a fixedly reserved system state store region, and wherein said system state saving means stores said system condition in said fixedly reserved system state store region of said external storage means.

226. The apparatus for providing continuity of operation of claim 221, wherein said external storage means further includes at least one system state store file, and wherein said system state saving means stores said system condition in said at least one system state store file of said external storage means.

227. The apparatus for providing continuity of operation of claim 221, wherein said external storage means further includes a contiguous system state store region within said external storage means, and wherein said system state saving means stores said system condition in said contiguous system state store region of said external storage means.

228. The apparatus for providing continuity of operation of claim 221, wherein said post-save processing means is further coupled to said power supply and turns off said power supply after said system state saving means has completely stored said system condition to said external storage means.

229. The apparatus for providing continuity of operation of claim 221, wherein said post-save processing means further includes process selecting means operatively coupled to said system state saving means for displaying to a user a plurality of processes which may be executed after said system condition has been stored in said external storage means, and process determination means for permitting selection of one of said plurality of displayed processes in accordance with an input from said user, at least one of said processes being continuing with the current process.

230. The apparatus for providing continuity of operation of claim 221, and including process start determination means operatively coupled to said restore process start means for confirming in response to said detection signal whether processing can be continued from a system condition saved in said external storage means.

231. An apparatus for providing continuity of operation in a system which exhibits a system condition and which performs a process, the system including a CPU having a status, a plurality of input/output ports and/or devices having a status, a main memory for storing data and a power supply for supplying power to said system, said apparatus for providing continuity comprising:

save process start detecting means for detecting a demand to begin a save process and producing a demand signal in response thereto;

external storage means for storing data representing the condition of said system at a plurality of demands;

system state saving means coupled to said save process start detecting means for receiving said demand signal, and coupled to said CPU, said plurality of input/output ports and/or devices and main memory for receiving a CPU status corresponding to the status of said CPU at the time of said demand, an I/O status corresponding to the status of said plurality of input/output ports and/or devices at the time of said demand, and the data in said memory at the time of said demand, the CPU status, I/O status and data representing a condition of said system at an occurrence of said demand and being further coupled to said external storage means for storing said system condition to said external storage means in response to said demand signal to the extent necessary to restore said system condition and to continue processing based upon said stored system condition;

post-save processing means coupled to said system state saving means for performing processing after said system state saving means has completely output said system condition to said external storage means;

restore process start means coupled to said power supply for detecting when said power supply is turned on and outputting a detection signal in response thereto;

process selecting means operatively coupled to said restore process start means for receiving said detection signal, said process selecting means displaying to a user, in response to said detection signal, the one or more saved system conditions which may be restored from said external storage means;

process determination means for permitting selection of one of said displayed saved system conditions in accordance with an input from said user; and system state restoring means coupled to said process determination means for receiving said selection, and coupled to said external storage means for reading one of said saved system conditions corresponding to said selection therefrom, and coupled to said CPU and said main memory for restoring said CPU and said main memory to said selected saved system condition stored in said external storage means.

232. The apparatus for providing continuity of operation of claim 231, wherein said save process start detecting means further includes a power switch having an on state and an off state, and power off detection processing means for reading the power switch state indicated by said switch and producing a demand signal when said power switch state is in an off state.

233. The apparatus for providing continuity of operation of claim 231, wherein said power supply includes a battery having a voltage, and said save process start detecting means includes a battery voltage detection processing means for detecting the voltage of the battery and producing a demand signal when said voltage falls below a predetermined value.

234. The apparatus for providing continuity of operation of claim 231, wherein said demand to begin a save process is initiated by a user, and wherein said save process start detecting means further includes user instruction input means to provide a user input, said user input indicating a demand to begin a save process and wherein said save process start detecting means produces said demand signal in response to said user input indicating a demand to begin a save process.

235. The apparatus for providing continuity of operation of claim 231, wherein said external storage means further includes a reserved system state store region, and wherein said system state saving means stores said system conditions in said reserved system state store region of said external storage means.

236. The apparatus for providing continuity of operation of claim 231, wherein said external storage means further includes at least one system state store file, and wherein said system state saving means stores said system conditions in said at least one system state store file of said external storage means.

237. The apparatus for providing continuity of operation of claim 231, wherein said external storage means further includes a contiguous system state store region within said external storage means, and wherein said system state saving means stores said system conditions in said contiguous system state store region of said external storage means.

238. The apparatus for providing continuity of operation of claim 231, wherein said post-save processing means is further coupled to said power supply and turns off said power supply after said system state saving means has completely stored said system condition to said external storage means.

239. The apparatus for providing continuity of operation of claim 231, wherein said post-save processing means further includes process selecting means operatively coupled to said system state saving means for displaying to a user a plurality of processes which may be executed after said system condition has been stored in said external storage means, and process determination means for permitting selection of one of said plurality of displayed processes in accordance with an input from said user, at least one of said processes being continuing with the current process.

240. The apparatus for providing continuity of operation of claim 231, and including process start determination means operatively coupled to said restore process start means for confirming in response to said detection signal whether processing can be continued from a system condition saved in said external storage means.

241. A method for providing continuity of operation in a system which exhibits a system condition and which performs a process, the system including a CPU having a status, a main memory for storing data, a non-volatile memory and a power supply for supplying power to said system, said CPU status and main memory data representing said system condition, and said non-volatile memory including a fixedly reserved system state store region, said method comprising the steps of:

detecting a demand for saving said system condition and providing a demand signal;

storing said system condition to said fixedly reserved system state store region of said non-volatile memory in response to said demand signal to the extent necessary to restore said system condition and to continue processing based on said stored system condition; and performing processing after said system condition has been completely stored to said fixedly reserved system state store region of said non-volatile memory.

242. A method for providing continuity of operation in a system which exhibits a system condition and which performs a process, the system including a CPU having a status, a main memory for storing data, a non-volatile memory and a power supply for supplying power to said system, said CPU status and main memory data representing said system condition, and said non-volatile memory including a contiguous system state store region, said method comprising the steps of:

detecting a demand for saving said system condition and providing a demand signal; storing said system condition to said contiguous system, state store region of said non-volatile memory in response to said demand signal to the extent necessary to restore said system condition and to continue processing based on said stored system condition; and performing processing after said system condition has been completely stored to said contiguous system state store region of said non-volatile memory.

243. A method for providing continuity of operation in a system which exhibits a system condition and which performs a process, the system including a CPU having a status, a main memory for storing data, a non-volatile memory and a power supply for supplying power to said system, said CPU status and main memory data representing said system condition, said method comprising the steps of:

detecting a demand for saving said system condition and providing a demand signal;

storing said system condition to said non-volatile memory in response to said demand signal to the extent necessary to restore said system condition and to continue processing based on said stored system condition;

displaying to a user a plurality of processes which may be executed after said system condition has been stored to said non-volatile memory; and permitting selection of one of said plurality of displayed processes in accordance with an input from said user, at least one of said displayed processes being continuing with the current process.

244. A method for providing continuity of operation in a system which exhibits a system condition and which performs a process, the system including a CPU having a status, a main memory for storing data, a non-volatile memory and a power supply for supplying power to said system, said CPU status and main memory data representing said system condition, said method comprising the steps of:

detecting a demand for saving said system condition and providing a demand signal;

storing said system condition to said non-volatile memory in response to said demand signal to the extent necessary to restore said system condition and to continue processing based on said stored system condition;

performing processing after said system condition has been completely stored to said non-volatile memory;

detecting when said power supply is turned on and providing a detection signal;

displaying to a user a plurality of processes which may be executed after said system condition has been restored from said non-volatile memory;

permitting selection of one of said plurality of displayed processes in accordance with an input from said user, at least one of said displayed processes being continuing the operation of said process after the system condition has been restored; and reading said system condition from said non-volatile memory and restoring said CPU and said main memory to the system condition stored in said non-volatile memory for continued processing based on said system condition stored at the time of the detection of when the power supply was turned on.

245. A method for providing continuity of operation in a system which exhibits a system condition and which performs a process, the system including a CPU having a status, a main memory for storing data, a non-volatile memory and a power supply for supplying power to said system, said CPU status and main memory data representing said system condition, said method comprising the steps of:

detecting a demand for saving said system condition and providing a demand signal;

storing said system condition to said non-volatile memory in response to said demand signal to the extent necessary to restore said system condition and to continue processing based on said stored system condition;

performing processing after said system condition has been completely stored to said non-volatile memory;

detecting when said power supply is turned on and providing a detection signal;

displaying to a user a plurality of saved system conditions in response to said detection signal which may be restored from said non-volatile memory;

permitting selection of one of said plurality of displayed saved system conditions in accordance with an input from said user; and reading one of the plurality of displayed saved system conditions from said non-volatile memory in accordance with said user selection and restoring said CPU and said main memory to the system condition selected by said user stored in said non-volatile memory.

246. A method for providing continuity of operation in a system which exhibits a system condition and which performs a process, the system including a CPU having a status, a main memory for storing data, an external storage and a power supply for supplying power to said system, said CPU status and main memory data representing said system condition, and said external storage including a fixedly reserved system state store region, said method comprising the steps of:

detecting a demand for saving said system condition and providing a demand signal;

storing said system condition to said fixedly reserved system state store region of said external storage in response to said demand signal to the extent necessary to restore said system condition and to continue processing based on said stored system condition; and performing processing after said system condition has been completely stored to said fixedly reserved system state store region of said external storage.

247. A method for providing continuity of operation in a system which exhibits a system condition and which performs a process, the system including a CPU having a status, a main memory for storing data, an external storage and a power supply for supplying power to said system, said CPU status and main memory data representing said system condition, and said external storage including a contiguous system state store region, said method comprising the steps of:

detecting a demand for saving said system condition and providing a demand signal;

storing said system condition to said contiguous system state store region of said external storage in response to said demand signal to the extent necessary to restore said system condition and to continue processing based on said stored system condition; and performing processing after said system condition has been completely stored to said contiguous system state store region of said external storage.

248. A method for providing continuity of operation in a system which exhibits a system condition and which performs a process, the system including a CPU having a status, a main memory for storing data, an external storage and a power supply for supplying power to said system, said CPU status and main memory data representing said system condition, said method comprising the steps of:

detecting a demand for saving said system condition and providing a demand signal;

storing said system condition to said external storage in response to said demand signal to the extent necessary to restore said system condition and to continue processing based on said stored system condition;

displaying to a user a plurality of processes which may be executed after said system condition has been stored to said external storage; and permitting selection of one of said plurality of displayed processes in accordance with an input from said user, at least one of said displayed processes being continuing with the current process.

249. A method for providing continuity of operation in a system which exhibits a system condition and which performs a process, the system including a CPU having a status, a main memory for storing data, an external storage and a power supply for supplying power to said system, said CPU status and main memory data representing said system condition, said method comprising the steps of:

detecting a demand for saving said system condition and providing a demand signal;

storing said system condition to said external storage in response to said demand signal to the extent necessary to restore said system condition and to continue processing based on said stored system condition;

performing processing after said system condition has been completely stored to said external storage;

detecting when said power supply is turned on and providing a detection signal;

displaying to a user a plurality of processes which may be executed after said system condition has been restored from, said external storage;

permitting selection of one of said plurality of displayed processes in accordance with an input from said user, at least one of said displayed processes being continuing the operation of said process after the system condition has been restored; and reading said system condition from said external storage and restoring said CPU and said main memory to the system condition stored in said external storage at the time of the detection of when the power supply was turned on.

250. A method for providing continuity of operation in a system which exhibits a system condition and which performs a process, the system including a CPU having a status, a main memory for storing data, an external storage and a power supply for supplying power to said system, said CPU status and main memory data representing said system condition, said method comprising the steps of:

detecting a demand for saving said system condition and providing a demand signal;

storing said system condition to said external storage in response to said demand signal to the extent necessary to restore said system condition and to continue processing based on said stored system condition;

performing processing after said system condition has been completely stored to said external storage;

detecting when said power supply is turned on and providing a detection signal;

displaying to a user a plurality of saved system conditions in response to said detection signal which may be restored from said external storage;

permitting selection of one of said plurality of displayed saved system conditions in accordance with an input from said user; and reading one of the plurality of displayed saved system conditions from said external storage in accordance with said user selection and restoring said CPU and said main memory to the system condition selected by said user stored in said external storage.

251. A method for providing continuity of operation in a system which exhibits a system condition and which performs a process, the system including a CPU having a status, a plurality of input/output ports and/or devices having a status, a main memory for storing data, a non-volatile memory and a power supply for supplying power to said system, said CPU status, said status of said plurality of input/output ports and/or devices and main memory data representing said system condition, and said non-volatile memory including a fixedly reserved system state store region, said method comprising the steps of:

detecting a demand for saving said system condition and providing a demand signal;

storing said system condition to said fixedly reserved system state store region of said non-volatile memory in response to said demand signal to the extent necessary to restore said system condition and to continue processing based on said stored system condition; and performing processing after said system condition has been completely stored to said fixedly reserved system state store region of said non-volatile memory.

252. A method for providing continuity of operation in a system which exhibits a system condition and which performs a process, the system including a CPU having a status, a plurality of input/output ports and/or devices having a status, a main memory for storing data, a non-volatile memory and a power supply for supplying power to said system, said CPU status, said status of said plurality of input/output ports and/or devices and main memory data representing said system condition, and said non-volatile memory including a contiguous system state store region, said method comprising the steps of:

detecting a demand for saving said system condition and providing a demand signal;

storing said system condition to said contiguous system state store region of said non-volatile memory in response to said demand signal to the extent necessary to restore said system condition and to continue processing based on said stored system condition; and performing processing after said system condition has been completely stored to said contiguous system state store region of said non-volatile memory.

253. A method for providing continuity of operation in a system which exhibits a system condition and which performs a process, the system including a CPU having a status, a plurality of input/output ports and/or devices having a status, a main memory for storing data, a non-volatile memory and a power supply for supplying power to said system, said CPU status, said status of said plurality of input/output ports and/or devices and main memory data representing said system condition, said method comprising the steps of:

detecting a demand for saving said system condition and providing a demand signal;

storing said system condition to said non-volatile memory in response to said demand signal to the extent necessary to restore said system condition and to continue processing based on said stored system condition;

displaying to a user a plurality of processes which may be executed after said system condition has been stored to said non-volatile memory; and permitting selection of one of said plurality of displayed processes in accordance with an input from said user, at least one of said displayed processes being continuing with the current process.

254. A method for providing continuity of operation in a system which exhibits a system condition and which performs a process, the system including a CPU having a status, a plurality of input/output ports and/or devices having a status, a main memory for storing data, a non-volatile memory and a power supply for supplying power to said system, said CPU status, said status of said plurality of input/output ports and/or devices and main memory data representing said system condition, said method comprising the steps of:

detecting a demand for saving said system condition and providing a demand signal;

storing said system condition to said non-volatile memory in response to said demand signal to the extent necessary to restore said system condition and to continue processing based on said stored system condition;

performing processing after said system condition has been completely stored to said non-volatile memory;

detecting when said power supply is turned on and providing a detection signal;

displaying to a user a plurality of processes which may be executed after said system condition has been restored from said non-volatile memory;

permitting selection of one of said plurality of displayed processes in accordance with an input from said user, at least one of said displayed processes being continuing the operation of said process after the system condition has been restored; and reading said system condition from said non-volatile memory and restoring said CPU, said plurality of input/output ports and/or devices and said main memory to the system condition stored in said non-volatile memory at the time of the detection of when the power supply was turned on.

255. A method for providing continuity of operation in a system which exhibits a system condition and which performs a process, the system including a CPU having a status, a plurality of input/output ports and/or devices having a status, a main memory for storing data, a non-volatile memory and a power supply for supplying power to said system, said CPU status, said status of said plurality of input/output ports and/or devices and main memory data representing said system condition, said method comprising the steps of:

detecting a demand for saving said system condition and providing a demand signal;

storing said system condition to said non-volatile memory in response to said demand signal to the extent necessary to restore said system condition and to continue processing based on said stored system condition;

performing processing after said system condition has been completely stored to said non-volatile memory;

detecting when said power supply is turned on and providing a detection signal;

displaying to a user a plurality of saved system conditions in response to said detection signal which may be restored from said non-volatile memory;

permitting selection of one of said plurality of displayed saved system conditions in accordance with an input from said user; and reading one of the plurality of displayed saved system conditions from said non-volatile memory in accordance with said user selection and restoring said CPU, said plurality of input/output ports and/or devices and said main memory to the system condition selected by said user stored in said non-volatile memory.

256. A method for providing continuity of operation in a system which exhibits a system condition and which performs a process, the system including a CPU having a status, a plurality of input/output ports and/or devices having a status a main memory for storing data, an external storage and a power supply for supplying power to said system, said CPU status, said status of said plurality of input/output ports and/or devices and main memory data representing said system condition, and said external storage including a fixedly reserved system state store region, said method comprising the steps of:

detecting a demand for saving said system condition and providing a demand signal;

storing said system condition to said fixedly reserved system state store region of said external storage in response to said demand signal to the extent necessary to restore said system condition and to continue processing based on said stored system condition; and performing processing after said system condition has been completely stored to said fixedly reserved system state store region of said external storage.

257. A method for providing continuity of operation in a system which exhibits a system condition and which performs a process, the system including a CPU having a status, a plurality of input/output ports and/or devices having a status, a main memory for storing data, an external storage and a power supply for supplying power to said system, said CPU status, said status of said plurality of input/output ports and/or devices and main memory data representing said system condition, and said external storage including a contiguous system state store region, said method comprising the steps of:

detecting a demand for saving said system condition and providing a demand signal;

storing said system condition to said contiguous system state store region of said external storage in response to said demand signal to the extent necessary to restore said system condition and to continue processing based on said stored system condition; and performing processing after said system condition has been completely stored to said contiguous system state store region of said external storage.

258. A method for providing continuity of operation in a system which exhibits a system condition and which performs a process, the system including a CPU having a status, a plurality of input/output ports and/or devices having a status, a main memory for storing data, an external storage and a power supply for supplying power to said system, said CPU status, said status of said plurality of input/output ports and/or devices and main memory data representing said system condition, said method comprising the steps of:

detecting a demand for saving said system condition and providing a demand signal;

storing said system condition to said external storage in response to said demand signal to the extent necessary to restore said system condition and to continue processing based on said stored system state condition;

displaying to a user a plurality of processes which may be executed after said system condition has been stored to said external storage; and permitting selection of one of said plurality of displayed processes in accordance with an input from said user, at least one of said displayed processes being continuing with the current process.

259. A method for providing continuity of operation in a system which exhibits a system condition and which performs a process, the system including a CPU having a status, a plurality of input/output ports and/or devices having a status, a main memory for storing data, an external storage and a power supply for supplying power to said system, said CPU status, said status of said plurality of input/output ports and/or devices and main memory data representing said system condition, said method comprising the steps of:

detecting a demand for saving said system condition and providing a demand signal;

storing said system condition to said external storage in response to said demand signal to the extent necessary to restore said system condition and to continue processing based on said stored system condition;

performing processing after said system condition has been completely stored to said external storage;

detecting when said power supply is turned on and providing a detection signal;

displaying to a user a plurality of processes which may be executed after said system condition has been restored from said external storage;

permitting selection of one of said plurality of displayed processes in accordance with an input from said user, at least one of said displayed processes being continuing the operation of said process after the system condition has been restored; and reading said system condition from said external storage and restoring said CPU, said plurality of input/output ports and/or devices and said main memory to the system condition stored in said external storage at the time of the detection of when the power supply was turned on.

260. A method for providing continuity of operation in a system which exhibits a system condition and which performs a process, the system including a CPU having a status, a plurality of input/output ports and/or devices having a status, a main memory for storing data, an external storage and a power supply for supplying power to said system, said CPU status, said status of said plurality of input/output ports and/or devices and main memory data representing said system condition, said method comprising the steps of:

detecting a demand for saving said system condition and providing a demand signal;

storing said system condition to said external storage in response to said demand signal to the extent necessary to restore said system condition and to continue processing based on said stored system;

performing processing after said system condition has been completely stored to said external storage;

detecting when said power supply is turned on and providing a detection signal;

displaying to a user a plurality of saved system conditions in response to said detection signal which may be restored from said external storage;

permitting selection of one of said plurality of displayed saved system conditions in accordance with an input from said user; and reading one of the plurality of displayed saved system conditions from said external storage in accordance with said user selection and restoring said CPU, said plurality of input/output ports and/or devices and said main memory to the system condition selected by said user stored in said external storage.

* * * * *